United States Patent
Soneda et al.

(10) Patent No.: US 9,450,830 B2
(45) Date of Patent: Sep. 20, 2016

(54) NODE APPARATUS AND COMMUNICATION METHOD

(71) Applicant: FUJITSU LIMITED, Kawasaki-shi, Kanagawa (JP)

(72) Inventors: Tatsuya Soneda, Fukuoka (JP); Tetsu Yamamoto, Kawasaki (JP); Norihito Nishimoto, Fukuoka (JP); Tadashige Iwao, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 90 days.

(21) Appl. No.: 14/507,065

(22) Filed: Oct. 6, 2014

(65) Prior Publication Data
US 2015/0023213 A1    Jan. 22, 2015

Related U.S. Application Data

(63) Continuation of application No. PCT/JP2012/062563, filed on May 16, 2012.

(51) Int. Cl.
| | |
|---|---|
| *H04L 12/24* | (2006.01) |
| *H04L 12/733* | (2013.01) |
| *H04W 24/02* | (2009.01) |
| *H04W 40/24* | (2009.01) |
| *H04W 40/32* | (2009.01) |
| *H04W 84/18* | (2009.01) |

(52) U.S. Cl.
CPC ............. *H04L 41/12* (2013.01); *H04L 45/20* (2013.01); *H04W 24/02* (2013.01); *H04W 40/24* (2013.01); *H04W 40/32* (2013.01); *H04W 84/18* (2013.01)

(58) Field of Classification Search
CPC ...... H04L 41/12; H04L 45/20; H04W 24/02; H04W 40/32; H04W 40/24; H04W 84/18
USPC ........................................................ 370/254
See application file for complete search history.

(56) References Cited

U.S. PATENT DOCUMENTS

2006/0007882 A1*  1/2006  Zeng ................ H04L 45/00
                                                  370/328

FOREIGN PATENT DOCUMENTS

| JP | 2011-193341 | 9/2011 |
| WO | 2010/055602 A1 | 5/2010 |

OTHER PUBLICATIONS

International Search Report and Written Opinion of the International Searching Authority for PCT/JP2012/062563 dated Aug. 21, 2012.
Shibuya et al., "A Method of Cluster Mergence Considering Network Condition for Periodic Broadcasting VANET with Clustering", IEICE Technical Report, ITS2009-85, The Institute of Electronics, Information and Communication Engineers, Mar. 2010, pp. 1-6.
International Search Report of PCT/JP2012/062563 mailed Aug. 21, 2012.

* cited by examiner

*Primary Examiner* — Ronald B Abelson
(74) *Attorney, Agent, or Firm* — Staas & Halsey LLP

(57) ABSTRACT

A node apparatus includes a TTL memory configured to store a TTL value for a first node apparatus in the cluster; a receiving unit configured to receive a first Hello packet including a first sequence number and a second Hello packet including a second sequence number that is incremented when the node apparatus transmits a Hello packet; a sequence number judging unit configured to judge whether a first sequence number and a second sequence number match each other; a TTL decrementing unit configured to perform a process to decrement the TTL value stored in the TTL memory, when the first sequence number and the second sequence number are identical according to a judgment; and a cluster information updating unit configured to separate the first node apparatus from the cluster, when the TTL value for the first node apparatus becomes equal to or smaller than a prescribed value.

10 Claims, 48 Drawing Sheets

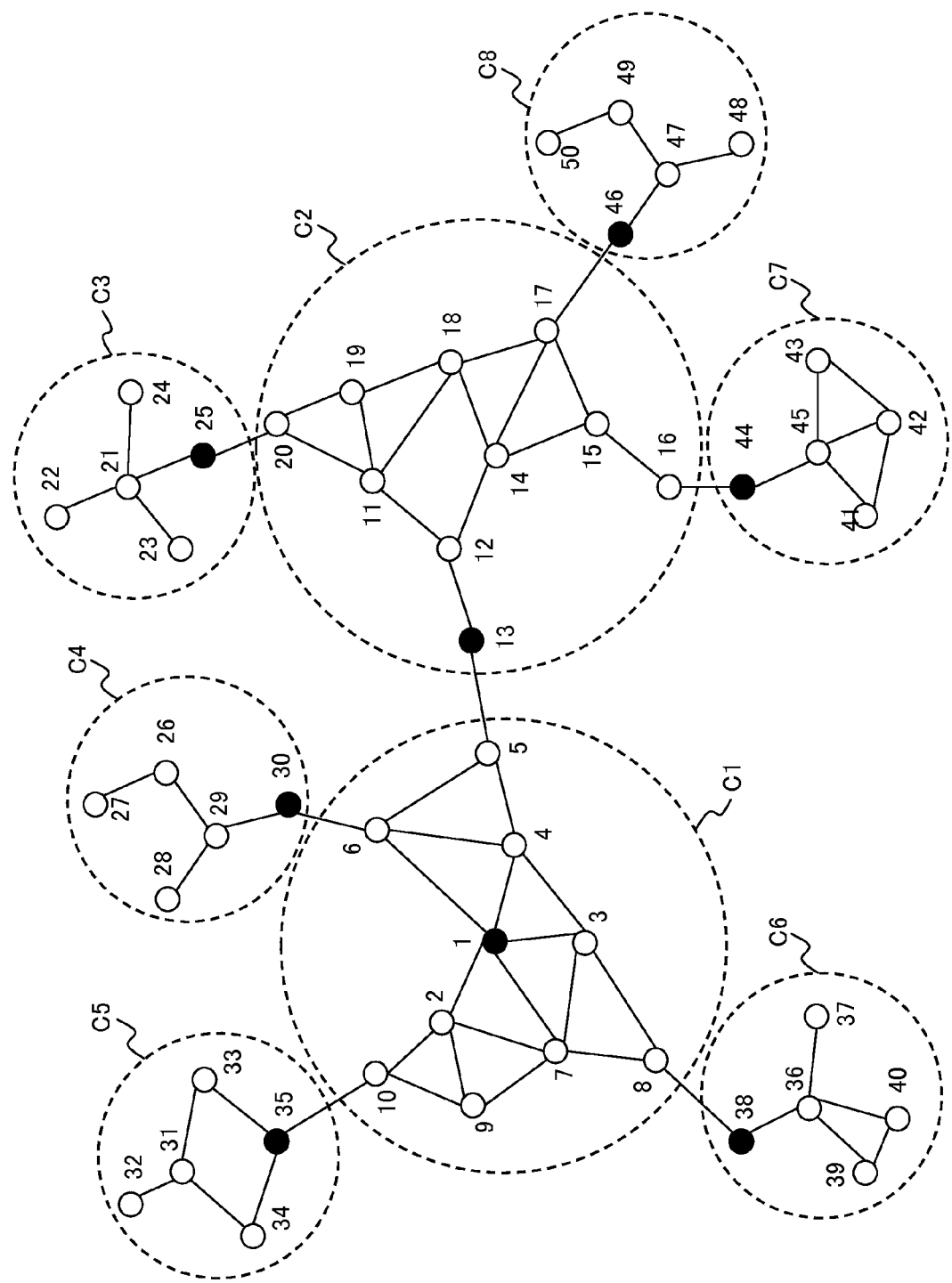
F I G. 1

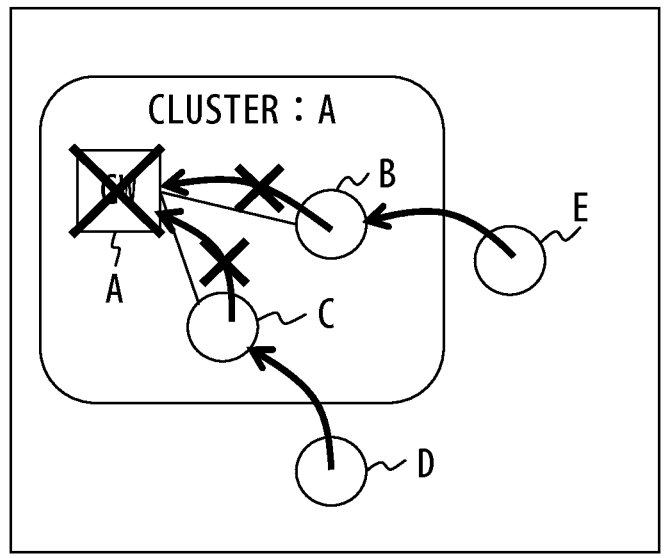
F I G. 2

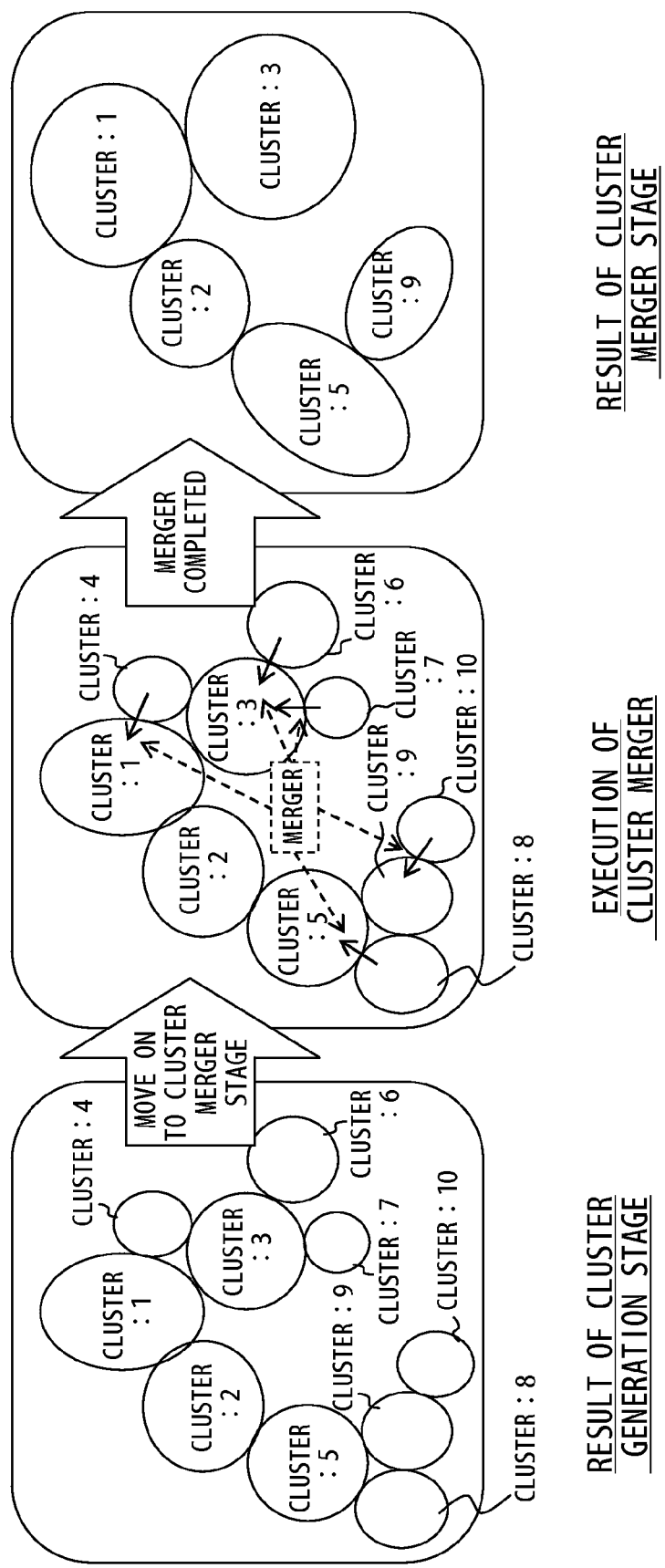
F I G. 3

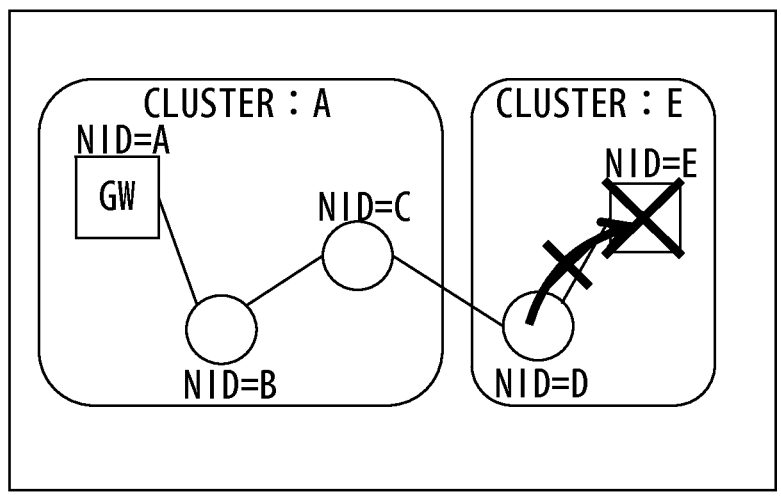
F I G. 4

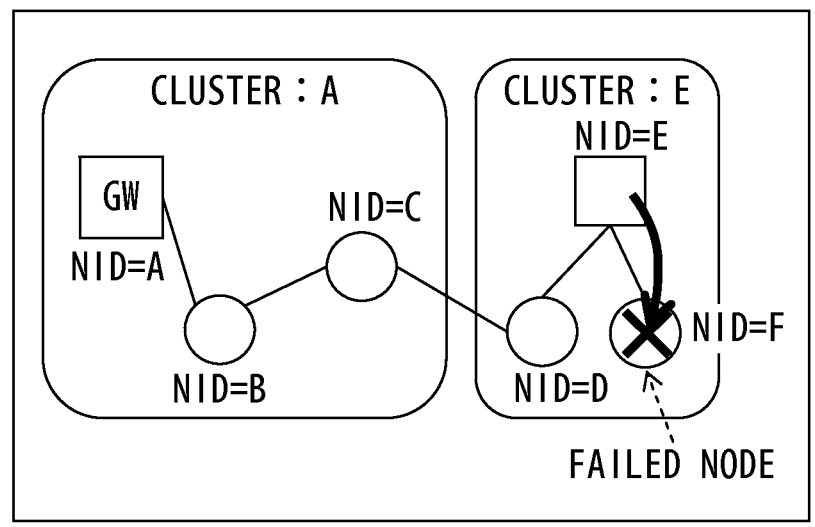
F I G. 6

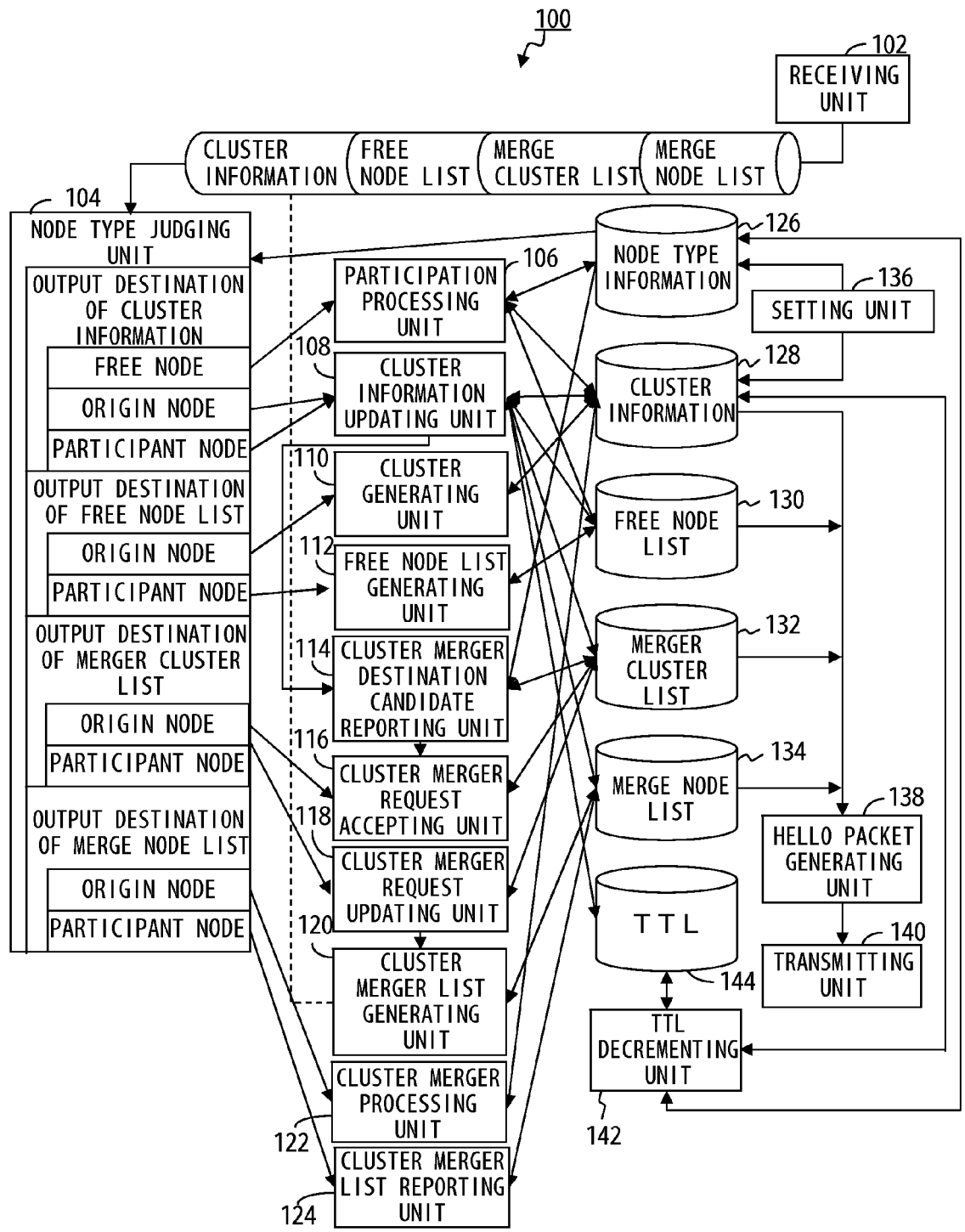
F I G. 7

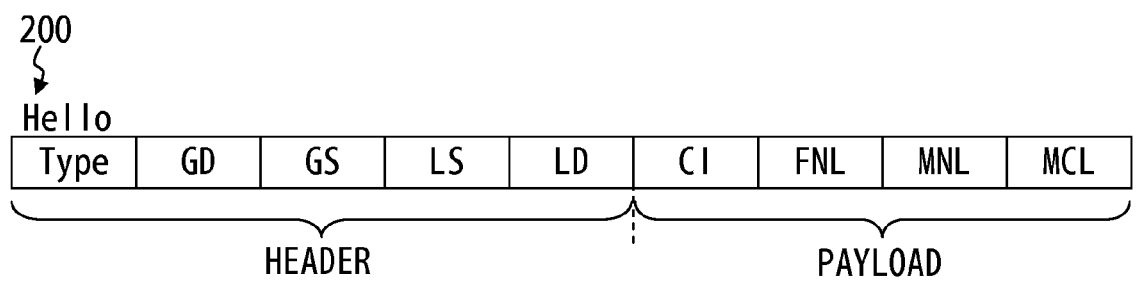
F I G. 8

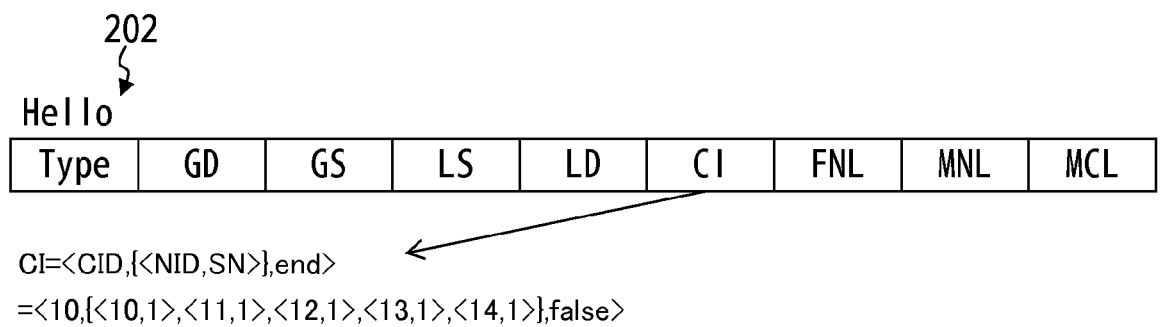
F I G. 10

TTL OF ORIGIN NODE (NID=10)

| NID=11 | NID=12 | NID=13 | NID=14 |
|---|---|---|---|
| 22 | 22 | 22 | 22 |

⤺ 300

TTL OF PARTICIPANT NODES (NID=11-14)

| NID=10 |
|---|
| 22 |

CI=<CID,{<NID,SN>},end>
=<10,{<10,1>,<11,1>,<12,1>,<13,1>,<14,1>},false>
↓
=<10,{<10,1>,<11,23>,<12,23>,<13,23>,<14,23>},false>

F I G.  1 3

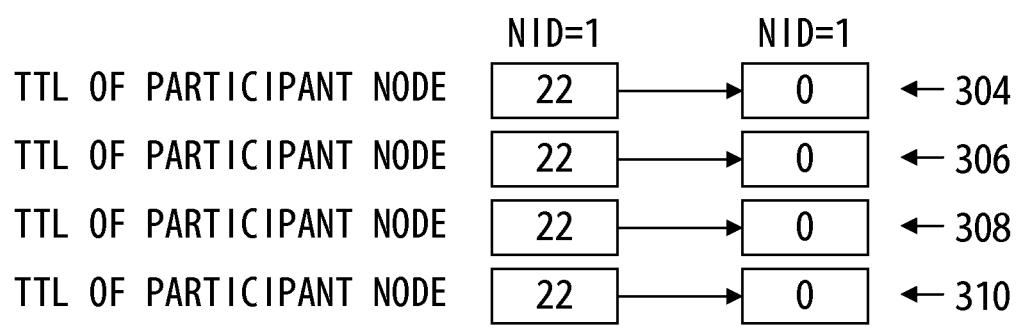
F I G. 14

CI=<CID,{<NID,SN>},end>
=<10,{<10,1>,<11,23>,<12,23>,<13,23>,<14,23>},false>
↓
=<11,{<11,23>,<12,23>,<13,23>,<14,23>},false>

F I G. 1 5

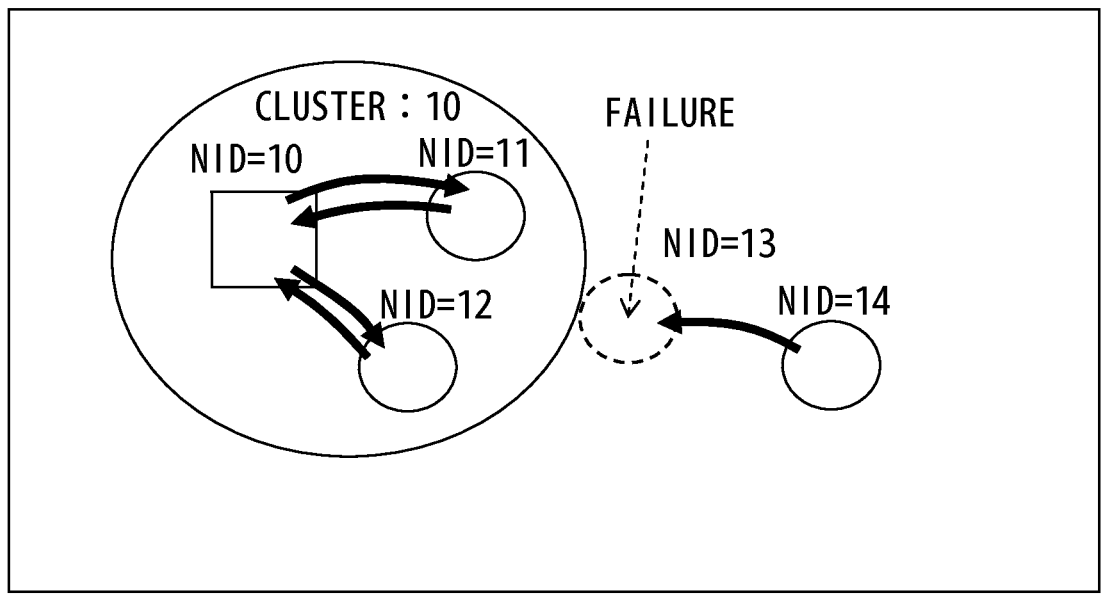
F I G. 16

CI=<CID,{<NID,SN>},end>
=<10,{<10,1>,<11,1>,<12,1>,<13,1>,<14,1>},false>
↓
=<10,{<10,23>,<11,23>,<12,23>,<13,1>,<14,1>},false>

F I G.  1 7

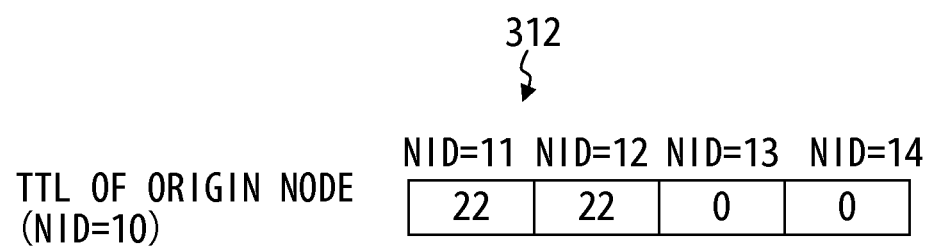
F I G. 1 8

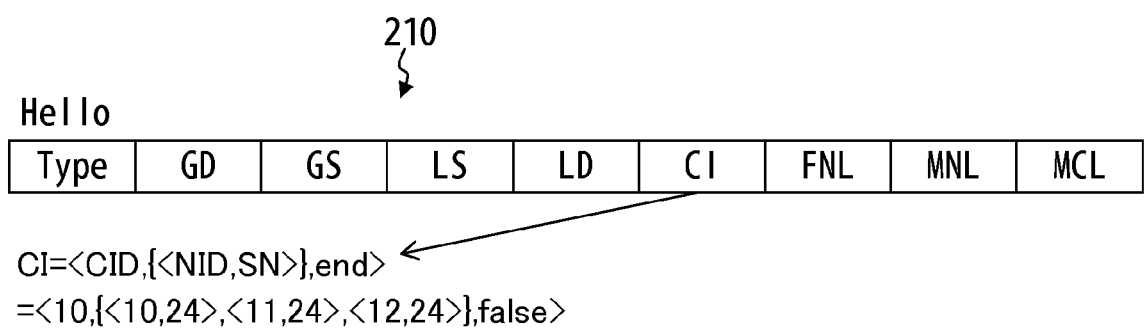
F I G. 1 9

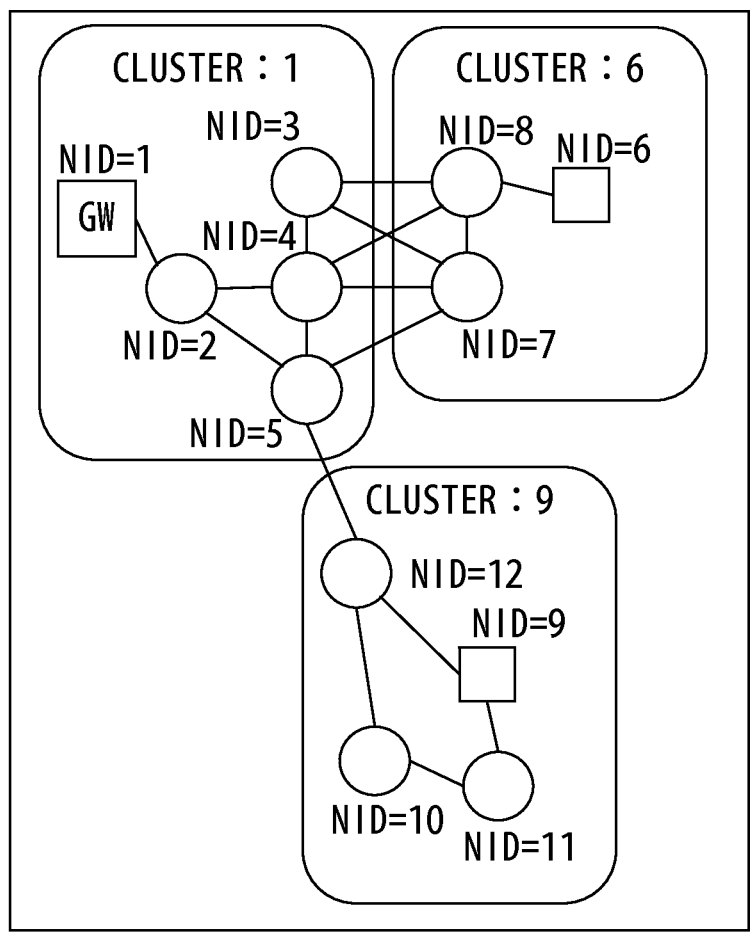
F I G. 2 1

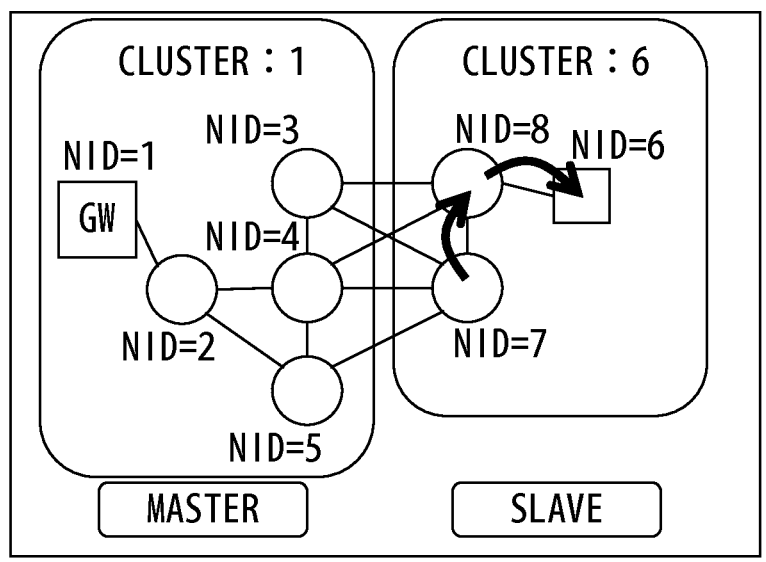
F I G. 2 2

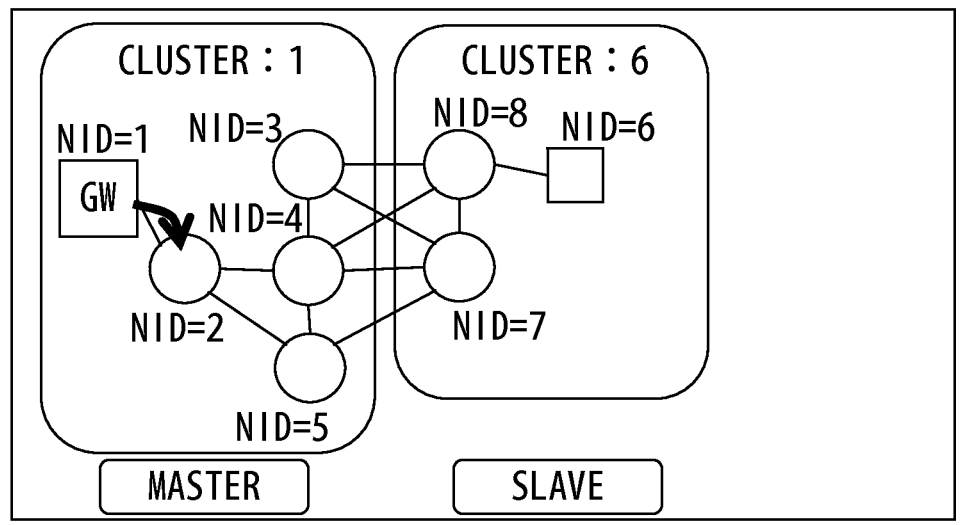
F I G. 24

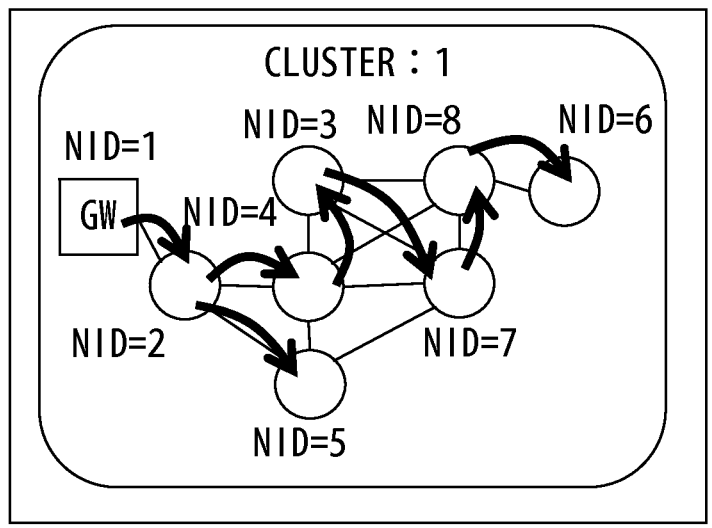
F I G. 2 5

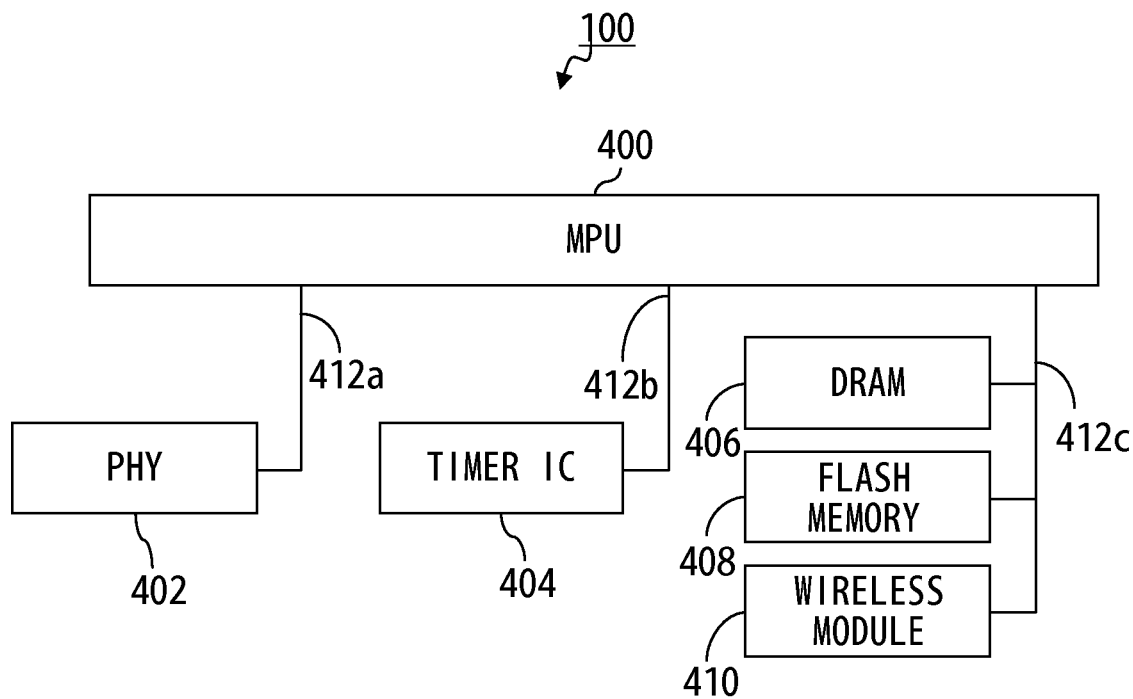
F I G. 2 6

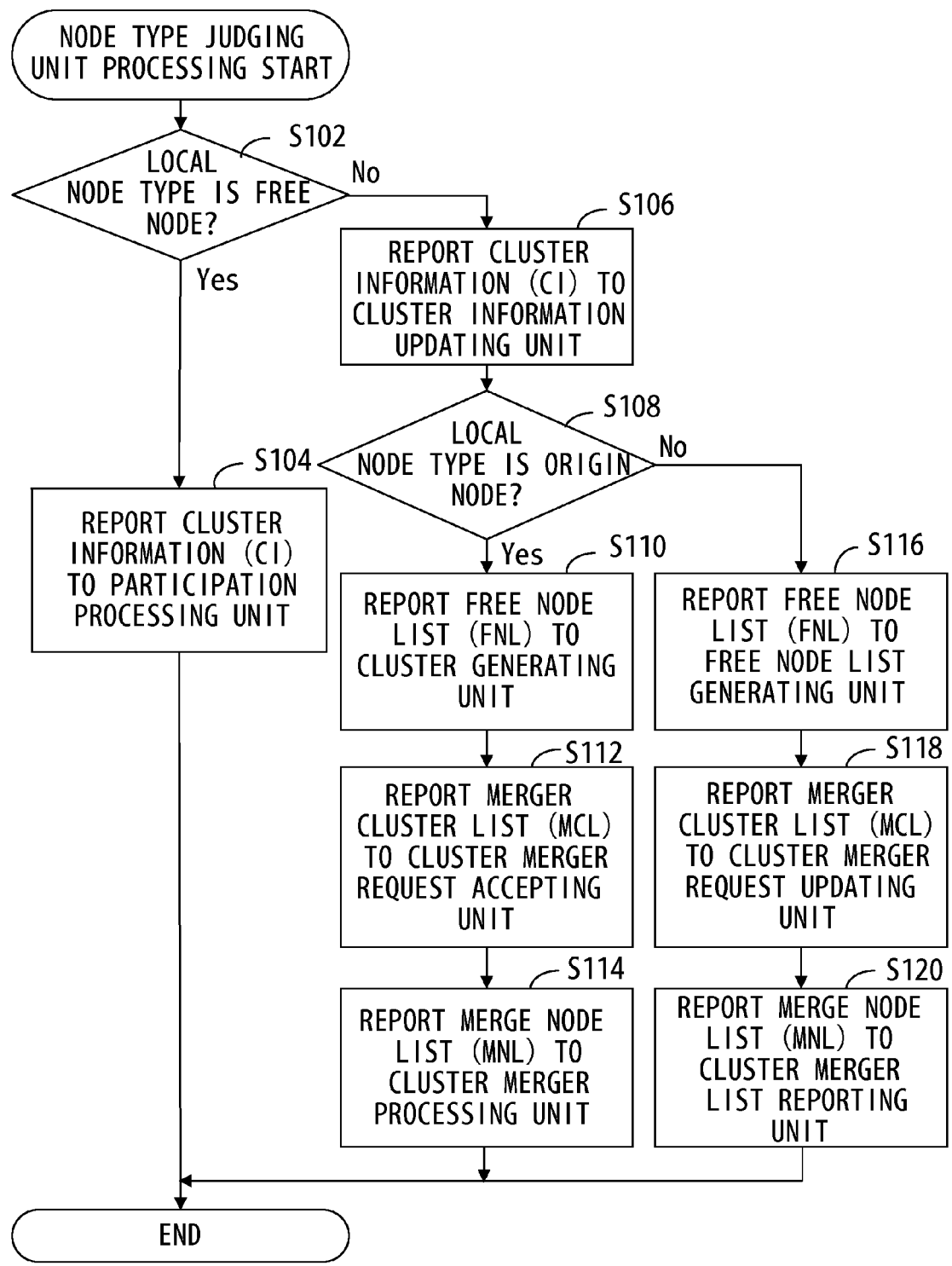
F I G. 2 7

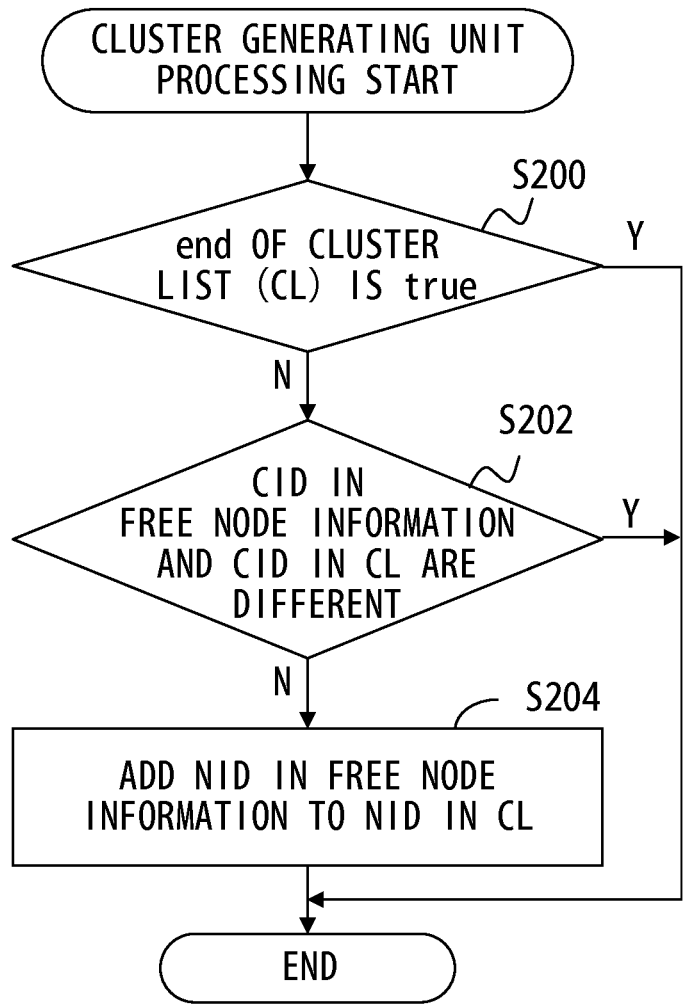
F I G. 3 0

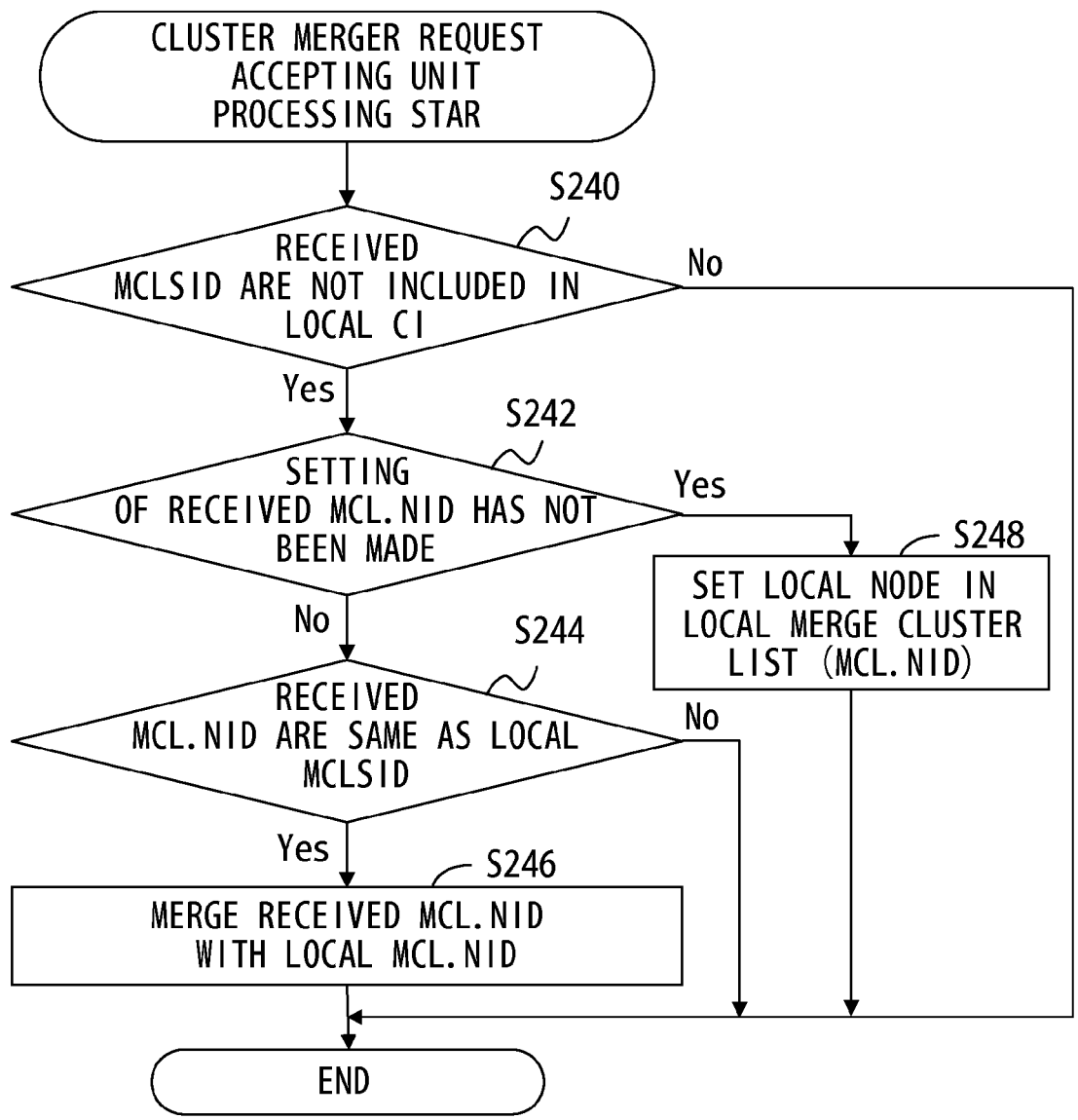
F I G. 3 3

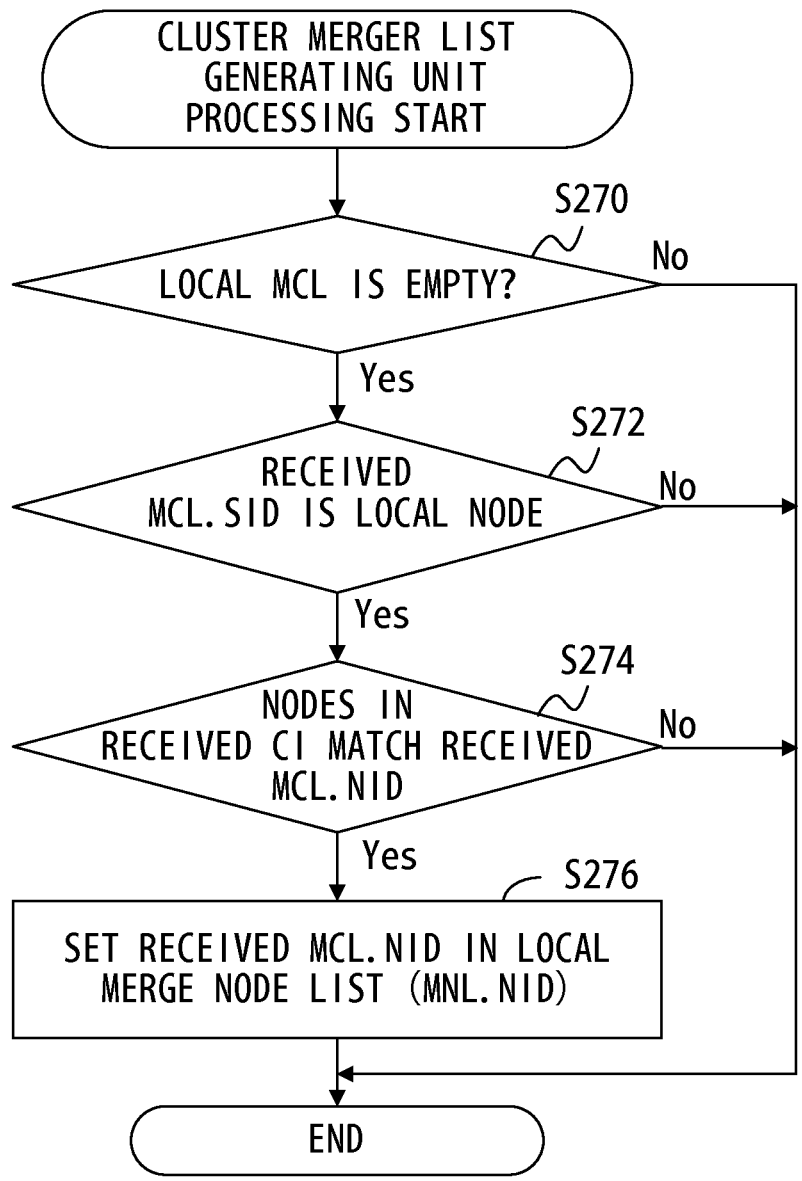
F I G. 3 5

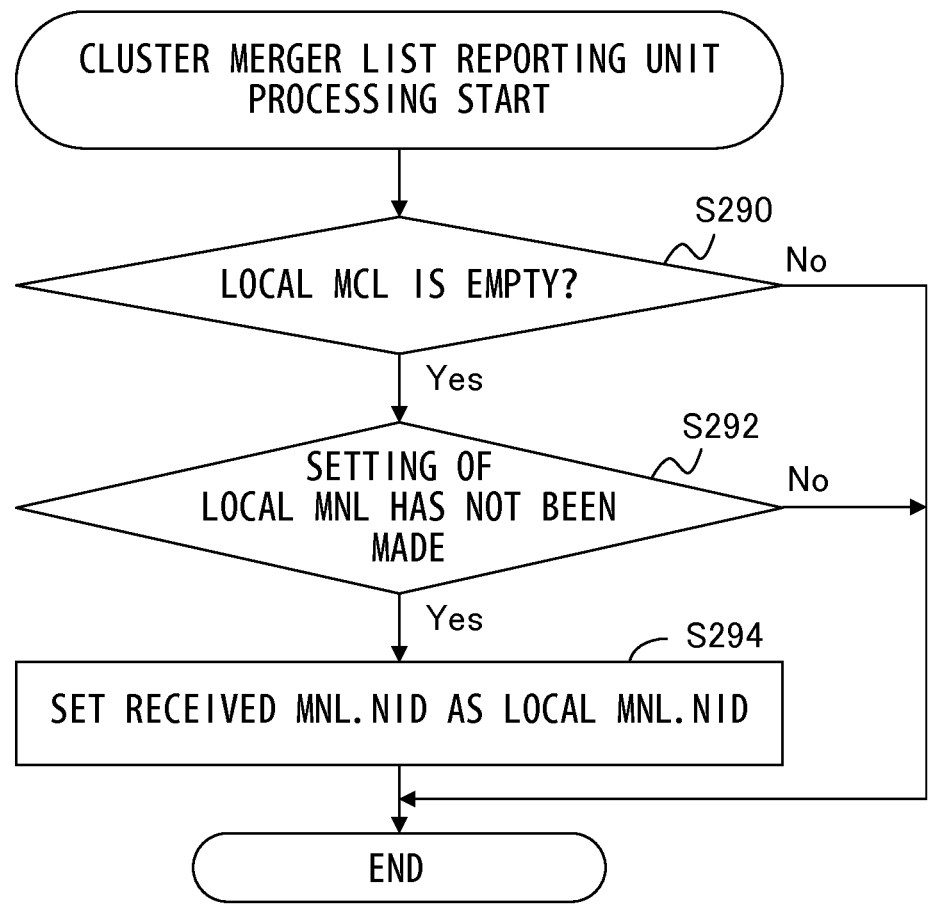
F I G. 37

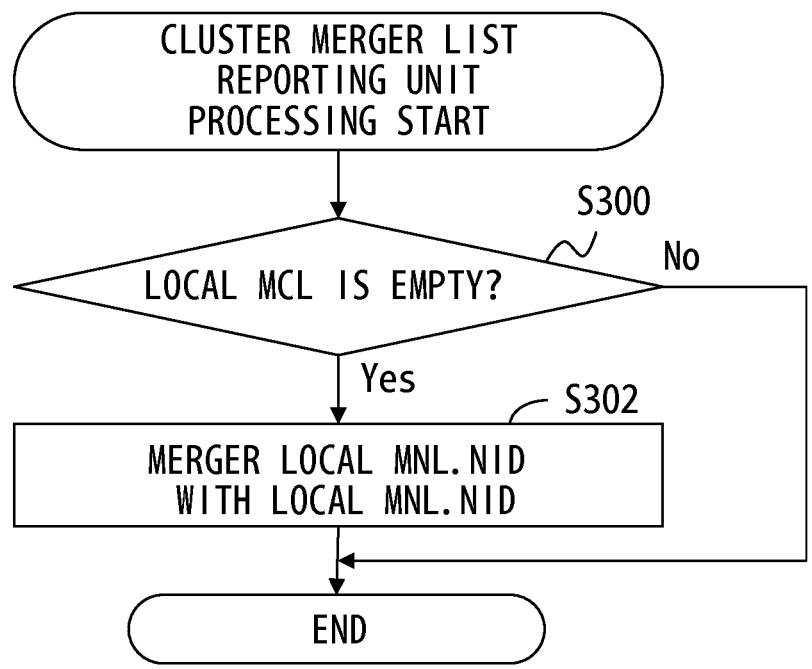
F I G. 38

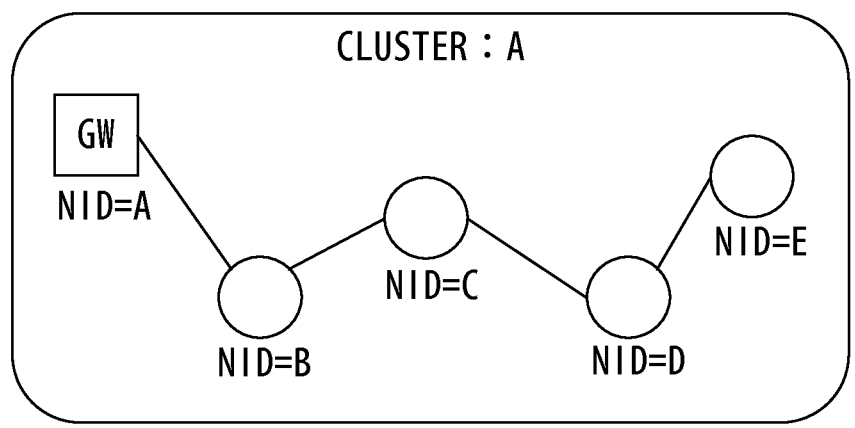
F I G. 40

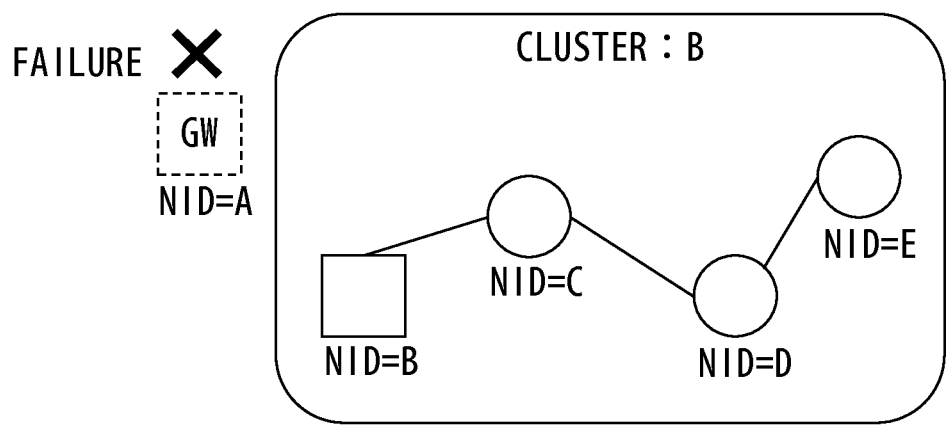
F I G. 4 1

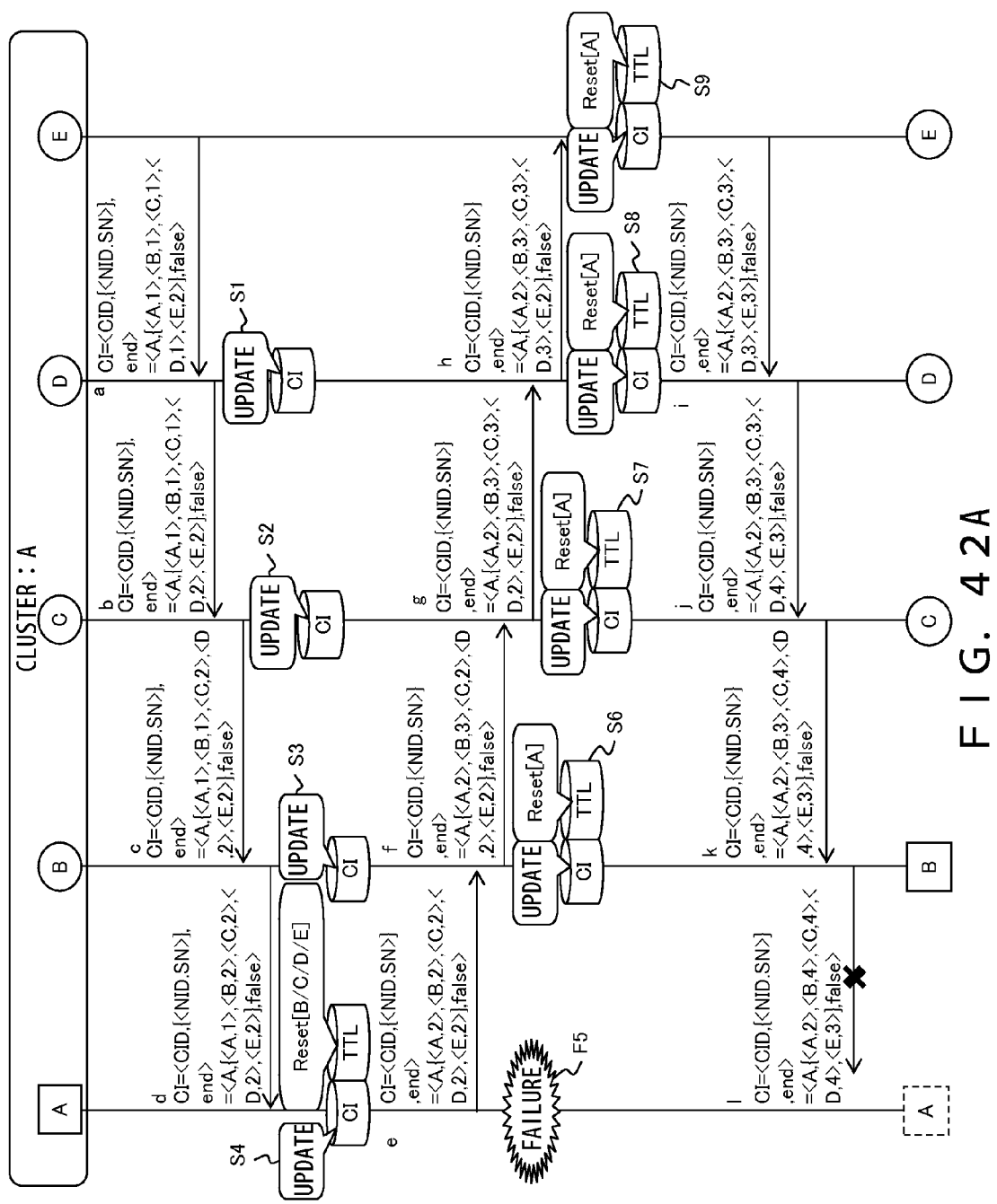
F I G. 42A

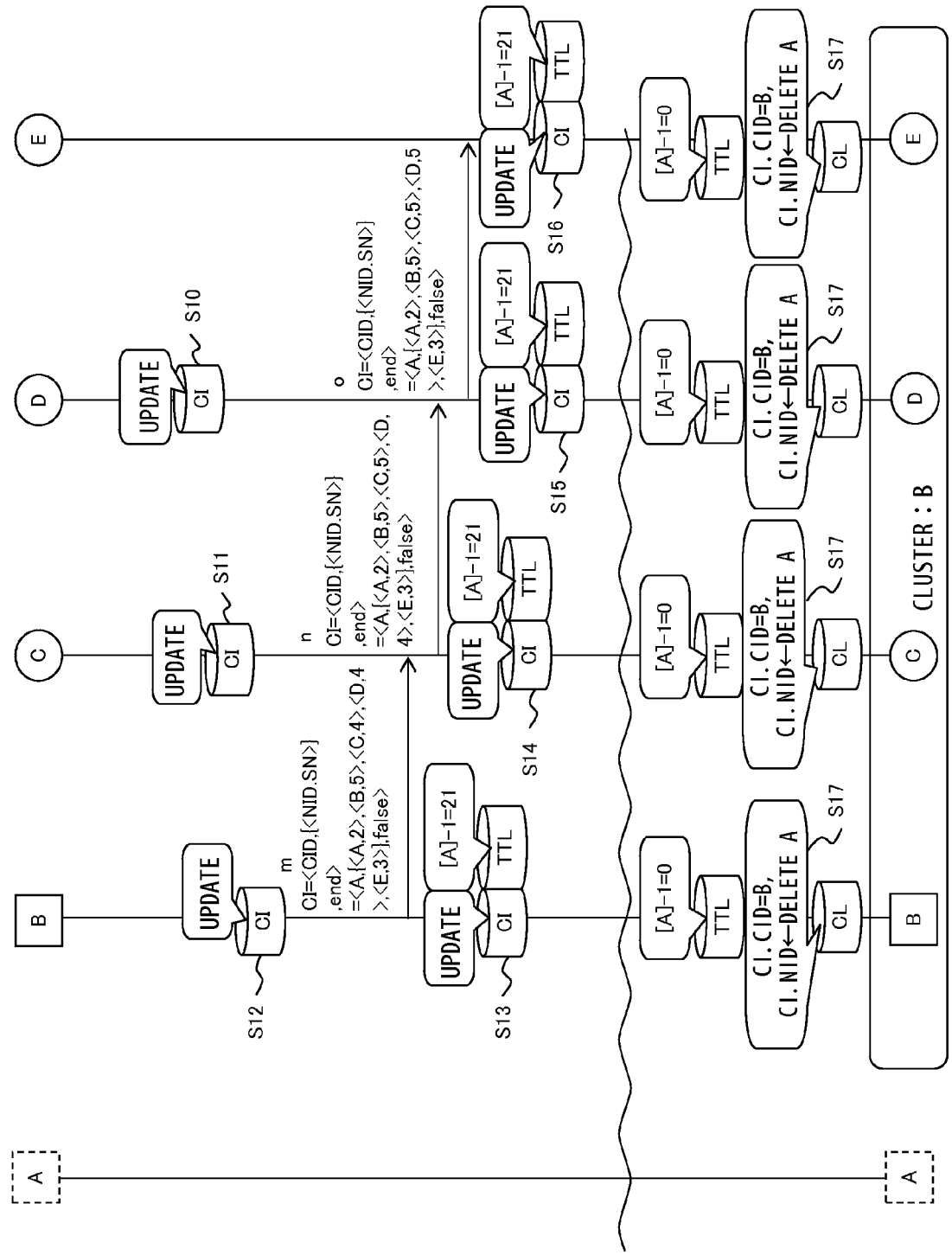
F I G. 42B

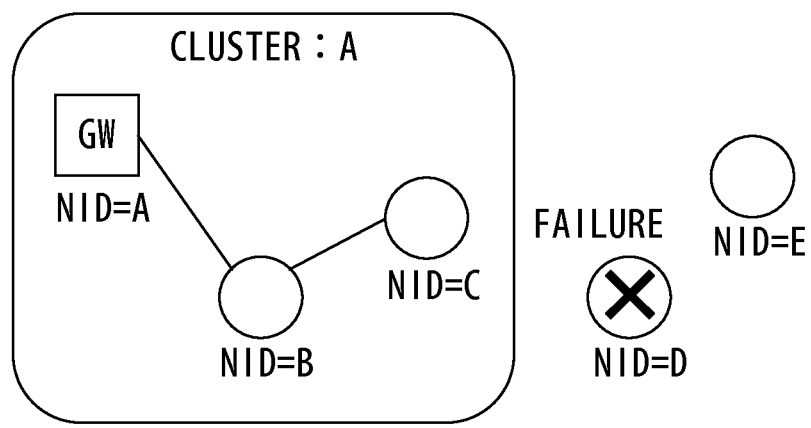
F I G. 4 3

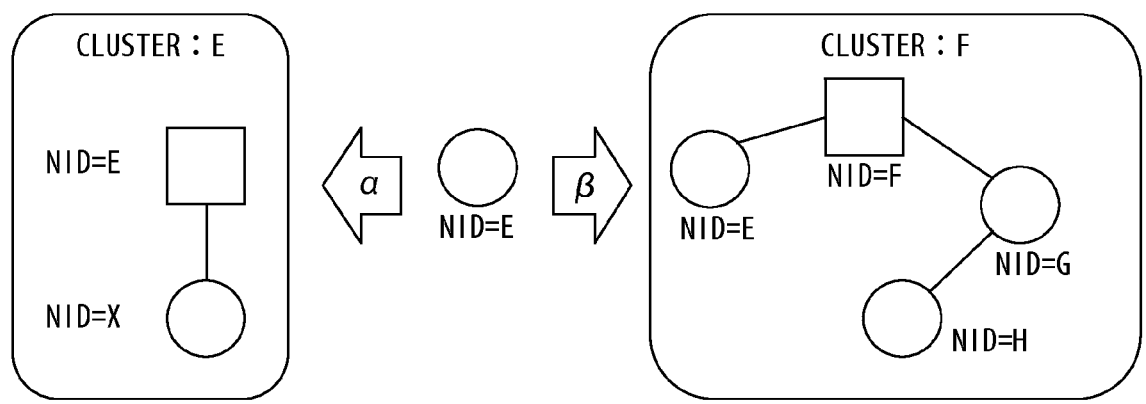
F I G. 44

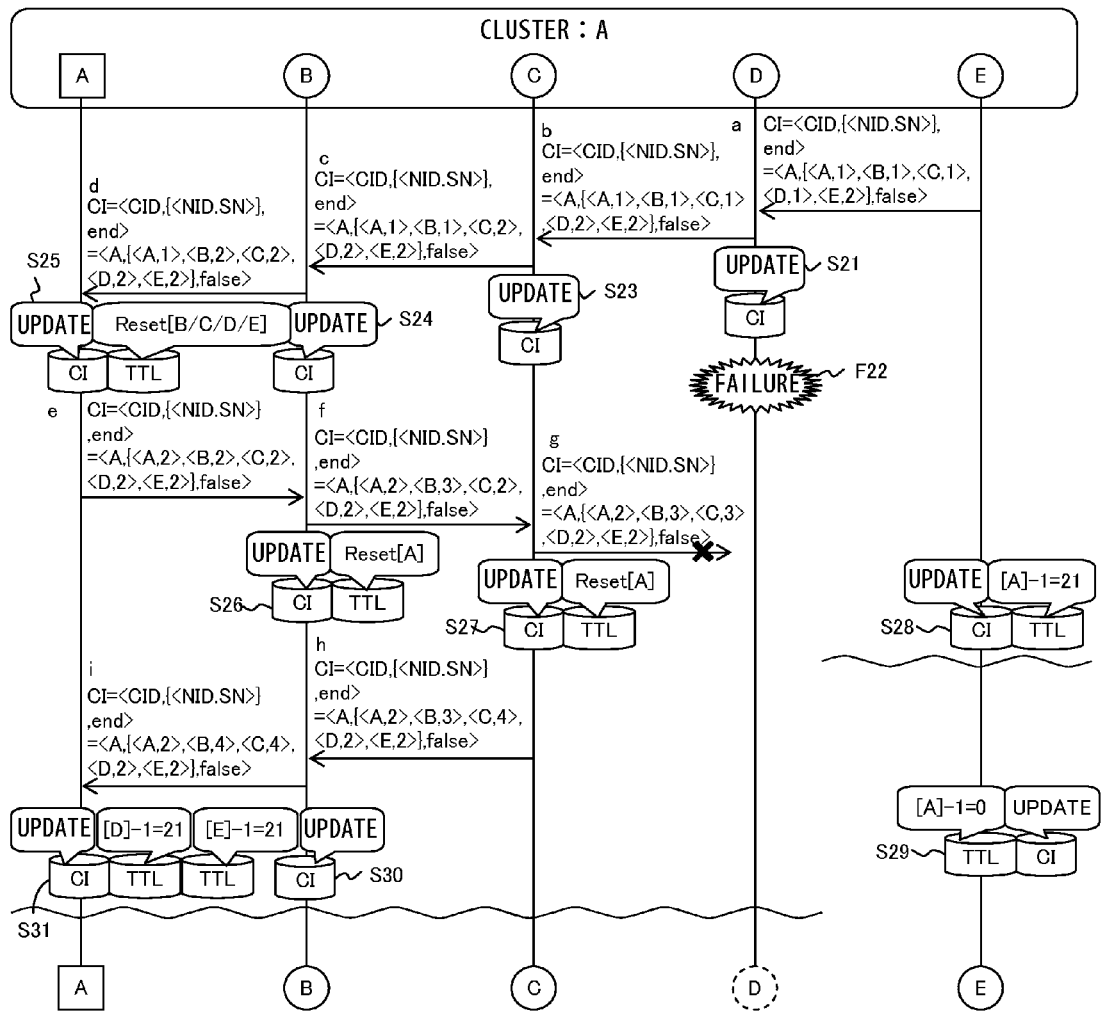
F I G. 45A

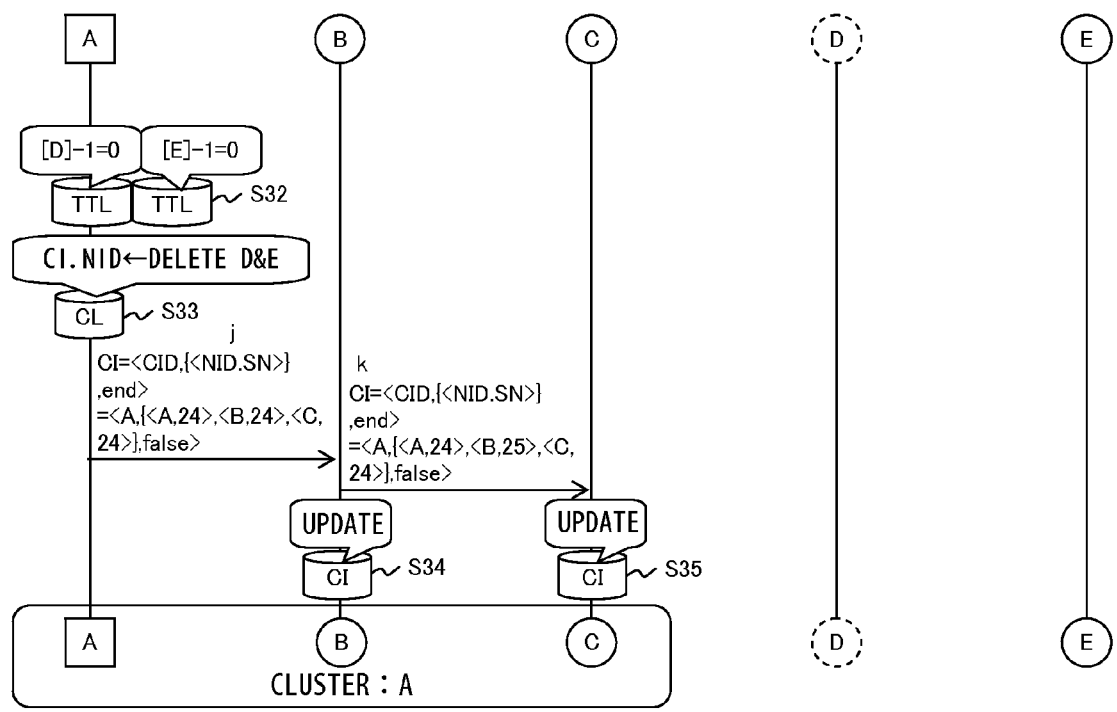
F I G. 45B

NODE APPARATUS AND COMMUNICATION METHOD

CROSS-REFERENCE TO RELATED APPLICATION

This application is a continuation application of International Application PCT/JP2012/062563 filed on May 16, 2012 and designating the U.S., the entire contents of which are incorporated herein by reference.

FIELD

The embodiments discussed herein are related to a network apparatus and a communication method used in a network that includes a plurality of nodes.

BACKGROUND

In an ad hoc network system, ad hoc network communication terminals (node apparatuses, which are also simply referred to as nodes) autonomously establish network connection to enable mutual communication. The term "autonomously" indicates that there is no need to set a communication route for each user each time, and there is no need for dedicated communication terminals or infrastructure for managing the communication performed by servers and routers.

There are known routing protocols for ad hoc networks (ad hoc protocols) including the reactive-type Adhoc On Demand Distance Vector Algorithm (AODV) and the proactive-type Optimized Link State Routing (OLSR).

In the AODV, broadcasting is used to search for a route, and other communication node apparatuses repeat broadcasting to find a route to the destination node apparatus. A communication node apparatus sends out packets called "Route Request (RREQ)" to its surroundings to find the desired route. The communication node ID of the detection target is specified in this packet.

When a communication node apparatus in the surroundings is not the target of the search, it creates a new RREQ packets and repeats broadcasting to its surroundings. At this time, each communication node apparatus records what the message to the destination has been received from which the adjacent communication node apparatus. When the RREQ message reaches the destination communication node, the destination communication node apparatus creates a "Route Reply (PREP)" packet, and it transmits the PREP to the transmission source node in away in which the PREP follows the route through which the RREQ packet was carried. By doing so, a bidirectional communication route is created.

In the OLSR, communication node apparatuses regularly exchange packets with each other to recognize the overall network, and to detect a route to a destination communication node. The communication node apparatuses periodically send out Hello packets to report their existence to each other. When the communication node apparatuses find the existence of a communication node apparatus to be the counterpart of communication, the communication node apparatuses next create a path for flooding called Multi Point Relay (MPR), to efficiently distribute packets throughout the network. The MPR enables efficient broadcasting of packets from each communication node apparatus to the overall network. Next, the node apparatuses deliver to each other Technology Control (TC) packets which are a route creation message by the MPR, so that all of the node apparatuses are able to recognize the network topology. To transmit a packet to a destination communication node apparatus, the transmission-source communication node apparatus refers to the network topology that it has recognized, to give the packet to the adjacent communication node apparatus to which the packet should be transmitted. The adjacent node apparatus performs a similar process. The packet is eventually delivered to the destination node apparatus.

Node apparatuses belonging to a wireless ad hoc network use Hello packets to propagate routing information.

For example, it is assumed that an ad hoc network includes a node apparatus A and a node apparatus B. The node apparatus A creates and periodically broadcasts to its surroundings a Hello packet that includes routing information stored by the node apparatus A. The node apparatus B that received the Hello packet compares routing information stored in the node apparatus B with the information included in the Hello packet, and the node apparatus B obtains information that has not been stored in the node apparatus B. In addition, the node apparatus B also obtains, from the packet, the quality information about the quality of routes, so as to perform communication using a route with as good quality as possible. Thus, node apparatuses belonging to an ad hoc network use Hello packets to learn information of routes to other node apparatuses included in the network and to estimate the optimal route. Then, communication is performed using the estimated optimal route. Each of the node apparatuses included in the ad hoc network stores the routes to all of the other node apparatuses in the ad hoc network in a routing table. For example, the node apparatus A stores, in its routing table, information of the route to each of the node apparatuses other than the node apparatus A in the ad hoc network. Accordingly, the node apparatus A may transmit a data packet to the node apparatus C via the node apparatus B, for example. These node apparatuses may also be equipped with a weighting table that stores weighting information about the node to be the relay destination for each final destination of packets. In this case, when forwarding a packet, the node apparatuses refer to a weighting table that corresponds to the destination node of the packet to identify a node to be the destination to relay the packet.

However, according to the method in which each node apparatus stores routes to all of the other node apparatuses in an ad hoc network in a routing table, an increase the number of node apparatuses in the network causes an expansion in the size of the routing table. Therefore, there is a known method in which node apparatuses in a network are divided into clusters, and each of the node apparatuses stores information of routes to node apparatuses in the same cluster in its routing table.

There is a method in which a control packet is used when generating a cluster from node apparatuses in a network. For example, according to route information, each node determines a cluster to join, and each node transmits and receives a control packet when participating in a cluster and when leaving a cluster. Generally, another cluster is formed when forming a cluster and the number of nodes in the cluster exceeds a prescribed value.

In addition, there is also a known method in which a Hello packet is used instead of the control packet.

In an ad hoc network system, there is a problem in that when failures such as hardware faults, radio wave troubles, power outages and the like occur during the operation of the system, there is no means to recover from functional failures in the cluster. For example, there is a problem in that it is impossible to maintain the cluster formation function and the cluster merger function in the normal way. There is a problem in that continued functional failures in the cluster lead to an increase in the number of clusters in the overall network which causes an increase in the number of what a route extend over different clusters when routing. Accordingly, many processing resources are required, which leads to a lower throughput.

[Patent document 1] Japanese Laid-open Patent Publication No. 2011-193341

SUMMARY

According to an aspect of the embodiments, a node apparatus in a network including a plurality of node apparatuses includes a cluster information memory configured to store information related to node apparatuses included in a cluster which is a group of node apparatuses for which the node apparatus stores route information related to a route for information communication in the network, the information being also related to an origin node that is an origin of the cluster, among the plurality of node apparatuses in the network; a TTL memory configured to store a TTL value defined as an integer value for a first node apparatus that is included in the cluster and that is different from the node apparatus, the TTL value having a prescribed default value; a receiving unit configured to receive a first Hello packet and a second Hello packet including a sequence number that is defined for the first node apparatus and that is counted up every time when the first node apparatus transmits a Hello packet used to report the route information, the first Hello packet and the second Hello packet being transmitted by the first node apparatus at different timings; a sequence number judging unit configured to judge whether a first sequence number for the first node apparatus included in the first Hello packet and a second sequence number for the first node apparatus included in the second Hello packet received by the receiving unit match each other; a TTL decrementing unit configured to perform a process to decrement the TTL value stored in the TTL memory, when the first sequence number and the second sequence number are identical according to a judgment by the sequence number judging unit; and a cluster information updating unit configured to separate the first node apparatus from the cluster by deleting an identifier of the first node apparatus from the cluster information memory, when the TTL value for the first node apparatus becomes equal to or smaller than a prescribed value.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a diagram illustrating an example of an ad hoc network in which clusters are formed;

FIG. 2 is a diagram explaining a trouble caused when a failure occurs in an origin node during cluster generation;

FIG. 3 is a diagram explaining the outline of a cluster formation process to form clusters in stages;

FIG. 4 is a diagram explaining a trouble caused when a failure occurs in an origin node during cluster merger;

FIG. 6 is a diagram explaining another trouble caused when a failure occurs in a participant node during cluster merger;

FIG. 7 is a functional block diagram illustrating an example of the configuration of a node apparatus;

FIG. 8 is a diagram illustrating an example of the format of a Hello packet;

FIG. 10 is a diagram illustrating an example of a first Hello packet that is broadcast according to a node monitoring process;

FIG. 11 is a diagram illustrating examples of the TTL of an origin node and the TTL of participant nodes;

FIG. 13 is a diagram explaining an example of a change in cluster information (CI) according to a cluster autonomous reproduction process;

FIG. 14 is a diagram explaining examples of changes in the TTL of an origin node and the TTL of participant nodes;

FIG. 15 is a diagram explaining another example of the change in cluster information (CI) according to a cluster autonomous reproduction process;

FIG. 16 is a diagram explaining the outline of a cluster autonomous restoration process;

FIG. 17 is a diagram explaining another example of the change in cluster information (CI) according to a cluster autonomous restoration process;

FIG. 18 is a diagram illustrating an example of the TTL of an origin node;

FIG. 19 is a diagram illustrating an example of a cluster information (CI) field of a Hello packet that is broadcast according to a cluster autonomous restoration process;

FIG. 21 is a diagram explaining the outline of a cluster merger priority decision process;

FIG. 22 is a diagram explaining the outline of a cluster merger destination candidate reporting process;

FIG. 24 is a diagram explaining the outline of a cluster merger request accepting process;

FIG. 25 is a diagram explaining the outline of a cluster merger completion process;

FIG. 26 is a functional block diagram illustrating an example of the configuration of a node apparatus;

FIG. 27 is a flowchart illustrating an example of the flow of processing in a node type judging unit.

FIG. 30 is a flowchart illustrating an example of the flow of processing in a cluster generating unit;

FIG. 33 is a flowchart illustrating an example of the flow of processing in a cluster merger request receiving unit;

FIG. 35 is a flowchart illustrating an example of the flow of processing in a cluster merger list generating unit;

FIG. 37 is a flowchart illustrating an example of the flow of processing in a cluster merger list reporting unit;

FIG. 38 is a flowchart illustrating another example of the flow of processing in a cluster merger list reporting unit;

FIG. 40 is a diagram illustrating an example of the topology of a network before cluster autonomous reproduction and restoration processes.

FIG. 41 is a diagram illustrating an example of the topology of a network after a cluster autonomous reproduction process.

FIGS. 42A and 42B are a diagram illustrating an example of the process sequence in a cluster autonomous reproduction process.

FIG. 43 is a diagram illustrating an example of the topology of a network after a cluster autonomous restoration process.

FIG. 44 is a diagram illustrating the outline of the operations of a free node after a cluster autonomous restoration process.

FIGS. 45A and 45B are a diagram illustrating an example of the process sequence in a cluster autonomous restoration process.

DESCRIPTION OF EMBODIMENTS

Figure 5:
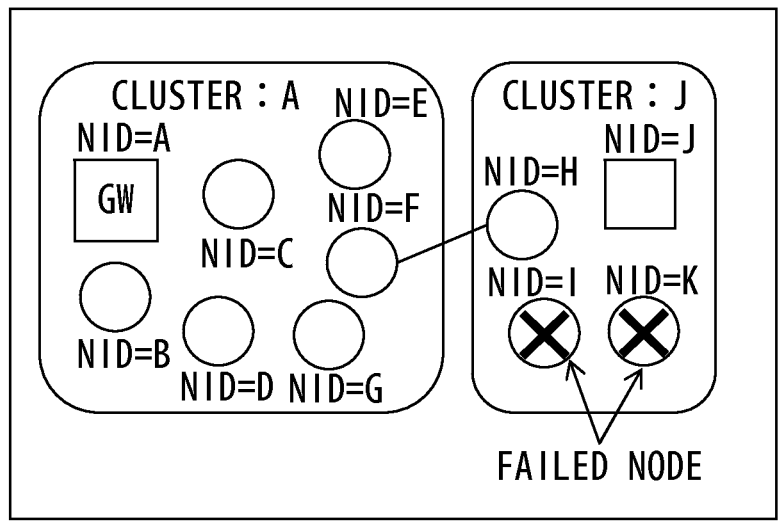
FIG. 5 is a diagram explaining a trouble caused when a failure occurs in a participant node during cluster merger.

Hereinafter, referring to the drawings, a node apparatus 100 of an ad hoc network is explained. The node apparatus 100 monitors node apparatuses in a cluster to which the node apparatus 100 belongs, and when a node failure in the cluster is detected, each node apparatus operates in an autonomously-distributed manner so as to perform autonomous reproduction or autonomous restoration of the cluster.

The node apparatus 100 is configured as follows. The node apparatus 100 manages its sequence number and performs an addition to the sequence number when it transmits a Hello packet. In addition, the node apparatus 100 manages, as cluster information, the sequence numbers of the node apparatuses other than the node apparatus 100 in the cluster to which it belongs, the sequence number being received periodically in a prescribed cycle. Then, the node apparatus 100 checks the sequence number at each cycle of the Hello packet, and when there is no change, the node apparatus 100 performs decrements a value managed as "the TTL (Time To Live)", and when there is a change, the node apparatus 100 resets the value of "the TTL" to an initial value. When the value of the TTL becomes 0, it is determined that a failure has occurred in the node. The node apparatus whose TTL has becomes 0 is separated from the cluster, and after that, a cluster autonomous reproduction process or a cluster autonomous restoration process may be performed so as to avoid a situation in which it is impossible to perform a merger process between clusters. Thus, in the node apparatus and the communication method described below, even when it is impossible to merge clusters due to an occurrence of a failure in an origin node (gateway) or in a participant node during cluster formation, each node operates in an autonomously-distributed manner, so that autonomous reproduction or autonomous restoration may be performed.

After explaining a comparison example using FIG. 1, the configuration and operations of the node apparatus 100 are explained with reference to FIG. 2 through FIG. 45B.

<Comparison Example>

FIG. 1 is a diagram illustrating an example of an ad hoc network in which clusters are formed. In FIG. 1, 50 node apparatuses N1 through N50 identified with ID numbers 1 through 50 in the drawing are included. A simple term "node" may also be used to refer to the node apparatus. Among these node apparatuses, adjacent node apparatuses are connected with a solid line. In addition, when a node ID is specified by a number x, the node apparatus may be simply referred to as a node apparatus Nx, or as a node Nx. In addition, when the node ID is specified by a character y instead of a number, the node apparatus may be simply referred to as a node apparatus y, or as a node y. In addition, the term "node ID" may be abbreviated as NID.

Here, the term "adjacent" indicates that a plurality of node apparatuses are located within a range in which they are able to transmit and receive packets to and from each other. More specifically, node apparatuses located within a range in which they are able to transmit and receive packets to and from each other with the hop count=1 may be referred to as adjacent node apparatuses. When two node apparatuses are adjacent, these two node apparatuses are connected by a "link". In addition, a node apparatus located within a range in which it is able to receive packets transmitted from a given node apparatus may be referred to as an "adjacent node apparatus" or an "adjacent node" of this given node apparatus.

An example of each node apparatus is a sensor. In this case, the ad hoc network is also referred to as a sensor network. The connection between nodes by a link may be either wired or wireless.

Each node apparatus has unique identification information (Identification, ID). The node ID may be the MAC address, or it may be a code including alphabets or numbers or any combination thereof assigned separately from the MAC address. Each node apparatus has not necessarily recognized information about which node apparatuses are adjacent to each other, information of the communication state between the node apparatuses, or information about the overall network. Therefore, each node regularly performs, with its adjacent node, transmission and reception of messages such as Hello messages that include route information and node information such as information of the communication quality between nodes in order to learn how the node apparatus itself is connected to other nodes. Each node transmits Hello messages at intervals of several seconds, for example. According this exchange of messages, search for a route to the final destination and calculation of the communication quality of each route are performed, and the results are used to establish a plurality of routes to the final destination and to decide the optimal route. That is, a Hello message includes route information between a node that transmits the message and its adjacent nodes, and node information such as communication quality information for links between the nodes. For example, a Hello packet transmitted from a given node apparatus is received by an adjacent node apparatus of the transmission-source node apparatus. The Hello packet is used to report route information in the network.

The example illustrated in FIG. 1 has been formed using a method in which a new cluster is formed when the number of nodes in a cluster exceeds 10. In this case, in order to minimize the number of clusters in the overall network, the node apparatuses may be divided into 50/10=5 clusters. However, in FIG. 1, eight clusters C1 through C8 are formed.

Each of the clusters C1 through C8 respectively includes cluster heads N1, N13, N25, N30, N35, N38, N44, and N46. In addition, the cluster C1 includes node apparatuses N1 through N10. The cluster C2 includes node apparatuses N11 through N20. The cluster C3 includes node apparatuses N21 through N25, the cluster C4 includes node apparatuses N26 through N30. the cluster C5 includes node apparatuses N31 through 35, and the cluster C6 includes node apparatuses N36 through N39. The cluster C7 includes node apparatuses N41 through N45, and the cluster C8 includes node apparatuses N46 through N50.

Here, the "cluster head" is a node apparatus that starts the formation of a cluster and that becomes an origin of the formation of the cluster including the cluster head itself. The cluster head may also be referred to as an "origin node" or a "gateway (GW)".

For example, it is assumed that the node apparatus N1 with the ID number 1 starts cluster generation. It is assumed that, at this point in time, the node apparatus N2 through the node apparatus N50 do not belong to any cluster. Such a node apparatus that does not belong to any cluster may be referred to as a "free node".

The origin node transmits by broadcast transmission a Hello packet including the identifier of the cluster (C1, C2, . . . , C8, etc. in FIG. 1) that is being generated by the origin node and the identifiers of node apparatuses (in the case of the cluster C1 in FIG. 1, the ID numbers 1 through 10 representing the node apparatuses). A free node recognizes the identifier of the cluster being generated, according to the Hello packet transmitted from the origin node. When a free node joins a cluster, it generates a Hello packet including information in which the identifier of the cluster in which the free node is about to join and the identifier of the free node itself are associated, and it transmits the generated Hello packet by broadcast transmission. For example, a case is assumed in which the node apparatus N1 generates a cluster as the origin node. It is assumed that the node apparatus N2 through the node apparatus N50 are still a free node. In FIG. 1, the node apparatus 2, the node apparatus N3, the node apparatus N4, the node apparatus N6, and the node apparatus N7 that are adjacent to the node apparatus 1 recognize that the cluster C1 is being formed, by receiving a Hello packet transmitted from the node apparatus N1 that is the origin node. The node apparatuses N2, N3, N4, N6, and N7 are a free node that does not belong to any cluster, and therefore, upon recognizing the identifier of the cluster C1, they decide to participate in the cluster C1. When the node apparatus N2 in FIG. 1 joins the cluster C1, the node apparatus N2 generates a Hello packet including information in which the identifier C1 of the cluster in which the node apparatus N2 is about to join and the identifier N2 of the node apparatus N2 are associated, and the node apparatus N2 transmits the generated Hello packet by broadcast transmission.

When an identifier of the node apparatus is reported in association with the identifier of the cluster C1 being generated, the origin node N1 recognizes that it received a request for participating in the cluster C1. Then, according to the received Hello packet, the node apparatus N1 that is the origin node recognizes the node apparatus that is about to join the cluster C1 being generated, and the node apparatus N1 adds the recognized node apparatus to the cluster. The node apparatus added to the cluster confirms that the node apparatus has been added to the cluster, according to a Hello packet from the origin node. A node apparatus that has joined a cluster may be referred to as a "participant node". A participant node transmits by broadcast transmission a Hello packet including the identifier of the cluster that the participant node has joined. Upon recognizing the identifier of a cluster being generated according to a Hello packet generated by the participant node, a free node participates in the cluster through the procedure described above. These processes are repeated until the number of node apparatuses included in the cluster reaches a threshold.

In FIG. 1, the clusters C1 through C8 are generated using a method in which information used for the generation of the cluster is transmitted and received using a Hello packet, and in which, when the number of the node apparatuses included in the cluster reaches a threshold, another cluster is generated.

The cluster C1 in FIG. 1 is a cluster that has been generated with the node apparatus N1 as the origin node, in a state in which the node apparatus N2 through the node apparatus N50 are a free node and the threshold of the number of the node apparatuses included in the cluster is 10.

When the number of node apparatuses included in the cluster reaches the threshold, the origin node transmits by broadcast transmission a Hello packet including information for requesting generation of a new cluster (generation information). A participant node that received a generation request generates a Hello packet including the received generation request and the participant node transmits the Hello packet by broadcast transmission. A free node that received a Hello packet including a generation request operates as a new origin node and starts generation of a cluster. In FIG. 1, the node apparatuses N13, N30, N35, and N38 start generation of the clusters C2, C4, C5, and C6, respectively. The procedure after the start of the generation of the cluster is the same as the procedure for the generation of the cluster C1. When the cluster has been formed, the respective node apparatuses store, in its routing table, the routes to the other node apparatuses in the same cluster.

With the formation of clusters as described above, there is no need for the respective node apparatuses to store the routes to all of the node apparatuses included in an ad hoc network. Therefore, the size of the routing table in the respective node apparatuses is smaller compared with the case in which the ad hoc network is not divided into clusters. Accordingly, the load on the respective apparatuses caused by storing route information is also reduced. In addition, information used for formation of a cluster is transmitted and received using a Hello packet, and therefore, the consumption of the band due to the transmission and reception of information performed for the generation of the cluster is smaller compared with the case in which other packet, such as control packets are used.

However, in the example in FIG. 1, there is a problem in that when failures such as hardware faults, radio wave troubles, power outages and the like occur during its operation, there is no means for recovery from functional failures in the cluster. Functions of the cluster include, for example, a cluster generation function and a cluster merger function. The cluster generation function is a function with which an origin node makes the cluster grow by taking in other node apparatuses until the first stage is completed. Meanwhile, the cluster merger function is a function with which a plurality of clusters is merged to generate one cluster.

With reference to FIG. 2, an example of a case in which a failure occurs in a node apparatus in a cluster is explained.

FIG. 2 is a diagram explaining a situation in which a failure occurs in the origin node during cluster generation, making it impossible for some nodes to participate in the cluster.

A cluster A includes node apparatuses A, B and C. There are node apparatus D and a node apparatus E around the cluster A. They are free nodes and they are wishing to participate in the cluster A. However, it is described that while the node apparatus C in the cluster A receives a Hello packet from the node apparatus D requesting for participation in the cluster A and the node apparatus C tries to report it to the node apparatus A which is the origin node, it is impossible for the node apparatus D to join the cluster A because a failure has occurred in the node apparatus A which is the origin node. In a similar manner, while the node apparatus B in the cluster A receives a Hello packet from the node apparatus E requesting for participation in the cluster A and the node apparatus B tries to report it to the node apparatus A which is the origin node, it is impossible for the node apparatus E to participate in the cluster A because a failure has occurred in the node apparatus A which is the origin node.

<General Explanation>

Then, with node apparatuses in an ad hoc network according to the embodiment disclosed herein, the respective node apparatuses in a cluster mutually monitor the node apparatuses in the cluster, and when a node failure is detected in the cluster, each node operates in an autonomously-distributed manner, so as to perform reproduction of the cluster autonomously (autonomous reproduction) or restoration of the cluster autonomously (autonomous restoration). In addition, the monitoring of nodes in the cluster, the autonomous reproduction of the cluster, and the autonomous restoration of the cluster are performed using only the Hello packets transmitted normally at regular intervals. Therefore, they may be performed with less network load compared with the load according to the method using control packets. As a result, it becomes possible to achieve reduction of the network load and reduction of memory consumption as effects originally expected with clustering, and it becomes possible to stabilize the throughput of the network by maintaining the cluster functions and by constantly keeping and configuring the cluster in an appropriate state.

In order to perform autonomous reproduction and autonomous restoration, a node apparatus according to the embodiment is equipped with the following functions.

(F1) When a node apparatus is the origin node, the node apparatus monitors all the participant nodes in the cluster, and the node apparatus stores and manages the TTL (Time To Live) of all the participant nodes.

(F2) When a node apparatus is a participant node, the node apparatus monitors the origin node in the cluster, and the node apparatus stores and manages the TTL of the origin node.

(F3) Each node apparatus manages the sequence number (Sequence Number: SN) of the node apparatus itself (hereinafter, the term "local node" may be used), and the node apparatuses counts up the sequence number (adds 1 to the current value of SN) with each transmission of the Hello packet.

(F4) As the TTL, a variable value is set for each node apparatus, the value being pegged to weighting consisting of the distance according to the hop count, the quality according to the arrival interval of packets, and the like.

(F5) Each node apparatus stores the sequence number (Sequence Number: SN) of the node apparatuses in cluster information (CI), and each node apparatus updates the sequence number upon receiving a Hello packet.

(F6) Each node apparatus propagates the cluster information (CI) stored in the local node using a Hello packet.

(F7) When the local node is the origin node and there is an update in the SN of a monitoring-target participant, the node apparatus resets the TTL of the corresponding participant node.

(F8) When the local node is a participant node and there is an update in the SN of the origin node in the monitoring-target node apparatuses, the node apparatus resets the TTL of the corresponding participant node.

(F9) Each node decrements the TTL stored and managed by it periodically, for example, with each transmission of the Hello packet.

(F10) When the local node is the origin node and the TTL of a monitoring-target participant node becomes 0, that is, when the TTL=0, the node apparatus deletes the target node from the cluster information (CI).

(F11) When the local node is a participant node and the origin node the TTL in the monitoring-target node apparatuses becomes 0, that is, when the TTL=0, if the number of nodes in the cluster is equal to or greater than a certain number (for example, 50% or more of the number of node apparatuses that may be included in the cluster (the maximum number of cluster nodes)), the node apparatus selects one of the node apparatuses in the cluster and rewrites the identifier (CID) identifying the cluster into the identifier (NID) of the selected node apparatus. The node apparatus selected at this time may be the one whose node identifier is the smallest number, when the identifiers of the node apparatuses are expressed in numbers. As a result, the cluster is reproduced with a new cluster ID.

(F12) When the local node is a participant node and the TTL of the origin node in the monitoring-target node apparatuses becomes 0, that is, when the TTL=0, if the number of nodes in the cluster is smaller than a certain number (for example, smaller than 50% of the number of node apparatuses that may be included in the cluster (the maximum number of cluster nodes)), the node apparatus dissolves the cluster autonomously by clearing the cluster information (CI), and it becomes a free node. Then, as a free node, it participates in a cluster or generates a cluster.

As described above, each node apparatus manages the sequence number (SN) of the node apparatus itself, and each node apparatus increments the sequence number (SN) when it transmits a Hello packet. Each node apparatus manages the sequence number (SN) of the node apparatuses received periodically as cluster information (CI). For example, the sequence number (SN) is checked at each cycle of the packet, and when there is no change, the value managed as the TTL (Time To Live) is decremented, and when there is a change, that is, when there is an increase, the value of the TTL is reset to the initial value. When the value of the TTL becomes 0, it is determined that a failure has occurred in the node.

Then, when a failure occurs in the original node (the gateway, the cluster head) or in a participant node during generation of a cluster, the respective nodes operate in an autonomously-distributed manner to perform autonomous reproduction or autonomous restoration of the cluster, making it possible to continue the generation of the cluster.

Furthermore, when the size of the cluster to which node apparatus having a failure belong is large (when the cluster includes a large number of node apparatuses), dissolving and rebuilding of the cluster leads to a high possibility that the cluster generation may be performed using the participant nodes before the dissolution. However, generation of the cluster takes time because there are a large number of node apparatuses. For this reason, when the size of the cluster is large, it is more efficient to change only the origin node to change the cluster to another one without dissolving the cluster.

On the other hand, when the size of the cluster is small (when the cluster does not include a large number of node apparatuses), even if the cluster is dissolved and the participant nodes become free nodes, there is a high possibility that they may be taken in by surrounding clusters. Therefore, the number of clusters may be reduced by dissolving the cluster that includes the node apparatus having a failure, to let node apparatuses that have participated in the cluster become free nodes.

The node apparatuses of the ad hoc network the node apparatuses have the functions (F11) and (F12), and therefore, the node apparatuses are configured so as to generate a cluster in two stages when a plurality of node apparatuses gather, namely a cluster generation process as the first stage and a cluster merger process as the second stage. The first stage of the cluster formation process to form a cluster in two stages is referred to as a "cluster generation process", and the second stage of the cluster formation process is referred to as a "cluster merger process". The "cluster generation process" or the "cluster merger process" after an occurrence of a failure in the origin node of a cluster in the network is referred to as a "cluster autonomous reproduction process". Meanwhile, the "cluster generation process" or the "cluster merger process" after an occurrence of a failure in a participant node, that is, a node apparatus that is not the origin node in a cluster in the network is referred to a "cluster autonomous reproduction process".

In a case in which a failure occurs in a node apparatus, when the number of node apparatuses in the cluster to which the node apparatus having the failure belongs is equal to or greater than a prescribed ratio to the maximum number of cluster nodes, a cluster merger process is performed for the cluster to which the node apparatus having the failure belongs. On the other hand, when the number of node apparatuses in the cluster to which the node apparatus having the failure belongs is smaller than a prescribed ratio to the maximum number of cluster nodes, the cluster is dissolved and the cluster generation process is performed.

Meanwhile, the node apparatuses of the ad hoc network form a cluster in two stages, even when no failure has occurred in the node apparatuses that form the network.

FIG. 3 is a diagram explaining the outline of a cluster formation process to form a cluster in stages. a diagram on the left of FIG. 3 is a diagram explaining an example of the result of the cluster generation process as the first stage of the cluster formation process to form a cluster in stages, a diagram in the center of FIG. 3 is a diagram explaining the outline of the cluster merger process as the second stage of the cluster formation process, a diagram on the right of FIG. 3 is a diagram explaining an example of the result of the cluster merger process as the second stage of the cluster formation process. Hereinafter, the diagram on the left of FIG. 3 may be simply referred to as FIG. 3A. In addition, the diagram in the center of FIG. 3 may be simply referred to as FIG. 3B. Further, the diagram on the right of FIG. 3 may be simply referred to as FIG. 3C.

Hereinafter, the process to make a cluster from a plurality of node apparatuses including the cluster generation process and the second stage may be referred to as "cluster formation", and the process in the cluster merger process in which an origin node takes in other node apparatuses and makes the cluster grow until the first stage is completed may be referred to as "cluster generation".

As illustrated in FIG. 3A, in the first stage, the cluster generation process is performed in which a cluster is generated and grown in a way in which the upper limit of the number of nodes in the cluster is equal to or smaller than a prescribed threshold of the maximum number of cluster nodes, for example, equal to or smaller than 50% of the maximum number of cluster nodes. The number of cluster nodes at the time of completion of the first stage may be referred to as the tentative maximum number of cluster nodes. That is, even when the number of nodes in the cluster has not reached the maximum number of cluster nodes and there is still room to grow the cluster, the growth of the cluster is purposely not carried on. At the time of completion of the first stage, the routing table is not filled with information about node apparatuses corresponding to the number of the maximum cluster nodes. Therefore, merger is possible with a cluster in which the number of node apparatuses included is smaller than the number of node apparatuses that may be stored in the unfilled portion in the routing table, or addition of node apparatuses is possible. After that, the process moves on to the second stage to perform the cluster merger process to merge the clusters generated in the first stage. The cluster growth process in the first stage is performed using only the exchange of Hello packets, as described later.

In the first stage, the node apparatuses of the network recognize the adjacent node apparatuses by transmission and reception of Hello packets, and after that, around the cluster head (the origin node), free nodes are taken in to increase the number of nodes in the cluster. When the number of nodes in the cluster reaches a prescribed value, the growth of the cluster is stopped. Then, a free node around the cluster becomes an origin node to generate a cluster, and remaining free nodes are taken into the cluster. These procedures including the generation and the growth of clusters are repeated until no free node is left.

The ratio of the number of cluster nodes at the time of completion of the first stage (the tentative maximum number of cluster nodes) with respect to the maximum number of cluster nodes is set relatively high, as 75%, 80% or the like for example, when priority is given to the speed of the generation of clusters. Meanwhile, the ratio is set low, as 40%, 35% or the like for example, when priority is given to the uniformity of the number of clusters in clusters (the cluster grain size). The ratio of the tentative maximum number of cluster nodes with respect to the maximum number of cluster nodes is not limited to the values mentioned above.

The merger process in the second stage starts after a prescribed period of time has elapsed from the point in time from which there are no more participation requests from free nodes to the node apparatuses. That is, the respective node apparatuses take an interval of a certain period of time, and when there is no change in the number of node apparatuses belonging to the cluster within the interval, they determine that the cluster formation has stabilized, and the process moves on to the process of cluster merger.

When it is possible to merge the cluster that has moved on to the cluster merger process with an adjacent cluster, the merger is performed. The prescribed period of time depends on the number of nodes in the cluster, and the smaller the size of the cluster is, that is, the smaller the number of nodes included in the cluster is, the shorter the prescribed period of time may be set. Therefore, a cluster of a smaller size moves on to the cluster merger process first, and accordingly, there is a higher possibility for a cluster of a smaller size to be taken into another cluster.

In FIG. 3B, the cluster 4 is merged into the cluster 1, the cluster 6 and the cluster 7 are merged into the cluster 3, the cluster 8 is merged into the cluster 5, and the cluster 10 is merged into the cluster 9. The cluster merger process in the second stage starts from a cluster of a smaller size. In the first stage, the cluster is generated in away in which the upper limit of the number of nodes in the cluster (the tentative maximum number of cluster node) is a prescribed threshold of the maximum number of cluster nodes, for example, 50%, and therefore, a cluster of a small size is merged into a larger cluster. In FIG. 3B, the number of clusters changes to 5 from 10 before the merger. The cluster merger process in the second stage is also performed only using the exchange of Hello packets as described later.

The respective nodes may skip the cluster generation stage and may start from the cluster merger stage. In this case, the respective node apparatuses constitute a cluster with the smallest cluster grain size, that is, with the number of node in the cluster being 1. In this case, all node apparatuses start the cluster merger process simultaneously with the launch of the node apparatuses. In the other words, the respective nodes functions as the origin node of a cluster consisting of one node.

FIG. 3C illustrates five clusters generated as a result of the cluster merger process in the second stage from a state in which there are ten clusters generated as a result of the cluster generation process in the first stage.

When a cluster is formed in two stages as described above, a failure may occur in a node apparatus during the cluster merger process. In the explanation below, a cluster whose origin node has x as its identifier NID is referred to as a cluster x.

Examples of failures are explained with reference to FIG. 4 through FIG. 6.

FIG. 4 illustrates a case in which a failure occurs in the origin node while the cluster merger process is performed. FIG. 4 illustrates a case in which, when an attempt is being made to merge a cluster A including node apparatuses A, B and C and a cluster E including node apparatuses D and E, a failure occurs in the node apparatus E which is the origin node of the cluster E. In this case, when information of clusters that may be merged with the cluster E (for example, information included in a cluster merger destination candidate report described later) does not reach the node apparatus E, it is impossible for the cluster E to determine which cluster to merge with, making it impossible to merge the cluster A and the cluster E.

FIG. 5 illustrates a case in which a failure occurs in a participant node while the cluster merger process is performed. In FIG. 5, it is assumed that the maximum number of cluster nodes is 10. That is, it is assumed that the number of nodes that the cluster may eventually include is 10. A cluster A illustrated in FIG. 5 includes seven node apparatuses A through G, and a cluster J includes four node apparatuses H through K. Then, it is assumed that a failure occurs in the node apparatus I and in the node apparatus K. Then, according to the number of only the operating node apparatuses, it is possible to merge the cluster A and the cluster J, but including the node apparatus I and the node apparatus K having a failure, the maximum number of cluster nodes is exceeded and it is impossible to merge the clusters.

FIG. 6 illustrates a case in which a failure occurs in a participant node while the cluster merger process is performed. In FIG. 6, a cluster A includes three node apparatuses A through C, and a cluster E includes three node apparatuses D through F. Then, a failure occurs in the node apparatus F in the cluster E. In this case, the cluster merger request from the cluster A to the cluster E does not reach the node apparatus F, making it impossible to register the node apparatus F as a node apparatus included in the cluster E. Then, when checking the list of node apparatuses of the cluster E at the cluster A side, the number of the node apparatuses that are originally supposed to be included in the cluster E from the number of node apparatuses in the cluster E actually obtained using the exchange of Hello packets in the cluster E do not match, making it impossible to merge the clusters.

The node apparatuses described below are equipped with the functions (F1) through (F12), making it possible to overcome the troubles illustrated in FIG. 4 through FIG. 6.

<Configuration of the Node Apparatus>

Hereinafter, a node apparatus 100 equipped with the functions (F1) through (F12) described above are explained.

The node apparatus 100 is equipped with means to monitor node apparatuses in the cluster to which the node apparatus 100 (hereinafter, it may be referred to as a local node) belong (hereinafter, the cluster may be referred to as a local cluster), and to perform autonomous reproduction or autonomous restoration of the local cluster only using Hello packets when an occurrence of a failure in a node apparatus in the local cluster is detected.

The monitoring of nodes in the cluster, the autonomous reproduction of the cluster, and the autonomous restoration of the cluster are performed using only Hello packets transmitted normally as a regular operation, and therefore, they may be performed with less network load compared with the load according to the method using control packets. As a result, it becomes possible to achieve reduction of the network load and reduction of memory consumption as effects originally expected with clustering, and it becomes possible to stabilize the throughput of the network by maintaining the cluster functions and by constantly keeping and configuring the cluster in an appropriate state.

FIG. 7 is a functional block diagram illustrating an example of the configuration of the node apparatus 100. The node apparatus 100 includes a receiving unit 102, a node type judging unit 104, a participation processing unit 106, a cluster information updating unit 108, a cluster generating unit 110, a free node list generating unit 112, a cluster merger destination candidate reporting unit 114, a cluster merger request accepting unit 116, a cluster merger request updating unit 118, a cluster merger list generating unit 120, a cluster merger processing unit 122, a cluster merger list reporting unit 124, a setting unit 136, a Hello packet generating unit 138, a transmitting unit 140, and a TTL (Time To Live: life span) decrementing unit 142. The node apparatus 100 further stores node type information 126, cluster information 128, a free node list 130, a merge cluster list 132, a merge node list 134, and a TTL 144. The same numeral is used to refer to each of the node type information 126, the cluster information 128, the free node list 130, the merge cluster list 132, the merge node list 134, and the TTL 144, and to a node type information storing unit 126, a cluster information storing unit 128, a free node list storing unit 130, a merge cluster list storing unit 132, a merge node list storing unit 134, and a TLL storing unit 144 that store them respectively.

The same numeral is used to refer to the node type information 126, the cluster information 128, the free node list 130, the merge cluster list 132, and the merge node list 134, and to the node type information storing unit 126, the cluster information storing unit 128, the free node list storing unit 130, the merge cluster list storing unit 132, and the merge node list storing unit 134 that store them respectively.

The receiving unit 102 receives a packet transmitted from an adjacent node apparatus 100 and outputs a Hello packet to the node type judging unit 104.

The transmitting unit 140 transmits a packet to an adjacent node apparatus 100. For example, the transmitting unit 140 transmits a Hello packet generated by the Hello packet generating unit 138 to an adjacent node apparatus. When a packet is transmitted to all the adjacent node apparatuses, this may be referred to as a broadcast transmission of a packet.

FIG. 8 is a diagram illustrating an example of the format of a Hello packet.

As illustrated in FIG. 8, a Hello packet 200 includes a header and a payload.

The header includes a Type field, a global destination (GD) field, a global source (GS) field, a local source (LS), and a local destination (LD).

The payload includes a cluster information (CI) field, a free node list (FNL) field, a merge node List (MNL) field, and a merge cluster list (MCL) field. The payload further includes a Hello header that is information representing the number of Hello headers, while this is not illustrated in the drawing. The Hello header includes route information. The route information includes the identifiers of GD for which the routes are stored in the routing table of the node apparatus that generates the Hello packet.

Hereinafter, the "global destination (GD)" refers to the node apparatus 100 that is the final destination of a packet. Meanwhile, the "local destination (LD)" refers to the node apparatus 100 which is the forwarding destination for one-hop forwarding of a packet. The "global source (GS)" refers to the node apparatus 100 which is the transmission source that creates the packet first. The "local source (LS)" refers to the node apparatus 100 which is the origin of one-hop forwarding of a packet. A Hello packet is transmitted to the adjacent node apparatuses of the transmission source node apparatus 100 by broadcast transmission.

The Type field stores information that indicates the type of data included in the payload. In the case of a Hello packet, the Type field stores a value that identifies the Hello packet. The receiving unit 102 uses the value stored in the Type field of a received packet to identify the Hello packet and outputs the Hello packet to the node type judging unit 104.

The cluster information (CI) field includes the identifier (Cluster Identifier: CID) of the cluster to which the node apparatus 100 itself belongs, a list of combinations of the identifiers (Node Identifier: NID) of the node apparatuses included in the cluster identified by the cluster identifier (CID) and the sequence numbers (SN) of the node apparatuses, and an end flag.

The number of the node identifiers (NID) of the node apparatuses included in the cluster may be any number. Hereinafter, a set of combinations of identifiers (NID) of a plurality of node apparatuses and the sequence numbers (SN) of the node apparatuses may be referred to as "{<NID, SN>}".

The end flag included in the cluster information (CI) field is information that indicates whether a new node apparatus 100 may participate in the cluster identified by the cluster identifier (CID). That is, it is information that indicates whether the cluster identified by the cluster identifier (CID) includes node apparatuses corresponding to the maximum number of cluster nodes. The end flag is either of, for example, "true" and "false". The items "true" and "false" may also be symbols including numbers or characters or any combination thereof that represent "true" and "false". When the end flag is "true", the cluster includes node apparatuses corresponding to the maximum number of cluster nodes, and it is impossible for a new node apparatus 10 to join the cluster. A Hello packet having cluster information whose end flag is "true" is used as a generation request that is information for requesting generation of a new cluster. When the end flag is "false", the number of nodes included in the cluster has not reached the maximum number of cluster nodes, and it is possible for a new node apparatus to join the cluster that includes the node apparatus 100.

The free node list (FNL) field includes the cluster identifier (CID) that identifies the cluster in which participation of nodes is desired, and a list of identifies of node apparatuses (Node Identifiers: NID) whose participation in the cluster identified by the cluster identifier (CID) is desired. Information stored in the free node list (FNL) field may be referred to as "free node information". The number of identifiers (NID) of node apparatuses whose participation in the cluster is desired may be any number. Hereinafter, a set of a plurality of identifiers (NID) of node apparatuses may be indicated as "{NID}".

The merge node list (Merge Node List: MNL) field and the merge cluster list (Merge Cluster List: MCL) field are used in the cluster merger process in the second stage of cluster formation.

When two clusters merge in the cluster merger process, Hello packets are transmitted and received between two node apparatuses A and B that belong to two different clusters and that are adjacent to each other. In the present embodiment, when the cluster identifier (CID) is expressed in numerical values, the cluster whose the cluster identifier (CID) is the smaller numerical value becomes a master, and the other cluster becomes the slave. It is assumed that the node apparatus A is a node apparatus belonging to the master-side cluster, and the node apparatus B is a node apparatus belonging to the slave-side cluster.

The merger node list (Merge Node List: MNL) is information about the slave-side cluster. When the local node apparatus belongs to the slave-side cluster, the merge cluster list (Merge Cluster List: MCL) includes the identifier (S-Identifier: SID) of an adjacent node apparatus belonging to the master-side cluster, and identifiers (NID) of the node apparatuses belonging to the slave-side cluster to which the local node apparatus belongs. The node apparatus belonging to the master-side cluster is a cluster merger destination candidate, and a Hello packet whose merge cluster list (Merge Cluster List: MCL) field stores the SID is used as a cluster merger request report. Hereinafter, a set of identifiers (NID) of node apparatuses may be indicated as "{NID}".

For example, it is assumed that the node apparatus B belonging to the slave-side cluster receives a Hello packet from the node apparatus A belonging to the master-side cluster. Then, the node apparatus B stores the identifier that identifies the node apparatus A as the identifier of the node apparatus belonging to the master-side cluster (SID), and the node apparatus B generates a Hello packet with an empty set { } as the set of identifiers (NID) that identify the node apparatuses belonging to the slave-side cluster. Then, the node apparatus B transmits the Hello packet generated as described above by broadcast transmission.

When a Hello packet is transmitted and received in the slave-side cluster as a cluster merger request report, the merge cluster list (Merge Cluster List: MCL) field is a set of identifiers that identify node apparatuses (NID) belonging to the slave-side cluster that includes the node apparatus B.

When a node apparatus belonging to the master-side cluster receives a Hello packet as a cluster merger request report from an adjacent node belonging to the slave-side cluster, the identifiers of the node apparatuses belonging to the slave-side cluster included in the cluster information (CI) field of the Hello packet and the identifiers of the node apparatuses belonging to the slave-side cluster included in the merge cluster list (MCL) field are compared, and when they match, the set of the identifiers (NID) that identify the node apparatuses in the merge cluster list (MCL) field is moved to and stored in the merge node list (MNL) field. That is, the merge node list (MNL) field stores a list of all the node apparatuses belonging to the slave-side cluster that may merge with the master-side cluster. Regarding the identifiers of the node apparatuses belonging to the slave-side cluster included in the cluster information (CI) field and the identifiers of the node apparatuses belonging to the slave-side cluster included in the merge cluster list (Merge Cluster List: MCL) field, the comparison may be performed only about the numbers of elements. When the node apparatus A (belonging to the master-side cluster) transmits by broadcast transmission a Hello packet in the master-side cluster as a cluster merger request report, the merge node list (MNL) is a set of identifiers (NID) that identify the node apparatuses belonging to the slave-side cluster.

The setting unit 136 sets a node apparatus 10 as either an origin node or a participant node, and the setting unit 136 stores information that identifies the type of the node apparatus 100 in the node type information 126. The node type information 126 is information in any format that identifies the type of node apparatus 100. When the node apparatus 100 is set as an origin node, the node apparatus 100 updates the cluster information 128.

When a Hello packet is forwarded from the receiving unit 102, the node type judging unit 104 obtains the type of the node apparatus 100 that is, whether it is a free node, an origin node, or a participant node, from the node type information 126. In the node type judging unit 104, the type of the node, the output destinations of the cluster information (CI), the free node information (FNL and the like), the merge cluster list (MCL), and the merge node list (MNL) in the Hello packet are associated. As illustrated in FIG. 3, the node type judging unit 104 refers to the node type information 126, and when the node apparatus 100 is a free node, the node type judging unit 104 transmits the cluster information (CI) to the participation processing unit 106. Meanwhile, the node type judging unit 104 refers to the node type information 126, and when the node apparatus 100 is an origin node or a participant node, the node type judging unit 104 transmits the cluster information (CI) to the cluster information updating unit 108. The node type judging unit 104 refers to the node type information 126, and when the node apparatus 100 is an origin node, the node type judging unit 104 transmits the free node information (FNL and the like) to the cluster generating unit 110, and when the node apparatus 100 is a participant node, it transmits the free node information to and to the free node list generating unit 112. In a similar manner, the merge cluster list (MCL) is sent to the cluster merger request accepting unit 116 when the node apparatus 100 is an origin node, and the merge cluster list (MCL) is sent to the cluster merger request updating unit 118 when the node apparatus 100 is a participant node. The merge node list (MNL) is sent to the cluster merger processing unit 122 when the node apparatus 100 is an origin node, and to the cluster merger list reporting unit 124 when the node apparatus 100 is a participant node.

The participation processing unit 106 makes a request for participating in a cluster and checks the participation. Upon receiving a Hello packet when the node apparatus 100 is a free node, the participation processing unit 106 receives the cluster information (CI) included in the Hello packet. Upon receiving the cluster information (CI), the participation processing unit 106 checks the contents of the cluster identifier (CID) and the end flag included in the cluster information (CI). The participation processing unit 106 further checks whether an entry including the identifier of the node apparatus 100 which includes the participation processing unit 106 is stored in the free node list 130. When the node apparatus 100 has already made a request for participating in a cluster, an entry including the identifier of the node apparatus 100 is included in the free node list 130. When an entry including the identifier of the node apparatus 100 which includes the participation processing unit 106 is not included in the free node list 130, the node apparatus 100 has not made a request for participating in a cluster. Therefore, the participation processing unit 106 stores a combination of the cluster identifier (CID) included in the cluster information (CI) and the identifier of the node apparatus 100 in the free node list 130, to make a request for participating in a cluster in which participation is possible, that is, a cluster whose end flag is not "true". When an entry including the identifier of the node apparatus 100 is included in the free node list 130, the node apparatus 100 has already made a request for participating in a cluster. Therefore, the participation processing unit 106 checks whether the identifier of the node apparatus 100 which includes the participation processing unit 106 is included in the cluster information (CI), to check whether or not participation in the cluster has been successful. When the identifier of the node apparatus 100 which includes the participation processing unit 106 is included in the cluster information (CI), the participation processing unit 106 determines that the node apparatus 100 has successfully participated in the cluster, and it updates the set ({<NID, SN>}) of the combinations of the identifiers and sequence numbers of the node apparatuses included in the cluster information (CI). At the same time, the participation processing unit 106 deletes the identifier of the node apparatus 100 which includes the participation processing unit 106 from the free node list 130, and the node apparatus 100 becomes a participant node of the cluster. When the identifier of the node apparatus 100 which includes the participation processing unit 106 is not included in the cluster information (CI), the participation processing unit 106 checks the end flag, to see whether it is possible join the cluster which is identified by the cluster identifier (CID) included in the cluster information (CI).

When the end flag included in the cluster information (CI) is "true", the cluster to which the node apparatus 100 belongs already includes node apparatuses corresponding to the maximum number of cluster nodes, and therefore, the participation processing unit 106 deletes the entry in the free node list 130. When a Hello packet including the cluster information (CI) whose end flag is "true" is received in a case in which an entry including the identifier of the node apparatus 100 which includes the participation processing unit 106 is not included in the free node list 130, the participation processing unit 106 specifies the node apparatus 100 which includes the participation processing unit 106 as the origin node, changes the node type information 126, and further updates the cluster information.

The cluster information 128 stores information about the maximum number of cluster nodes in addition to the cluster information (CI).

The cluster information updating unit 108 checks whether the cluster identifier (CID) included in the cluster information (CI) and the identifier of the cluster to which the node apparatus 100 which includes the cluster information updating unit 108 belongs match, to check whether the cluster information (CI) reported using the Hello packet is information related to the cluster to which the node apparatus 100 belongs. When they match, the reported information is related to the cluster to which the node apparatus 100 belongs, and therefore, the cluster information updating unit 108 updates the cluster information 128 according to the cluster information (CI) reported using the Hello packet. The cluster information updating unit 108 further deletes the entries for the node apparatuses included in the cluster information (CI) from the free node list 130.

Meanwhile, when the node apparatus 100 which includes the cluster information updating unit 108 is set in the cluster information (CI), the cluster information updating unit 108 compares the merge node list (MNL) or the merge cluster list (MCL), and it appropriately updates the merge cluster list 132 and the merge node list 134.

The cluster information updating unit 108 further sends the cluster information (CI) received from the node type judging unit 104 to the cluster merger destination candidate reporting unit 114.

The cluster information updating unit 108 functions as a sequence number judging unit that judges whether the sequence numbers of the node apparatus included in first and second Hello packets received at different timings by the receiving unit 102 match each other.

The cluster generating unit 110 processes node free information such as the free node list (FNL) and the like received from the node type determination unit, and the cluster generating unit 110 appropriately refers to and updates the cluster information (CI) managed by the local node.

The free node list generating unit 112 processes the free node list (FNL) received from the node type judging unit 104, and it appropriately updates the free node list 130 managed by the node apparatus 100 which includes free node list generating unit 112.

The cluster merger destination candidate reporting unit 114 refers to the cluster information (CI) received from the cluster information updating unit 108 and the cluster information 128 managed by the local node, and when the condition for cluster merger is satisfied, the cluster merger destination candidate reporting unit 114 updates the merge cluster list 132 managed by the local node. In addition, in the case of updating the merge cluster list 132, when the local node is the origin node, the cluster merger destination candidate reporting unit 114 gives the merge cluster list (MCL) to the cluster merger request accepting unit 116.

The cluster merger request accepting unit 116 processes the merge cluster list (MCL) received from the node type judging unit 104 or from the cluster merger destination candidate reporting unit 114, and when the condition for cluster merger is satisfied, the cluster merger request accepting unit 116 updates the merge cluster list 132 managed by the local node.

The cluster merger request updating unit 118 processes the merge cluster list (MCL) received from the node type judging unit 104 and when the condition for cluster merger is satisfied, the cluster merger request updating unit 118 updates the merge cluster list 132 managed by the local node (slave-side participant node registration). In addition, when the local node is a master-side opposite node, the cluster merger request updating unit 118 gives the merge cluster list (MCL) and the cluster information (CI) to the cluster merger list generating unit 120.

The cluster merger list generating unit 120 processes the merge cluster list (MCL) and the cluster information (CI) received from the cluster merger request updating unit 118, and when the condition for cluster merger is satisfied, the cluster merger list generating unit 120 updates the merge node list 134 managed by the local node.

The cluster merger processing unit 122 processes the merge node list (MNL) received from the node type judging unit 104, and when the condition for cluster merger is satisfied, the cluster merger processing unit 122 updates the cluster information 128 managed by the local node.

The cluster merger list generating unit 120 processes the merge cluster list (MCL) and the cluster information (CI) received from the cluster merger request updating unit, and when the condition for cluster merger is satisfied, the cluster merger list generating unit 120 updates the merge node list 134 managed by the local node.

The cluster merger list reporting unit 124 processes the merge node list (MNL) received from the node type judging unit, and the cluster merger list reporting unit 124 appropriately refers to and updates the merge node list 134 managed by the local node.

The Hello packet generating unit 138 generates a Hello packet and sends it to the transmitting unit 140. An example of the format of the Hello packet is illustrated in FIG. 4. The Hello packet includes a cluster information (CI) field, a free node list (FNL) field, a merge node list (Merge Node List: MNL) field, and a merge cluster list (Merge Cluster List: MCL) field. The pieces of information stored in these fields are obtained from the cluster information 128, the free node list 130, the merge node list 134, and the merge cluster list 132, respectively.

The TTL decrementing unit 142 is launched periodically, and it decrements the TTL of the monitoring target. In a case in which the node apparatus 100 which includes the TTL decrementing unit 142 is the origin node in a cluster, when the TTL of another node apparatus (a participant node) in the local cluster becomes 0, that is, when the TTL=0, the node apparatus 100 deletes information related to the participant node from the cluster information (CI) 128. In a case in which the node apparatus 100 which includes the TTL decrementing unit 142 is a origin node in a cluster, when the TTL of the origin node of the cluster to which the node apparatus 100 belongs becomes 0, that is, when the TTL=0, the node apparatus 100 deletes (clears) information related to the origin node from the cluster information (CI) 128, and if the number of node apparatuses in the cluster to which the node apparatus 100 belongs is equal to or greater than a certain threshold, the node apparatus 100 performs a cluster autonomous reproduction process, and when the number is smaller than the certain threshold, the node apparatus 100 performs a cluster autonomous restoration process.

<Cluster Generation, Restoration Processes>

Hereinafter, an example of the operations of the node apparatus 100 is explained with reference to the drawings. First, a monitoring process in the cluster (the local cluster) to which the node apparatus 100 belongs is explained. The monitoring process mainly relates to the functions (F1) through (F9) of the node apparatus 100. Next, a cluster autonomous reproduction process that is executed when a failure occurs in the origin node in the cluster is explained. The cluster autonomous reproduction process mainly relates to the function (F10) of the node apparatus 100. Next, a cluster autonomous reproduction process that is executed when a failure occurs in a participant node in the cluster is explained. The cluster autonomous reproduction process mainly relates to the functions (F11) and (F12) of the node apparatus 100.

An example of the monitoring process at the node apparatus 100 is explained with reference to FIG. 9 through FIG. 11.

The cluster illustrated in FIG. 9 has 10 as the identifier CID that identifies the cluster, and hereinafter, the cluster is referred to as the cluster 10. The cluster 10 includes five node apparatuses that have NID=10 through 14 as the identifier (NID) of the node apparatuses, and the origin node is the node apparatus with NID=10.

Each of the node apparatuses stores the sequence number (Sequence Number: SN) of the local node. The sequence number (SN) is updated (counted up) with every reception of a Hello packet. In addition, the sequence number (SN) is stored in the cluster information 128, and information related to the sequence number (SN) of the node apparatus N10 is transmitted by broadcast transmission using a Hello packet to the node apparatuses belonging to the same cluster.

The node apparatus N10 that is the origin node of the cluster 10 (hereinafter, it may be simply referred to as the "origin node N10") stores and manages the TTL of the other node apparatuses N11 through N14 in the same cluster 10, that is, the participant nodes that have NID=11 through 14 as the identifier of the node apparatuses. Then, it monitors the received sequence number (SN) of the participant nodes (node apparatus N11 through N14), and when there is an update in the sequence number (SN), it resets the TTL of each of the node apparatuses N11 through N14 managed by the local node (the origin node N10). That is, upon receiving a Hello packet from one of the participant nodes N11 through N14 of the cluster 10, the origin node N10 compares the SN currently managed by the origin node N10 for the node apparatus and the sequence number (SN) included in the Hello packet. The sequence number (SN) currently managed by the origin node N10 for the node apparatus is the value set according to the last reception of a Hello packet from the node apparatus. Therefore, there is an updated in the value of the sequence number (SN) when no failure has occurred in the node apparatus, and the TTL for the node apparatus is reset to set it to the default value.

A Hello packet 202 illustrated in FIG. 10 is an example of a Hello packet transmitted from the node apparatuses belonging to the cluster 10.

In the Hello packet 202, the cluster information (CI) field stores the identifier of the cluster CID=10, a combination of the identifiers and the sequence numbers (SN) of the respective node apparatuses included in the cluster 10, and the end flag. The cluster information (CI) field of the Hello packet 202 is as follows.

CI: <CID, {<NID, SN>}, end>=<10, {<11, 1>, <12, 1>, <13, 1>, <14, 1>}, false>

The cluster information (CI) field of the Hello packet 202 indicates that the cluster to which origin node N10 belongs is the cluster 10, which includes four node apparatuses with NID=11 through 14, and that the number of the node apparatuses included in the cluster 10 has not reached the value of the upper limit (the maximum number of cluster nodes), because the end flag is "false".

FIG. 11 is a diagram illustrating the TTL of the origin node N10 and the TTL of the node apparatuses N11 through N14 that are participant nodes. The value of the TTL illustrated in FIG. 11 is an example of the default value.

The origin node N10 stores the TTL of each of the nodes in the cluster 10 to which the origin node N10 belongs, in its TTL 144. Each participant node stores the TTL of the origin node N10 of the cluster 10 to which each participant node belongs, in the TTL 144 for the node apparatus N10 in each of the node apparatuses.

In FIG. 11, the TTL of all the node apparatuses belonging to the cluster 10 is 22. When the TTL of a node apparatus becomes 0, information related to the identifier of the node apparatus is deleted from the cluster information 128, and the node apparatus is separated from the cluster 10.

As described before, upon receiving a Hello packet from a participant node, the origin node N10 refers to the set ({<NID, SN>}) of combinations of the identifiers (NID) of the node apparatuses and the sequence numbers (SN) of the node apparatuses stored in in the cluster information 128, to compare the sequence number (SN) of a node apparatus stored in the cluster information (CI) field of the Hello packet with the value stored in the cluster information 128 of the node apparatus of the origin node N10. Then, when they are different, the TTL of the node apparatus is reset, and the TTL of the node apparatus does not change from the default value. However, when a failure occurs in a node apparatus and there is no update in the sequence number (SN), the TTL of the node apparatus is decremented and reduced by one by the TTL decrementing unit 142.

Next, the cluster autonomous reproduction process is explained with reference to FIG. 12 through FIG. 15.

Figure 9:
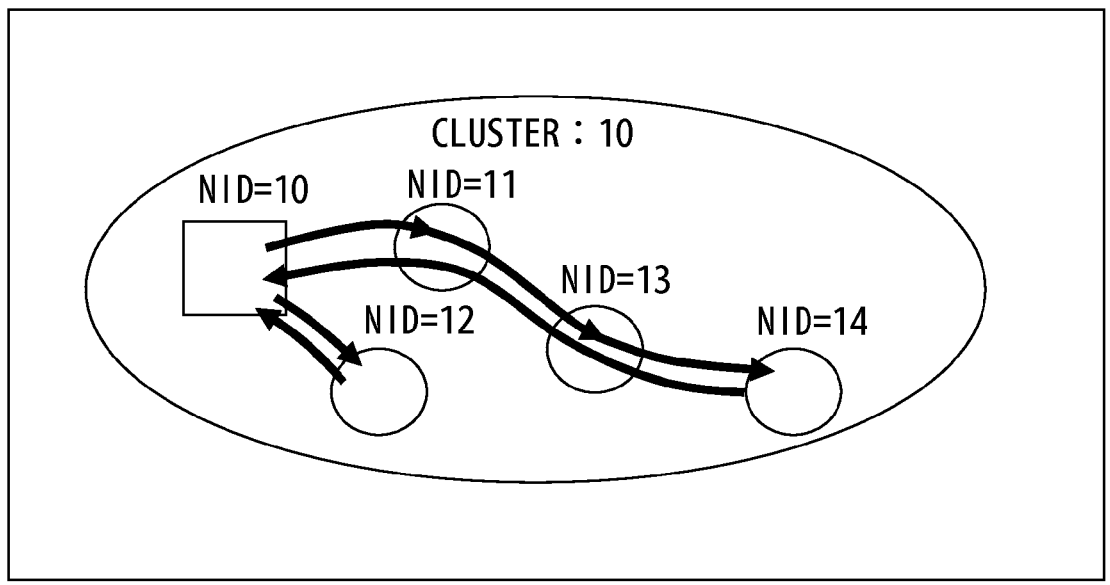
FIG. 9 is a diagram illustrating the outline of a node monitoring process in a cluster.
Figure 12:
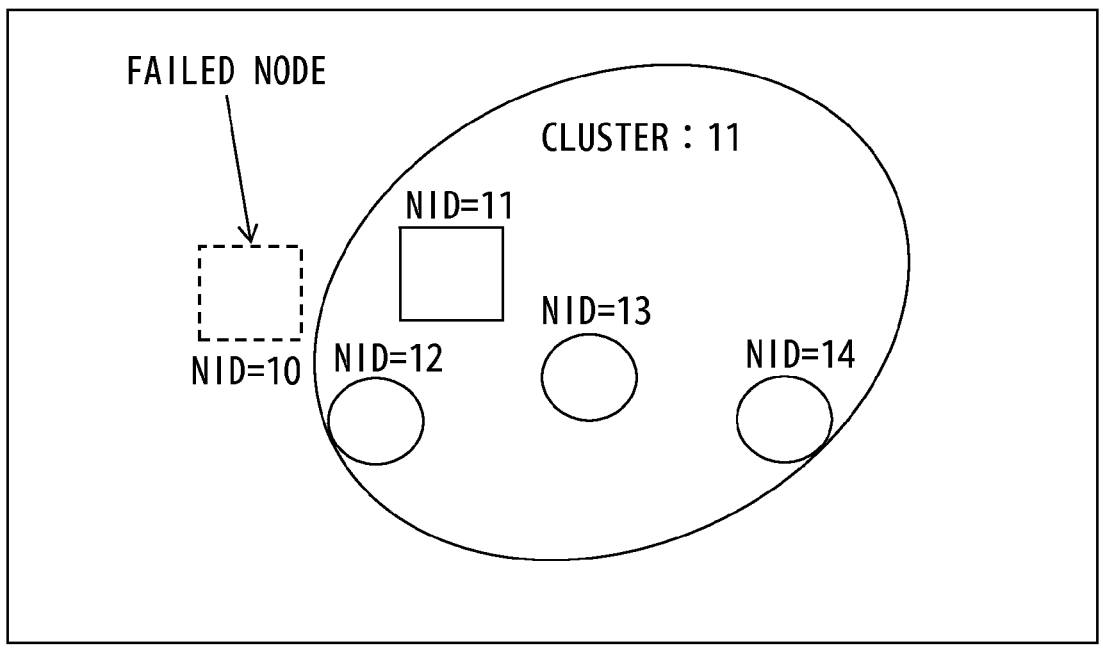
FIG. 12 is a diagram explaining the outline of a cluster autonomous reproduction process.

FIG. 12 illustrates a cluster 11 obtained as a result of the cluster autonomous reproduction process performed after a failure occurs in the origin node N10 of the cluster 10 illustrated in FIG. 9.

When a failure occurs in the origin node N10, no Hello packets are sent from the origin node N10 to the participant nodes (node apparatuses N11 through N14), and the sequence number (SN) of the origin node apparatus 10 stored in the cluster information 128 of the participant nodes N11 through N14 is not updated. Meanwhile, the sequence number (SN) of the local node stored in the cluster information 128 of each of the participant nodes N11 through N14 is updated (counted up) every time when the node apparatus transmits a Hello packet. In addition, the sequence numbers (SN) of the participant nodes other than the local node are updated at the time of the reception of Hello packets.

FIG. 13 is an example of information stored in the cluster information 128 of the participant nodes N11 through N14.

In FIG. 13, a failure has occurred in the node apparatus N10 and the sequence number (SN) is not updated, and therefore, the sequence number (SN) of the node apparatus N10 has not been updated from the sequence number (SN) in the Hello packet 202 illustrated in FIG. 10, while the sequence numbers of the other node apparatuses N11 through N14 have been updated. The cluster information (CI) stored in the cluster information 128 of the participant nodes N11 through N14 is as follows.

CI: <CID, {<NID, SN>}, end>=<10, {<10, 1>, <11, 23>, <12, 23>, <13, 23>, <14, 23>}, false>

Each participant node (node apparatuses N11 through N14) stores the TTL of the origin node in the cluster in the TTL 144 of each participant node. In the current case, there is no update in the sequence number (SN) of the origin node 10, and therefore, the TTL of the origin node N10 is decremented at certain time intervals (for example, the transmission cycle of the Hello packet).

FIG. 14 is a diagram illustrating a situation in which the TTL of the origin node 10 stored by each participant node (node apparatuses N11 through N14) becomes 0.

As illustrated in FIG. 14, TTL 304, 306, 308, and 310 of the origin node N10 stored in the TTL 144 of each node apparatus decreases from the default value "22" to "0".

At the point in time when the TTL of the origin node N10 becomes 0, each participant apparatus (node apparatuses N11 through N14) deletes information of the origin node N10 from the cluster information 128. At this point in time, there is no origin node in the cluster that includes the node apparatuses N11 through N14. Therefore, when the number of the node apparatuses in the cluster is equal to or greater than a prescribed threshold, a new origin node is selected from the existing node apparatuses N11 through N14, to reproduce the cluster. Then, the cluster is reproduced by replacing the identifier (CID) that identifies the cluster with the identifier (NID) of the selected new origin node. When the identifier of the node apparatus is a number as in the present example, the node apparatus that has the smallest number representing its identifier (NID) among the remaining nodes apparatuses in the cluster may be selected. A prescribed threshold with respect to the maximum number of cluster nodes, for example, 50% may be used as the prescribed threshold. It may also be a number other than 50%, for example, 40% or 60%.

FIG. 15 is an example of the cluster information (CI) stored in the cluster information 128 of the participant nodes N11 through N14 when the cluster is reproduced with the node apparatus N11 as the new origin node. At this time, the cluster information (CI) stored in the cluster information 128 of the participant nodes N11 through N14 has been changed as CI: <CID, {<NID, SN>}, end>=<11, {<11, 23>, <12, 23>, <13, 23>, <14, 23>}, false> where particularly the identifier (CID) that identifies the cluster has been changed as CID=11.

Accordingly, the node apparatus 11 becomes the origin node, and the cluster that includes the node apparatuses N11 through N14 is reproduced as a cluster with the identifier 11 to identify the cluster.

Meanwhile, when the number of node apparatuses in the cluster is smaller than the prescribed threshold, the cluster information (CI) stored in the cluster information 128 of the participant nodes N11 through N14 is cleared, and the cluster is eliminated. That is, the node apparatuses N11 through N14 become a free node.

An example of the cluster autonomous restoration process is explained with reference to FIG. 16 through FIG. 20.

FIG. 16 illustrates a cluster 10 obtained as a result of the cluster autonomous restoration process performed after a failure occurs in the participant node N13 of the cluster 10 illustrated in FIG. 9, and the node apparatus N14 that is a free node (hereinafter, it may be simply referred to as the free node N14). When a failure occurs in the participant node 13, Hello packets transmitted from the node apparatus N13 and the node apparatus N14 do not reach the origin node N10. That is, among the pieces of information stored in the cluster information 128 of the origin node N10, the sequence numbers (SN) of the node apparatus N13 and the node apparatus N14 are no longer updated.

FIG. 17 is a diagram illustrating a situation in which, among the pieces of information stored in the cluster information 128 of the origin node N10, the sequence numbers (SN) of the node apparatus N13 and the node apparatus N14 are no longer updated. The information stored in the cluster information 128 of the origin node N10 is originally CI: <CID, {<NID, SN>}, end>=<10, {<10, 1>, <11, 1>, <12, 1>, <13, 1>, <14, 1>}, false> and it is changed to

CI: <CID, {<NID, SN>}, end>=<10, {<10, 23>, <11, 23>, <12, 23>, <13, 1>, <14, 1>}, false>, in which the sequence numbers (SN) of the node apparatuses N10 through N12 are updated but the sequence numbers (SN) of the node apparatus N13 and the node apparatus N14 are not updated. The origin node N10 decrements periodically the TTL of the node apparatus N13 and the node apparatus N14 whose sequence number (SN) is no longer updated, and therefore, the TTL of the participant nodes N10 through N12 stored in the TTL 144 of the origin node N10 does not change from the default value "22", whereas the TTL of the node apparatus N13 and the node apparatus N14 eventually becomes "0".

FIG. 18 is a diagram at the time when the TTL of the node apparatus N13 and the node apparatus N14 stored in the TTL 144 of the origin node N10 becomes "0". the TTL of the node apparatus N11 and the node apparatus N12 have not been changed from the default value "22".

The origin node N10 deletes information related to the node apparatus N13 and the node apparatus N14 whose the TTL 31 became "0", and reports the deletion by broadcast transmission using a Hello packet.

FIG. 19 is an example of a Hello packet transmitted from the origin node N10. The cluster information (CI) of a Hello packet 210 illustrated in FIG. 19 is as follows.

CI: <CID, {<NID, SN>}, end>=<10, {<10, 24>, <11, 24>, <12, 24>}, false>

The cluster information (CI) of the Hello packet 210 indicates that the cluster 10 is composed of the node apparatuses N10 through N12.

The node apparatus N11 and the node apparatus N12 that have recognized the deletion of the node apparatus N13 and the node apparatus N14 from the cluster 10 according to the Hello packet from the origin node N10 respectively delete information related to the node apparatus N13 and the node apparatus N14 from the information stored the cluster information 128 of each. Thus, the node apparatus N13 and the node apparatus N14 are separated from the cluster 10, and the cluster 10 is reproduced.

At the node apparatus N14, Hello packets from the origin node 10 no longer arrive, and the sequence number (SN) for the node apparatus N10 in the cluster information 128 managed by the local node is no longer updated. The node apparatus N14 decrements periodically the TTL of the origin node N10 whose sequence number (SN) is no longer updated.

Figure 20:
FIG. 20 is a diagram illustrating an example of the TTL of a participant node.

FIG. 20 is a diagram illustrating the condition in which the sequence number (SN) for the node apparatus N10 stored in the TTL 314 of the node apparatus N14 has become "0".

Then, the node apparatus N14 deletes information related to the origin node N10 from the cluster information 128 at the point in time when the TTL of the origin node N10 becomes "0".

At this time, there is no origin node in the cluster to which the node apparatus N14 belongs. Then, when the number of node apparatuses in the cluster that includes the node apparatus N14 is equal to or greater than a certain threshold, an origin node is selected from the node apparatuses belonging to the cluster. Then, the cluster is reproduced by replacing the identifier (CID) that identifies the cluster with the identifier (NID) of the selected new origin node. When the identifier of the node apparatus is a number as in the present example, the node apparatus with the smallest number representing its identifier (NID) among the remaining nodes apparatuses in the cluster may be selected. A prescribed threshold with respect to the maximum number of cluster nodes, for example, 50% may be used as the prescribed threshold. It may also be a number other than 50%, for example, 40% or 60%.

Meanwhile, when the number of node apparatuses in the cluster that includes the node apparatus N14 is smaller than the prescribed threshold, the cluster information (CI) stored in the cluster information 128 of the participant nodes is cleared, to eliminate the cluster. At this time, the node apparatus N14 becomes a free node or an origin node.

<Cluster Merger Process>

The cluster merger process is explained with reference to FIG. 21 through FIG. 25.

The transition from the cluster generation process as the first stage of the cluster formation process to the cluster merger process as the second stage is performed in the unit of each node apparatus. Each node apparatus 100 monitors the change in the number of node apparatuses in the cluster to which it belongs, and when there is no change in the number of node apparatuses in the cluster over a prescribed period of time, the node apparatus 100 starts the cluster merger process. For example, after joining a cluster in the cluster generation process, the node apparatus 100 waits for a certain period of time after the change in the number of nodes in the cluster to which it belongs stops. At the point in time when it has waited for a certain period of time, a cluster with a smaller number of nodes in the cluster reaches the timeout earlier than a cluster with a larger number of nodes, then the cluster with a smaller number of nodes moves on to the cluster merger stage and a cluster merger request reaches this cluster first. That is, among adjacent clusters, the cluster merger process starts preferentially from a cluster with the smaller number of the nodes in the cluster.

FIG. 21 is a diagram illustrating the outline of a cluster merger priority decision process to determine, when there are a plurality of clusters, from which cluster the cluster merger process starts.

As illustrated in FIG. 21, a cluster 1 includes five node apparatuses with the identifier (NID) of the node apparatuses NID=1 through 5, a cluster 6 includes three node apparatuses with the identifier (NID) of the node apparatuses NID=6 through 8, and a cluster 9 includes four node apparatuses with the identifier (NID) of the node apparatuses NID=9 through 12. The origin node of the cluster 1 is the node apparatus with NID=1, the origin node of the cluster 6 is the node apparatus with NID=6, and the origin node of the cluster 9 is the node apparatus with NID=9.

In this case, the cluster 6 has the smallest number of node apparatuses included in the cluster. Therefore, the cluster 6 moves on to the cluster merger stage earlier than the cluster 1 and the cluster 9. The transition from the cluster generation process as the first stage of the cluster formation process to the cluster merger process as the second stage is performed by changing the value of the maximum number of cluster nodes set in the first stage, and further changing the end flag stored in the cluster information 128 stored in the node apparatus 100 from "true" to "false".

FIG. 22 is a diagram explaining the outline of a cluster merger destination candidate report process.

The cluster merger process is performed between adjacent clusters. The transmission and reception of Hello packets with adjacent clusters are performed between opposite node apparatuses that are two node apparatuses belonging to adjacent clusters, the node apparatuses themselves being adjacent to each other. For example, among the nodes illustrated in FIG. 22, the combination of the node apparatus with NID=3 belonging to the cluster 1 and the node apparatuses with NID=7, 8 belonging to the cluster 6 are an example of the opposite node apparatuses.

As illustrated in FIG. 22, upon receiving a Hello packet from a node apparatus belonging to an adjacent cluster, the node apparatus that received the Hello packet obtains the sum of the numbers of node apparatuses in the two clusters according to the cluster information (CI) managed by the local node and the cluster information (CI) included in the Hello packet, to determine whether it has reached the maximum number of cluster nodes. If the sum of the numbers of nodes is equal to or smaller than the maximum number of cluster nodes, it is determined that the two clusters may be merged.

At this time, the cluster merger destination candidate reporting unit 114 of the node apparatus 100 determines which of the cluster to which it belongs and the adjacent cluster is the master and which of them is the slave. In this example, the values of the identifiers (CID) of the cluster to which it belongs and the adjacent cluster are compared, and the cluster with the smaller identifier (CID) of the cluster is decided as the master, and the cluster with the larger identifier (CID) of the cluster is determined as the slave. That is, the cluster 1 becomes the master, and the cluster 6 becomes the slave.

When the node apparatus with NID=7 of the cluster 6 (the slave-side cluster) receives a Hello packet from the node apparatus with NID=3 of the cluster 6 (the master-side cluster) and it is decided that the cluster 1 and the cluster 1 may be merged, the cluster merger request updating unit 118 of the node apparatus with NID=3 changes the merge cluster list 132 of the node apparatus as follows.

<SID, {<NID, SN>}>=<3, {<, >}>

The information in the merge cluster list 132 is reflected in the merge cluster list (MCL) field of the Hello packet transmitted by the node apparatus with NID=7 of the cluster 6. This information is obtained by the Hello packet generating unit 138 from the merge cluster list 132. According to the information from the merge cluster list 132, "<3, {<, >}>" is stored in the merge cluster list (MCL) field of the Hello packet transmitted by the node apparatus with NID=7 of the cluster 6, and the Hello packet is transmitted from the transmitting unit 140 by broadcast transmission.

The Hello packet transmitted by broadcast transmission in the cluster 6 from the node apparatus with NID=7 of the cluster 6 goes through the node apparatus with NID=8 adjacent to the node apparatus with NID=7 and the Hello packet is received by the node apparatus with NID=6 that is the origin node of the cluster 6.

The cluster merger request accepting unit 116 of the node apparatus with NID=6 determines whether any cluster merger destination candidate report from another cluster has been received. This determination may be made according to whether a value has already been stored in SID of the merge cluster list 132 of the node apparatus 100 with NID=6. If no value has been set in SID of the merge cluster list 132 of the node apparatus 100 with NID=6, the cluster merger destination candidate report is accepted, and the identifier of the node apparatus of the cluster 1 adjacent to the cluster 6 is set in SID of the merge cluster list 132. That is, SID=3 is set in the merge cluster list 132 of the node apparatus 100 of NID=6.

Next, the cluster merger request updating unit 118 of the node apparatus 100 with NID=6 makes the Hello packet generating unit 138 generate a Hello packet to report, to all of the nodes in the cluster 6 to which the node apparatus 100 with NID=6 belongs, that the cluster merger is being requested Specifically, the identifier of the origin node of the slave cluster, that is, the identifier of the node apparatus with NID=6 is set as the identifier of the node apparatus in the merge cluster list 132, and a Hello packet is generated using it. The cluster information (CI) field of the Hello packet contains <CID, {<NID, SN>}, end>=<6, {<6, x1>, <7, x2>, <8, x3>}, false>, where x6, x7, x8 are an integer. In addition, the merge cluster list (MCL) field contains <SID, {NID}>=<3, {6}>.

After that, the Hello packet generated by the Hello packet generating unit 138 of the node apparatus 100 with NID=6 is transmitted from the transmitting unit 140.

Each node apparatus of the slave cluster 6 that received the Hello packet from the node apparatus with NID=6 recognizes that the cluster merger request has been accepted, because the value representing the origin node of the cluster to which each node apparatus belongs, that is, the identifier of the node apparatus with NID=6 is set in the merge cluster list (MCL) field of the Hello packet. Then, each node apparatus adds the identifier of each node apparatus to the combination {NID} of the identifiers of node apparatuses in the merge cluster list 132, and each node apparatus transmits a Hello packet including the merge cluster list (MCL) field to which the identifier of each node apparatus has been added.

Eventually, all the nodes of the slave-side cluster are listed up in the set ({NID}) of the identifiers of the node apparatuses in the merge cluster list (MCL) field of the Hello packet.

In the example of the Hello packet transmitted by the node apparatus with NID=7 to the node apparatus with NID=3, the cluster information (CI) field and the merge cluster list (MCL) field respectively contain
CI: <CID, {<NID, SN>}, end>=<6, {<6, x6>, <7, x7>, <8, x8>}, false>
MCL: <SID, {NID}>=<3, {6, 7, 8}>.

The node apparatus with NID=3 determines whether the number of elements of the set ({NID}) of the identifiers of the node apparatuses in the merge cluster list (MCL) field included in the cluster merger request report matches the number of node apparatuses in the cluster information (CI) field. If they match, the cluster merger list generating unit 120 changes the merge node list 134 of the node apparatus with NID=3 according to the merge cluster list (MCL). Then, the Hello packet generating unit 138 of the node apparatus with NID=3 generates a Hello packet in which the cluster information (CI) field, the merge node list (MNL) field, and the merge cluster list (MCL) field are
CI: <CID, {<NID, SN>}, end>=<1, {<1, x1>, <2, x2>, <3, x3>, <4, x4>, <5, x5>}, false>
MNL: <{NID}>=<{6, 7, 8}>
MCL: <SID, {NID}>=<, { }>,
respectively, and the Hello packet is transmitted by broadcast transmission from the transmitting unit 140 of the node apparatus with NID=3. At this time, the Hello packet transmitted and received in the cluster 1 has a role as a cluster merger request report. Here, x1, x2, x3, x4, and x5 are an integer.

Figure 23:
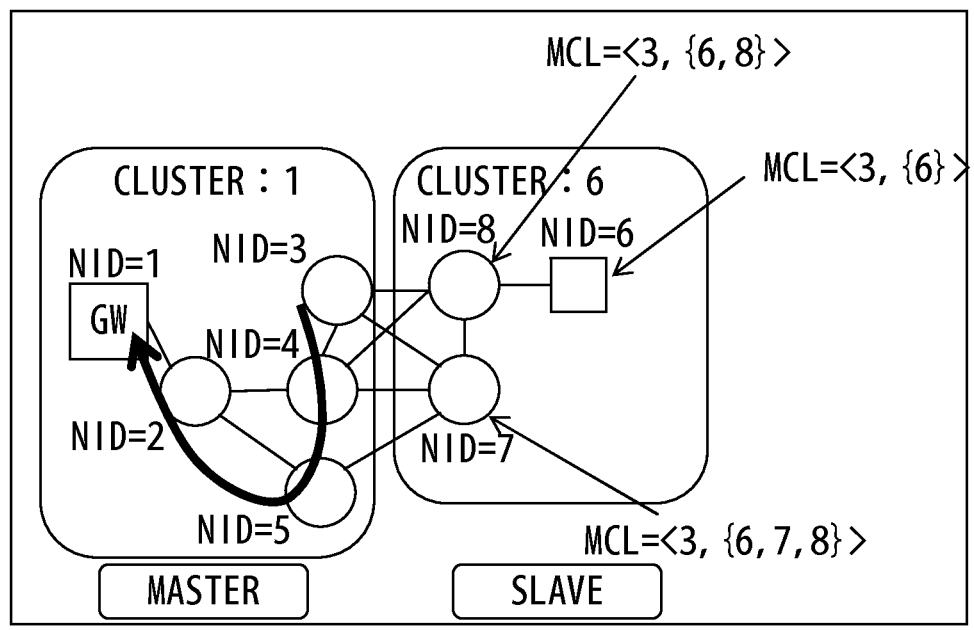
FIG. 23 is a diagram explaining the outline of a cluster merger request reporting process.

FIG. 23 is a diagram illustrating an example of the operations of the respective node apparatuses in the cluster 1 after the node apparatus with NID=3 in the cluster 1 that is the master-side cluster transmits a Hello packet by broadcast transmission.

The origin node (the node apparatus with NID=1) of the cluster 1 that is the master-side cluster checks whether any cluster merger destination candidate report has been received from another cluster, and whether the sum of the number of elements of the combination ({NID}) of the identifiers of the node apparatuses included in the merge node list (MNL) field and the number of node apparatuses in the cluster to which the origin node belongs is equal to or smaller than the maximum number of cluster nodes. If these conditions are satisfied, cluster merger is performed by adding the node apparatuses included in the merge node list (MNL) field to the cluster information (CI). Then, the Hello packet generating unit 138 of the node apparatus with NID=1 generates a Hello packet in which the cluster information (CI) field, the merge node list (MNL) field, and the merge cluster list (MCL) field respectively contain
CI: <CID, {<NID, SN>}, end>=<1, {<1, x1>, <2, x2>, <3, x3>, <4, x4>, <5, x5>, <6, x6>, <7, x7>, <8, x8>}, false>
MNL: <{NID}>=<{ }>
MCL: <SID, {NID}>=<, { }>,
and the Hello packet is transmitted from the transmitting unit 140.

FIG. 24 is a diagram illustrating an example of the operations of the respective node apparatuses in the cluster 1 after the node apparatus with NID=3 of the cluster 1 that is the master-side cluster transmits the Hello packet described above by broadcast transmission.

The origin node (the node apparatus with NID=1) of the cluster 1 that is the master-side cluster checks whether any cluster merger destination candidate report has been received from another cluster, and whether the sum of the number of elements of the combination ({NID}) of the identifiers of the node apparatuses included in the merge node list (MNL) field and the number of node apparatuses in the cluster to which the origin node belongs is equal to or smaller than the maximum number of cluster nodes. If these conditions are satisfied, cluster merger is performed by adding the node apparatuses included in the merge node list (MNL) field to the cluster information (CI). Then the Hello packet generating unit 138 of the node apparatus with NID=1 generates a Hello packet in which the cluster information (CI) field, the merge node list (MNL) field, and the merge cluster list (MCL) field respectively contain
CI: <CID, {<NID, SN>}, end>=<1, {<1, x1>, <2, x2>, <3, x3>, <4, x4>, <5, x5>, <6, x6>, <7, x7>, <8, x8>}, false>
MNL: <{NID}>=<{ }>
MCL: <SID, {NID}>=<, { }>. Meanwhile, when the sum of the number of elements of the combination ({NID}) of the identifiers of the node apparatuses included in the merge node list (MNL) field and the number of node apparatuses in the cluster to which the origin node belongs exceeds the maximum number of cluster nodes, the end flag becomes "true", and cluster merger is not performed.

FIG. 25 is a diagram illustrating the operations of the node apparatuses after the origin node (The node apparatus with NID=1) of the cluster 1 that is the master-side cluster transmits the Hello packet including the cluster information (CI) field as described above.

When the Hello packet is transmitted from the origin node (The node apparatus with NID=1) of the master-side cluster, the respective node apparatuses (the node apparatuses with NID=1, 2, 3, 4, 5) that have belonged to the master-side cluster recognizes that cluster merger has been performed when the identifiers (NID) of the node apparatuses stored in the merger node list 134 that is managed by the respective node apparatuses are included in the cluster information (CI) field, and the respective node apparatuses delete the corresponding identifiers (NID) of the node apparatuses from the identifiers (NID) of the node apparatuses stored the in merger node list 134. Then, the respective node apparatuses rewrite the cluster information 128 of the respective node apparatuses. That is, the following information is stored in the cluster information 128.

CI: <CID, {<NID, SN>}, end>=<1, {<1, x1>, <2, x2>, <3, x3>, <4, x4>, <5, x5>, <6, x6>, <7, x7>, <8, x8>}, false>

FIG. 26 is a diagram illustrating an example of the hardware configuration of the node apparatus 100. The node apparatus 100 is realized by a computer.

The node apparatus 100 includes an MPU (Micro Processing Unit) 400, a PHY (Physical Layer) chip 402, a timer IC 404, a DRAM (Dynamic Random Access Memory) 406, a flash memory 408, and a wireless module 410. The MPU 400, the PHY chip 402, the timer IC 404, the DRAM 406, the flash memory 408, and the wireless module 410 are connected to each other by buses 412 (412a through 412c), and they may exchange various data with each other under the control by the MPU 400.

The MPU 400 is an operation processing apparatus that controls the operations of the entire computer, functioning as a control processing unit of the computer. The MPU 400 operates as the node type judging unit 104, the participation processing unit 106, the cluster information updating unit 108, the cluster generating unit 110, the free node list generating unit 112, the cluster merger destination candidate reporting unit 114, the cluster merger request accepting unit 116, the cluster merger request updating unit 118, the cluster merger list generating unit 120, the cluster merger processing unit 122, the cluster merger list reporting unit 124, the setting unit 136, the Hello packet generating unit 138, and the TTL decrementing unit 142.

The flash memory 408 is a non-volatile memory in which a prescribed basic control program such as firmware is recorded in advance. By reading out and executing the basic control program at the time of the launch of the node apparatus as a computer, it becomes possible for the MPU 400 to control the operations of the respective constituent elements of the node apparatus as the computer.

The DRAM 406 is a semiconductor dynamic random access memory used appropriately as a working memory area when the MPU 400 executes various control programs. The DRAM 406 may store the node type information 126, the cluster information 128, the free node list 130, the merge cluster list 132, the merge node list 134, the TTL 144, and the routing table. Meanwhile, the node type information 126 may also be stored in the flash memory 408. In this case, after the launch, the node type information 126 stored in the flash memory 408 is read into the DRAM 406.

The PHY chip 402 and the wireless module 410 operate as the receiving unit 102 or the transmitting unit 140 or any combination thereof. The PHY chip 402 is an option, and when the PHY chip 402 is provided, communication using a communication line becomes available.

The timer IC 404 measures the time at which a Hello packet is transmitted, the time during which there are no changes in the number of the node apparatuses included in the cluster to which the apparatus 10 belongs, and the like.

Meanwhile, the program such as firmware may also be provided to the node apparatus 100 by storing the program in a computer-readable recording medium. The MPU 400 may read out and execute a prescribed control program recorded in the computer-readable recording medium. Meanwhile, for example, a flash memory equipped with a connector of the USB (Universal Serial Bus) standard, a CD-ROM (Compact Disc Read Only Memory), a DVD-ROM (Digital Versatile Disc Read Only Memory), or the like is used as the computer-readable recording medium. In addition, the program may also be installed into the node apparatus 100 by downloading it from a network through the PHY chip 402 or the wireless module 410.

<Processing in the Node Apparatus>

FIG. 27 is a flowchart explaining the operations of the node type judging unit 104.

When a Hello packet is input from the receiving unit 102, the node type judging unit 104 refers to the node type information 126, to judge whether the node apparatus 100 which includes the node type judging unit 104 is a free node, in step S102. When the result of the judgment is Yes, that is, when the node apparatus 100 which includes the node type judging unit 104 is a free node, the process proceeds to step S104. When the result of the judgment is No, that is, when the node apparatus 100 which includes the node type judging unit 104 is not a free node, the process proceeds to step S106.

In step S104, the node type judging unit 104 reports, to the participation processing unit 106, the cluster information (CI) including information indicating that the node apparatus 100 which includes the node type judging unit 104 is a free node. When the process in step S104 is completed, processing by the node type judging unit 104 is terminated.

In step S106, the node type judging unit 104 reports, to the cluster information updating unit 108, the cluster information (CI) including information indicating that the node apparatus 100 which includes the node type judging unit 104 is not a free node.

In step S108 following step S106, the node type judging unit 104 refers to the node type information, to judge whether or not the node apparatus 100 which includes the node type judging unit 104 is a origin node. When the result of the judgment is Yes, that is, when the node apparatus 100 which includes the node type judging unit 104 is an origin node, the process proceeds to step S110. When the result of the judgment is No, that is, when the node apparatus 100 which includes the node type judging unit 104 is not an origin node, the process proceeds to step S116.

In step S110, the node type judging unit 104 reports the free node list (FNL) to the cluster generating unit 110.

In step S112, the node type judging unit 104 reports the merge cluster list (MCL) to the cluster merger request accepting unit 116.

In step S114, the node type judging unit 104 reports the merge node list (MNL) to the cluster merger processing unit 122. The processes in step S110, step S112 and step S114 may be performed in any order. When the process in step S114 is completed, processing by the node type judging unit 104 is terminated.

In step S116, the node type judging unit 104 reports the free node list (FNL) to the free node list generating unit 112.

In step S118, the node type judging unit 104 reports the merge cluster list (MCL) to the cluster merger request updating unit 118.

In step S120, the node type judging unit 104 reports the merge node list (MNL) to the cluster merger list reporting unit 124. The processes in step S116, step S118 and step S120 may be performed in any order. When the process in step S114 is completed, processing by the node type judging unit 104 is terminated.

Figure 28:
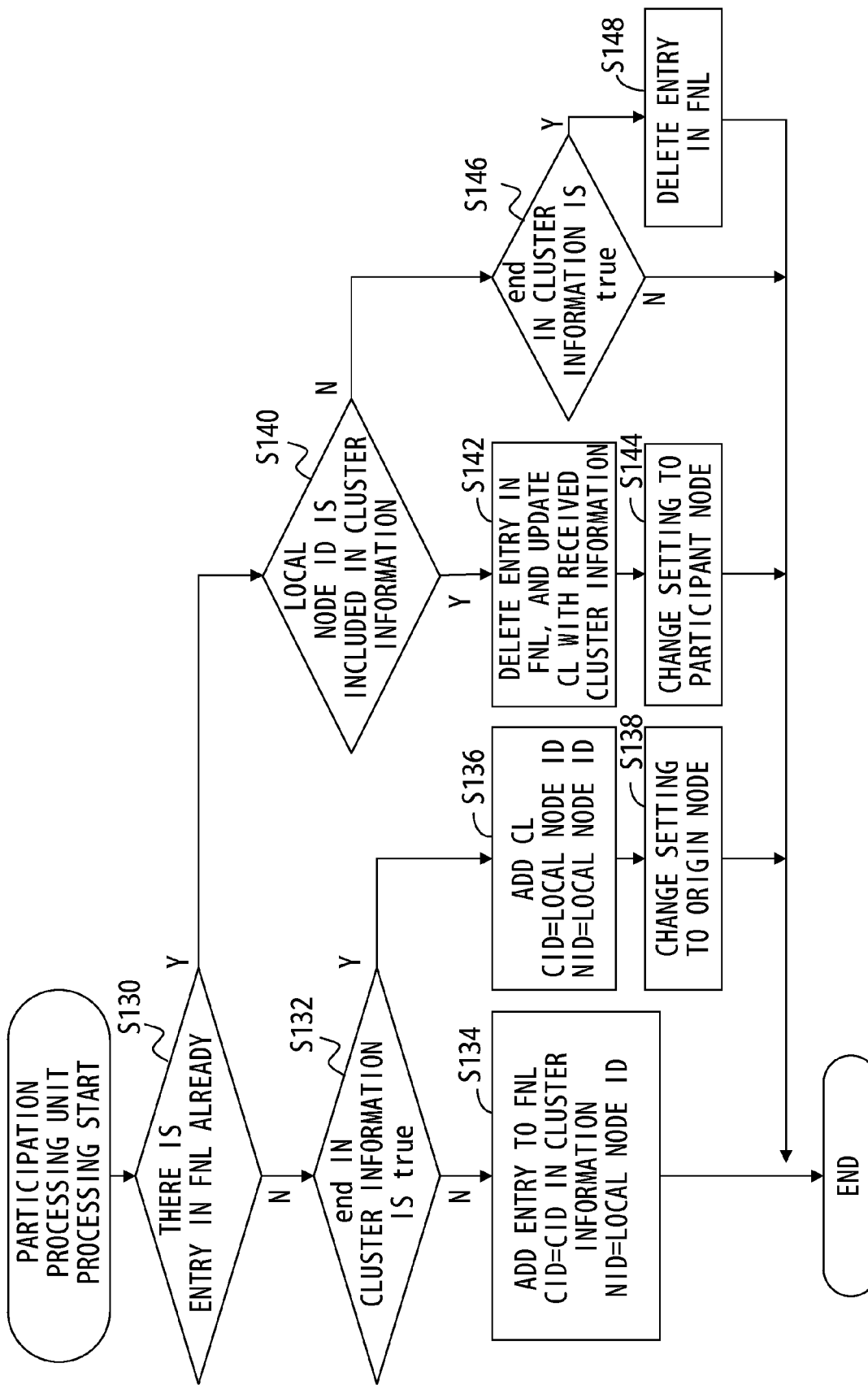
FIG. 28 is a flowchart illustrating an example of the flow of processing in a participation processing unit.

FIG. 28 is a flowchart illustrating an example of the operations of the participation processing unit 106.

In step S130, the participation processing unit 106 judges whether there is an entry of the node apparatus 100 which includes the participation processing unit 106 in the free node list 130. When there is an entry of the node apparatus 100 which includes the participation processing unit 106 in the free node list 130, the process proceeds to step S140.

When there is not an entry of the node apparatus 100 which includes the participation processing unit 106 in the free node list 130, the process proceeds to step 132.

In step S132, the participation processing unit 106 makes a judgment as to whether the end flag included in the cluster information (CI) field of the Hello packet is "true". When the end flag is "true", the process proceeds to step S136. When the end flag is not "true", the process proceeds to step S134.

In step S134, the number of nodes in the cluster has not reached the maximum number of cluster nodes, and therefore, the participation processing unit 106 stores the identifier (NID) of the node apparatus which includes the participation processing unit 106 in the free node list 130 while associating the identifier with the cluster identifier (CID) included in the cluster information (CI). When the process in step S134 is completed, processing by the participation processing unit is terminated.

In step S136, the participation processing unit 106 generates the cluster information 128 so that the node apparatus 100 which includes the participation processing unit 106 is able to operate as the origin node. At this time, the identifier of the node apparatus which includes the participation processing unit 106 is stored in the cluster information 128 as the cluster identifier (CID), and the node apparatus 100 which includes the participation processing unit 106 is included in the generated new cluster. Then, the process proceeds to step S138.

In step S138, the participation processing unit 106 changes the setting of the node apparatus 100 which includes the participation processing unit 106 to indicate that it is an origin node, and when the process in step S138 is completed, processing by the participation processing unit is terminated.

Meanwhile, when there is an entry of the node apparatus 100 which includes the participation processing unit 106 in the free node list 130, the participation processing unit 106 checks whether the identifier of the node apparatus 100 which includes the participation processing unit 106 is included in the cluster information 128, in step S140. When the identifier of the node apparatus 100 which includes the participation processing unit 106 is included in the cluster information 128, the process proceeds to step S142. When the identifier of the node apparatus 100 which includes the participation processing unit 106 is not included in the cluster information 128, the process proceeds to step S146.

In step S142, the participation processing unit 106 deletes the entry of the node apparatus 100 which includes the participation processing unit 106 from the free node list 130, and the participation processing unit 106 stores, in the cluster information 128, the information of the nodes included in the cluster information (CI) field. Then, the process proceeds to step S144.

In step S144, the participation processing unit 106 changes the setting of the node apparatus 100 which includes the participation processing unit 106 to indicate that it is a participant node, and when the process in step S144 is completed, processing by the participation processing unit is terminated.

When the identifier of the node apparatus 100 which includes the participation processing unit 106 is not included in the cluster information 128 according to the judgment in step S140, the process in step S146 is performed.

In step S146, the participation processing unit 106 makes a judgment as to whether the end flag is "true". When the result of the judgment is Yes, the process proceeds to step S148. When the judgment is No, processing by the participation processing unit is terminated.

In step S148, the number of node apparatuses in the cluster to which the node apparatus 100 belongs has reached the upper limit, and therefore, the entry in the free node list 130 is deleted, and processing by the participation processing unit is terminated.

Figure 29A:
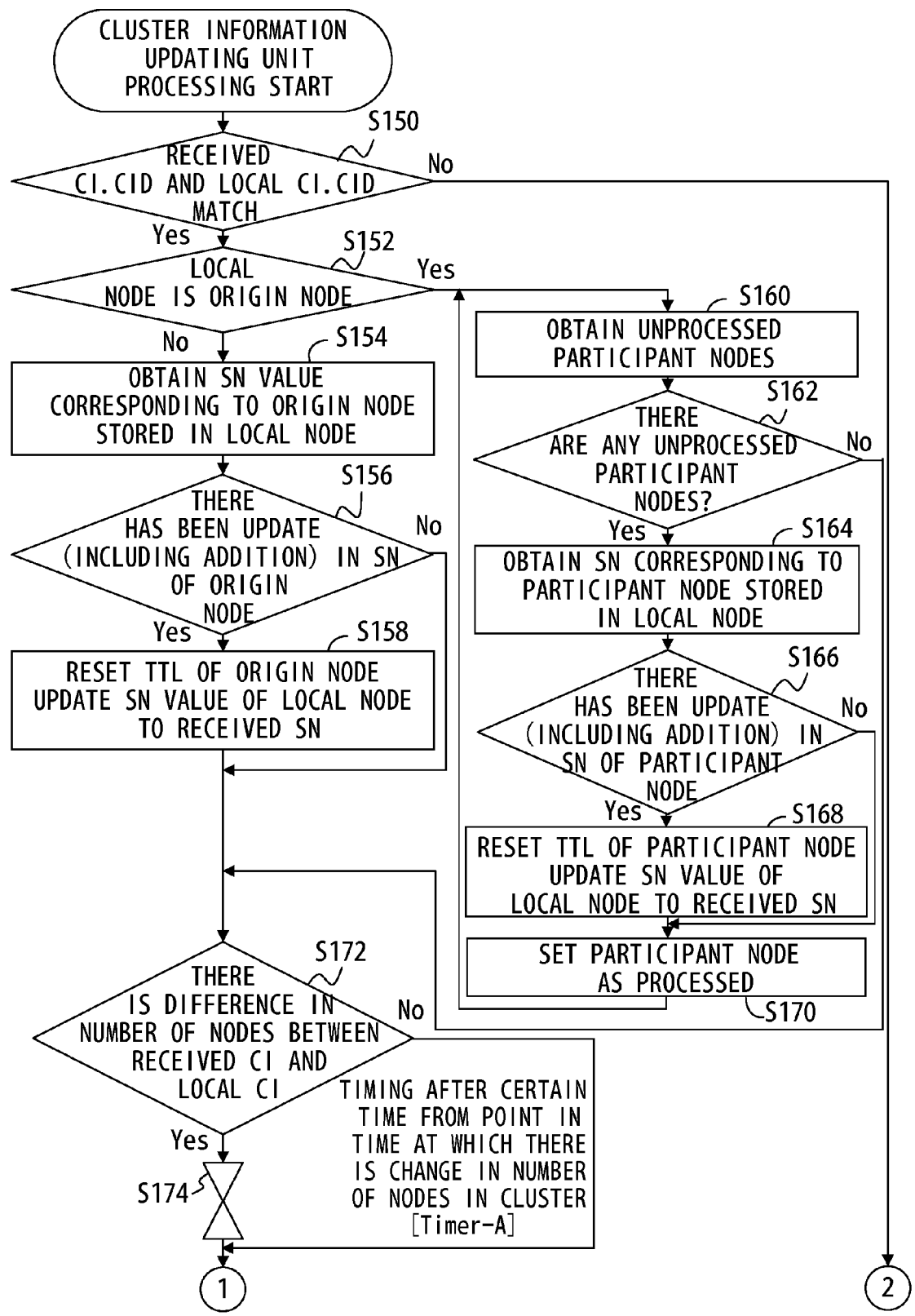
FIG. 29A is a flowchart (1) illustrating an example of the flow of processing in a cluster information update process.
Figure 29B:
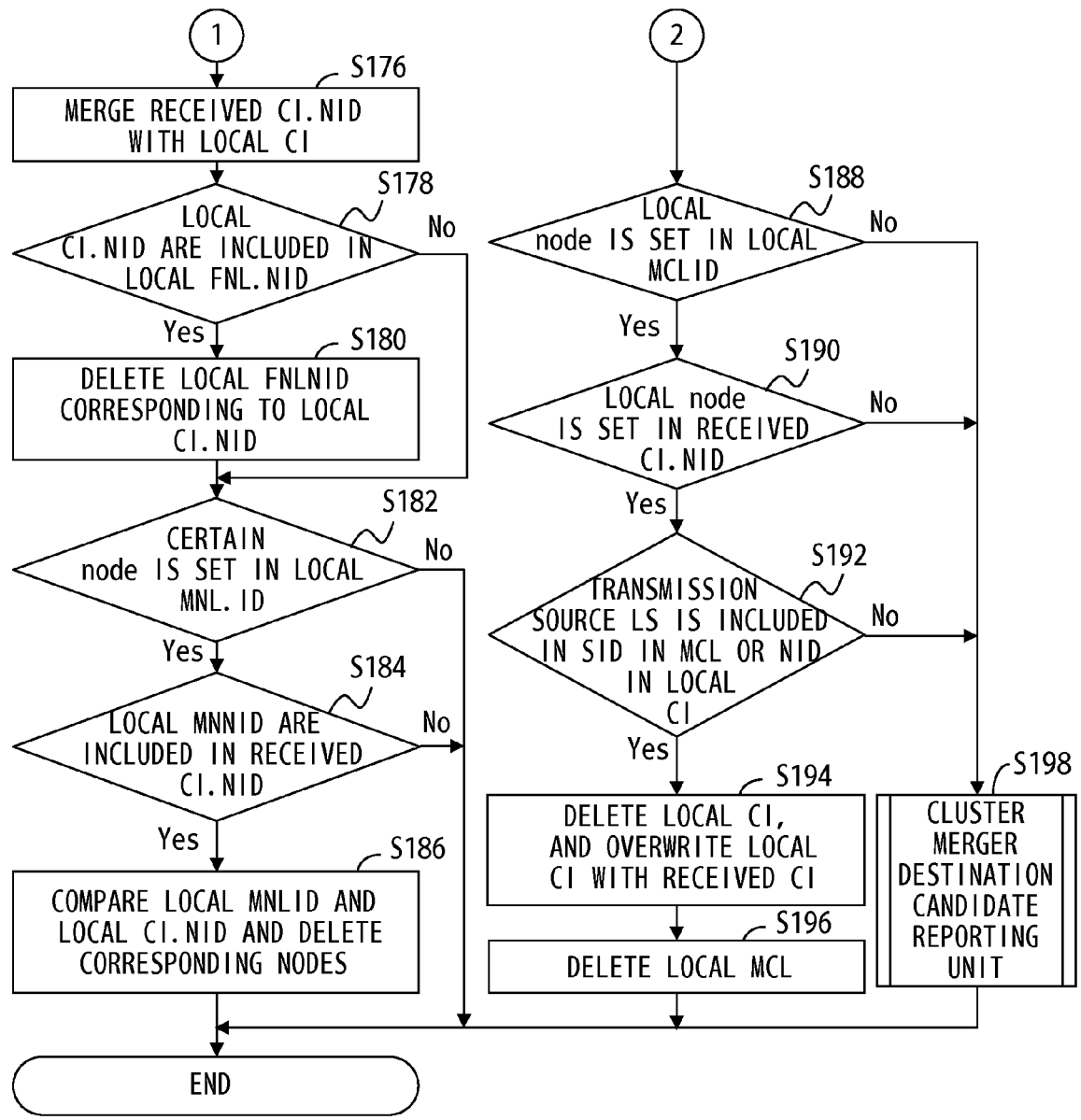
FIG. 29B is a flowchart (2) illustrating an example of the flow of processing in a cluster information update process.

FIG. 29A through FIG. 29B are flowcharts illustrating an example of the operations of the cluster information updating unit 108.

Each node performs a process as described below, when the cluster identifier (CID) in the cluster information (CI) of a received Hello packet is the same as the cluster identifier (CID) stored in the cluster information 128 of the node apparatus of each node. That is, each node compares the received sequence number (SN) with the sequence number (SN) included in the cluster information 128 managed by the local node, for each identifier (NID) of the node apparatuses, and when the sequence number (SN) of a monitoring target node has been updated, each node resets the TTL of the monitoring target node. When the node apparatus each node is an origin node, the monitoring target nodes are the participant nodes of the cluster, and when the node apparatus of each node is the participant nodes other than the origin node, the monitoring target node is the origin node. Each node further sets a timer to obtain a timing after a certain period of time from the point in time at which there is a change in the number of node apparatuses in the cluster. Each node recognizes all the nodes in the cluster to which the node apparatus of each node belongs, by merging the cluster information (CI) of the received Hello packet with the cluster information 128 of the node apparatus of each node. In addition, each node deletes entries corresponding to node apparatuses added to the cluster information 128 from the free node list 130 of the node apparatus of each node, and each node also sets a timer to obtain a timing after a certain period of time from the point in time from which there are no more participation requests from free nodes. When the identifiers (NID) of the node apparatus stored in the merge node list 134 of the node apparatus of each node is included in the cluster information (CI) of the received Hello packet, each node recognizes that cluster merger (the master side) has been completed, and each node deletes the entries stored in the merge node list 134 of the node apparatus of each node.

Each node performs a process as described below, when the cluster identifier (CID) in the cluster information (CI) of a received Hello packet is different from the cluster identifier (CID) stored in the cluster information 128 of the node apparatus of each node. That is, each node checks the merge cluster list 132 of the of the node apparatus of each node and the identifiers (NID) of the node apparatuses included in the cluster information (CI) of the received Hello packet, and when the identifier of the node apparatus of each node is included, each node recognizes that cluster merger (the slave side) has been completed, and each node replaces the cluster information 128 of the node apparatus of each node with the cluster information (CI) of the received packet, and each node deletes the entries stored in the merge cluster list 132 of the node apparatus of each node. When cluster merger is not being carried out at this time, each node gives the cluster merger destination candidate reporting unit 114 the cluster information (CI) included in the received Hello packet, the cluster information (CI) being received from the node type judging unit 104.

In step S150, the cluster information updating unit 108 checks whether the cluster identifier (CID) in the cluster information (CI) field of the received Hello packet matches the cluster identifier (CID) of the cluster information 128 of the node apparatus 100 which includes the cluster information updating unit 108. If they match, the process proceeds to step S152. Meanwhile, if they do not match, the process proceeds to step S188.

In step S152, the cluster information updating unit 108 judges whether the local node is an origin node. When the result of the judgment is Yes, that is, when the local node is an origin node, the process proceeds to step S160. Meanwhile, when the result of the judgment is No, that is, when the local node is not an origin node, the process proceeds to step S154.

In step S154, the cluster information updating unit 108 obtains the sequence number (SN) of the origin node stored in the cluster information 128 of the local node.

In step S156 following step S154, the cluster information updating unit 108 judges whether there has been any update or an addition in the sequence number (SN) of the origin node stored in the cluster information 128 of the local node. When the result of the judgment in step S156 is Yes, that is, when there has been an update or an addition in the sequence number (SN) of the origin node stored in the cluster information 128 of the local node, the process proceeds to step S158. Meanwhile, when the result of the judgment in step S156 is No, that is, when there has not been an update or an addition in the sequence number (SN) of the origin node stored in the cluster information 128 of the local node, the process proceeds to step S172.

In step S158, the cluster information updating unit 108 resets the value of the TTL of the origin node stored in the TTL 144 of the local node, and the cluster information updating unit 108 sets the value of the TTL of the origin node back to the default value. At the same time, the cluster information updating unit 108 updates the value of the sequence number (SN) stored in the cluster information 128 of the local node to the value of the sequence number (SN) included in the cluster information (CI) field of the received Hello packet. Then, the process proceeds to S172.

When the judgment in step S152 is Yes, that is, when the local node is an origin node, first in step S160, the cluster information updating unit 108 obtains all the participant nodes of the cluster to which the node apparatus 100 which includes the cluster information updating unit 108 belongs, to obtain unprocessed participant nodes.

In step S162 following step S160, the cluster information updating unit 108 judges whether there are any unprocessed participant nodes. When the result of the judgment is No, that is, when there are no unprocessed participant nodes, the process proceeds to step S172. When the result of the judgment is Yes, that is, when there are unprocessed participant nodes, the process proceeds to step S164.

In step S164, the cluster information updating unit 108 obtains the sequence numbers (SN) of the participant nodes stored in the cluster information 128 of the local nodes.

In step S166 following step S164, the cluster information updating unit 108 judges whether there has been an update or an addition in the sequence numbers (SN) of the participant nodes (the node apparatuses other than the origin nodes) of the cluster in which the node apparatus 100 which includes the cluster information updating unit 108 is the origin node. When the result of the judgment is No, that is, when there has not been an update or an addition in the sequence numbers (SN) of the participant nodes (the node apparatuses other than the origin nodes) of the cluster in which the node apparatus 100 which includes the cluster information updating unit 108 is the origin node, the process proceeds to step S170. Meanwhile, when the result of the judgment is Yes, that is, when there has been an update or an addition in the sequence numbers (SNs) of the participant nodes (the node apparatuses other than the origin nodes) of the cluster in which the node apparatus 100 which includes the cluster information updating unit 108 is the origin node, the process proceeds to step S168.

In step S168, the cluster information updating unit 108 resets the value of the TTL of the participant nodes stored in the TTL 144 of the local node, and the cluster information updating unit 108 sets the value of the TTL of the participant nodes back to the default value. At the same time, the cluster information updating unit 108 updates the values of the sequence numbers (SN) stored in the cluster information 128 of the local node to the values of the sequence numbers (SN) included in the cluster information (CI) field of the received Hello packet. Then, the process proceeds to S170.

In step S170, the setting of the participant node is made to indicate that the participant node has been processed. Then, the process proceeds to step S172.

In step S172, the cluster information updating unit 108 judges whether there is a difference between the number of nodes in the cluster identified by the cluster identifier (CID) included in the Hello packet and the number of nodes in the cluster identified by the cluster identifier (CID) stored in the cluster information 128 of the node apparatus 100 which includes the cluster information updating unit 108. When the result of the judgment is Yes, the process proceeds to step S174. When the result of the judgment is No, the process proceeds to step S176.

In step S174, the cluster information updating unit 108 sets a timer to measure the timeout after a certain period of time from the point in time at which there is a change in the number of nodes in the cluster identified by the cluster identifier (CID). Then, the process proceeds to step S176.

In S176, the cluster information updating unit 108 merges the identifiers ({NID}) of the nodes included in the cluster information (CI) field of the received Hello packets with the identifiers ({NID}) of the nodes included in the cluster identified by the cluster identifier (CID) stored in the cluster information 128 of the node apparatus 100 which includes the cluster information updating unit 108. Accordingly, the cluster information updating unit 108 recognizes all the node apparatuses included in the cluster identified by the cluster identifier (CID).

In next step S178, the cluster information updating unit 108 judges whether the identifiers (NID) of the node apparatuses included in the cluster identified by the cluster identifier (CID) stored in the cluster information 128 of the node apparatus 100 which includes the cluster information updating unit 108 are included in the list of identifiers (NID) whose participation is desired in the cluster identified by the cluster identifier (CID) included in the free node list 130 of the node apparatus which includes the cluster information updating unit 108.

When the result of the judgment in step S178 is Yes, the process proceeds to step S180, and when it is No, the process of step S180 is not performed, and the process proceeds to step S182.

In step S180, the cluster information updating unit 108 deletes the identifiers (NID) of the node apparatuses included in the free node list 130 of the node apparatus which includes cluster information updating unit 108 that correspond to the identifiers ({NID}) of the nodes included in the cluster identified by the identifier (CID) of the cluster stored in the cluster information 128 of the node apparatus 100 which includes the cluster information updating unit 108. Then, the process proceeds to step S182.

In step S182, the cluster information updating unit 108 judges whether there is any setting in the merge node list 134 of the node apparatus which includes the cluster information updating unit 108. When it has been set, the process proceeds to step S184. When it has not been set, processing by the cluster information updating unit 108 is terminated.

In step S184, the cluster information updating unit 108 judges whether the identifiers ({NID}) of the nodes included in the merge node list 134 of the node apparatus which includes the cluster information updating unit 108 are included in the identifiers ({NID}) of the nodes included in the cluster information (CI) field of the received Hello packet. When the result of the judgment is Yes, the process proceeds to step S186. When the result of the judgment is No, processing by the cluster information updating unit 108 is terminated.

In step S186, the cluster information updating unit 108 compares the identifiers ({NID}) of the nodes included in the merge node list 134 of the node apparatus which includes the cluster information updating unit 108 and the identifiers ({NID}) of the nodes included in the cluster identified by the identifier (CID) of the cluster stored in the cluster information 128 of the node apparatus 100 which includes the cluster information updating unit 108, and the cluster information updating unit 108 deletes the corresponding identifiers of the node apparatus from the merge node list 134 of the node apparatus which includes the cluster information updating unit 108, and processing by the cluster information updating unit 108 is terminated.

When the cluster identifier (CID) in the cluster information (CI) field of the received Hello packet and the cluster identifier (CID) stored in cluster information 128 of the node apparatus 100 which includes the cluster information updating unit 108 do not match, the cluster information updating unit 108 judges whether the identifier (NID) of the node apparatus which includes the cluster information updating unit 108 is set in the merge cluster list 132 of the node apparatus which includes the cluster information updating unit 108, in step S188. When the result of the judgment is Yes, the process proceeds to step S190. When the result of the judgment is No, the process proceeds to step S198.

In step S190, the cluster information updating unit 108 judges whether the identifier (NID) of the node apparatus which includes the cluster information updating unit 108 is set in the identifiers ({NID}) of the nodes included in the cluster information (CI) field of the received Hello packet. When the result of the judgment is Yes, the process proceeds to step S192. When the result of the judgment is No, the process proceeds to step S198.

In step S192, the cluster information updating unit 108 judges whether the transmission source LS of the received Hello packet is included in the SID of the merger cluster list or in the identifiers (NID) of the node apparatuses included in the cluster information 128 of the node apparatus 100 which includes the cluster information updating unit 108. When the result of the judgment is Yes, the process proceeds to step S194. Meanwhile, when the result of the judgment is No, the process proceeds to S198.

In step S194, the cluster information updating unit 108 deletes information included in the cluster information 128 of the node apparatus 100 which includes the cluster information updating unit 108, and the cluster information updating unit 108 overwrites the cluster information 128 of the node apparatus 100 which includes the cluster information updating unit 108 with information included in the cluster information (CI) field of the received Hello packet.

In step S196 following step S194, the cluster information updating unit 108 deletes information included in the merge cluster list 132 of the node apparatus 100 which includes the cluster information updating unit 108, and processing by the cluster information updating unit 108 is terminated.

In step S198, processing by the cluster merger destination candidate reporting unit is performed.

When the process in step S198 is completed, processing by the cluster information updating unit 108 is terminated.

FIG. 30 is a flowchart illustrating an example of the operations of the cluster generating unit 110.

In step S200, the cluster generating unit 110 judges whether the value of the end flag in the cluster information 128 is true. When the value of the end flag is true, it is impossible to add a new node apparatus to the cluster. When the result of the judgment is No, that is, when the value of the end flag is false, it is possible to add a new node apparatus to the cluster. When the result of the judgment is Yes, that is, when the value of the end flag is true, processing by the cluster generating unit 110 is terminated. When the value of the end flag is false, the process proceeds to step S202.

When the value of the end flag is false, the cluster generating unit 110 checks whether the free node information included in the free node list (FNL) field of the received Hello packet is the identifiers of the node apparatuses that are about to join the cluster generated by the node apparatus which includes the cluster generating unit 110. For this purpose, in S202, the cluster generating unit 110 judges whether the cluster identifier (CID) included in the free node list (FNL) field of the received Hello packet and the cluster identifier (CID) included in the cluster information 128 are different. When the result of the judgment is No, that is, when the cluster identifiers (CID) included in the free node information and in the cluster information 128 match, the cluster generating unit 110 recognizes that a request of participation in the cluster generated by the node apparatus which includes the cluster generating unit 110 has been made. Then, the process proceeds to step S204. When the result of the judgment is Yes, processing by the cluster generating unit 110 is terminated.

In step S204, the cluster generating unit 110 adds the identifiers (NID) of the node apparatuses included in the free node information to the cluster information 128 to make them join in the cluster. When the process in step S204 is completed, processing by the cluster generating unit 110 is terminated.

Figure 31:
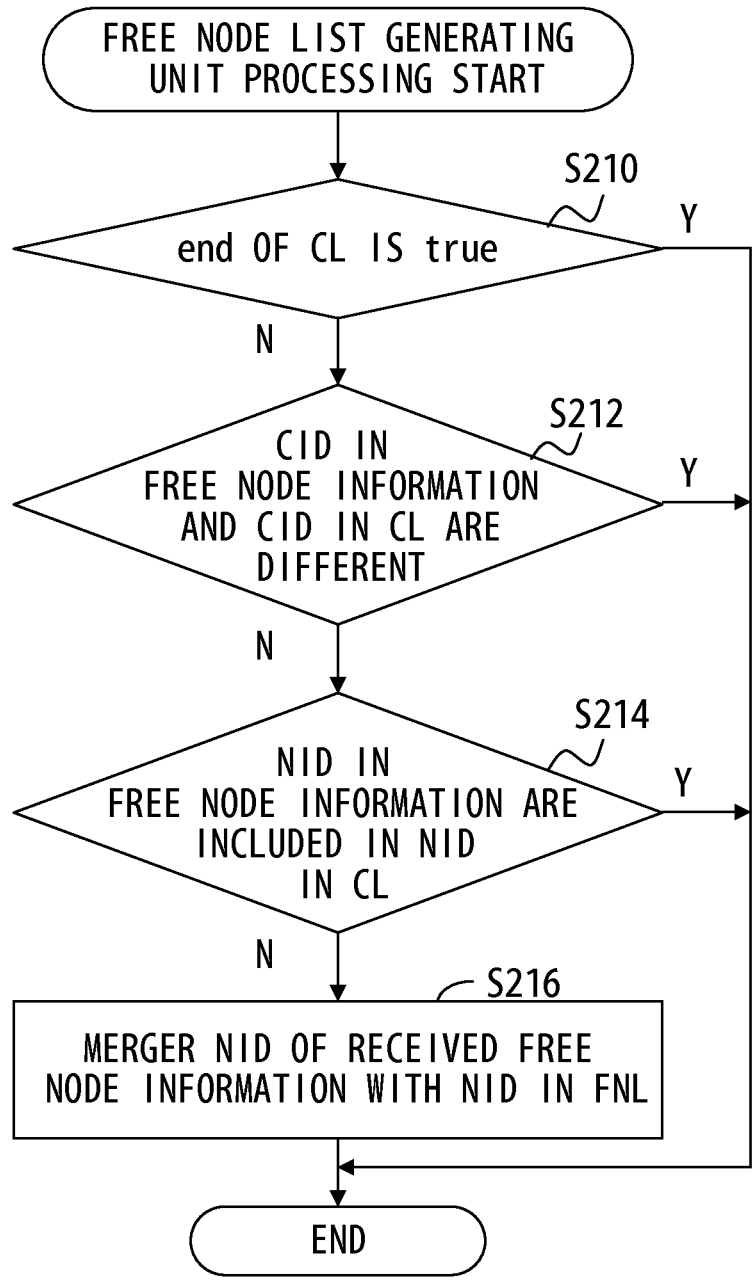
FIG. 31 is a flowchart illustrating an example of the flow of processing in a free node list generating unit.

FIG. 31 is a flowchart illustrating an example of the operations of the free node list generating unit 112.

Steps S210 and S212 are processes similar to those in steps S200 and S202, respectively.

In step S210, the free node list generating unit 112 judges whether the value of the end flag in the cluster information 128 is true. When the result of the judgment is Yes, that is, when the value of the end flag is true, processing by the free node list generating unit 112 is terminated. When the value of the end flag is false, the process proceeds to step S212.

In step S212, the free node list generating unit 112 checks whether the cluster identifier (CID) included in the free node list (FNL) field of the received Hello packet and the cluster identifier (CID) included in the cluster information 128 are different. When the result of the judgment is No, the free node list generating unit 112 recognizes that a request for participating in the cluster generated by the node apparatus which includes the free node list generating unit 112 has been made. Then, the process proceeds to step S214. When the result of the judgment is Yes, processing by the free node list generating unit 112 is terminated.

In step S214, the free node list generating unit 112 judges whether the identifiers (NID) of the node apparatuses included in the free node list (FNL) field of the received Hello packet are included in the cluster information 128. When the result of the judgment is No, that is, when the identifiers (NID) of the node apparatuses included in the free node list (FNL) field are not included in the cluster information 128, the process proceeds to step S216. When the result of the judgment is Yes, processing by the free node list generating unit 112 is terminated.

In step S216, the free node list generating unit 112 adds the identifiers (NID) of the node apparatuses included in the free node list (FNL) field to the free node list 130. When the process in step S216 is completed, processing by free node list generating unit 112 is terminated.

Figure 32:
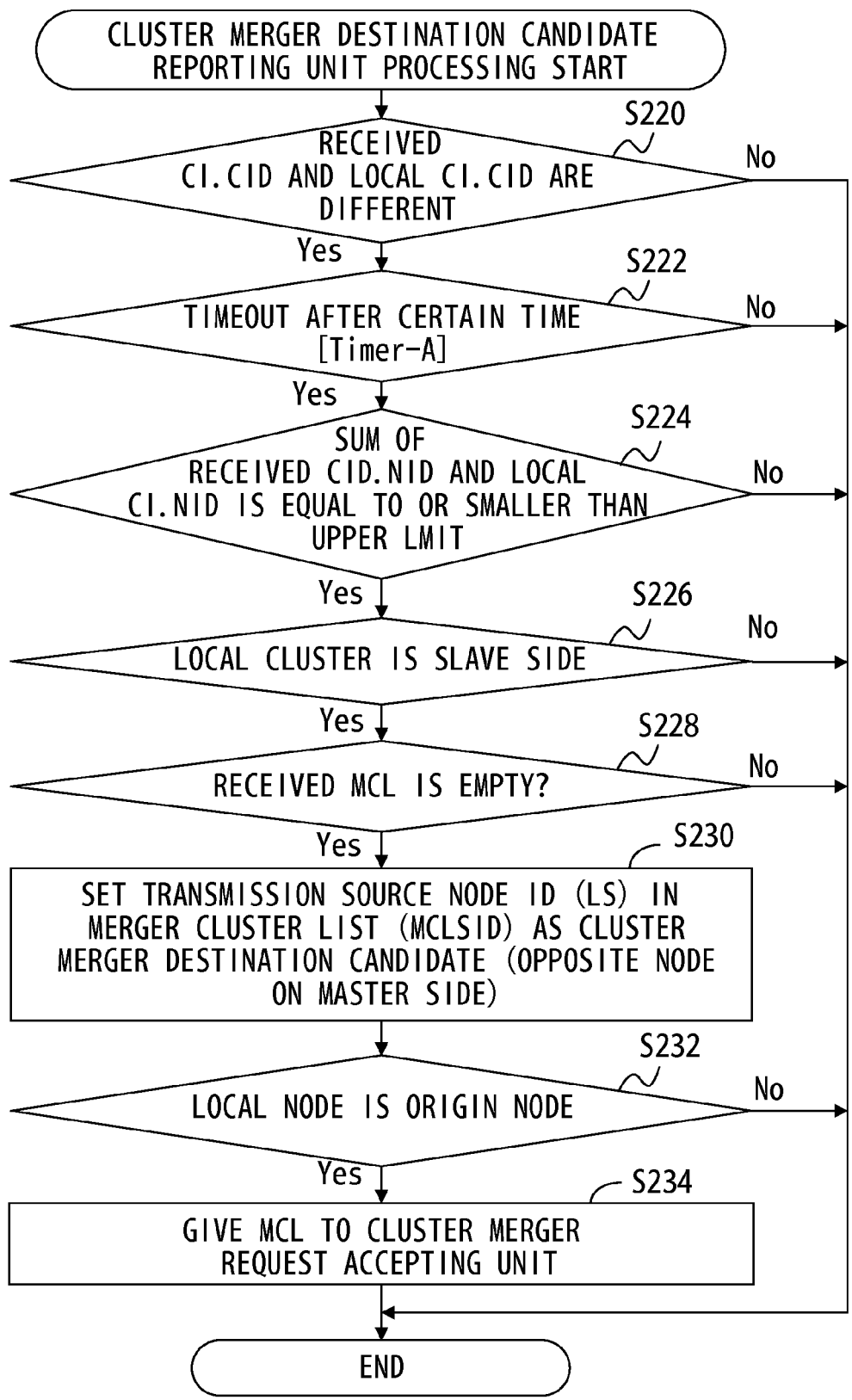
FIG. 32 is a flowchart illustrating an example of the flow of processing in a cluster merger destination candidate reporting unit.

FIG. 32 is a flowchart illustrating an example of operations of the cluster merger destination candidate reporting unit 114.

In the process illustrated in FIG. 32, upon receiving a Hello packet including cluster information (CI) that is different from the cluster identifier (CID) of the cluster to which each cluster belongs, each node determines whether the process has moved on to the cluster merger stage, according to whether the timer has reached the timeout from the point in time from which there is no longer any change in number of node apparatuses in the cluster. When the process has moved on to the cluster merger stage, each node obtains the sum of the number of nodes in the two clusters from the cluster information 128 of the node apparatus of each node and from the cluster information (CI) of the received Hello packet, and when the sum does not exceed the upper limit, each node determines that cluster merger is possible. When cluster merger is possible and the cluster to which the node apparatus of each node belongs is a slave-side cluster, a cluster merger destination candidate (a node apparatus belonging to the master-side cluster) is set as the SID of the merge cluster list (MCL). Meanwhile, when the node is an origin node, the set merger cluster list is given to the cluster merger accepting unit.

In step S220, the cluster merger destination candidate reporting unit 114 judges whether the cluster identifier (CID) in the cluster information (CI) field of the received Hello packet is different from the cluster identifier (CID) stored in the cluster information 128 of the node apparatus 100 which includes the cluster merger destination candidate reporting unit 114. The Hello packet at this time has role as a cluster merger destination candidate report. When the result of the judgment is Yes, that is, when the cluster identifier (CID) in the cluster information (CI) field of the received Hello packet is different from the cluster identifier (CID) stored in the cluster information 128 of the node apparatus 100 which includes the cluster merger destination candidate reporting unit 114, the process proceeds to step S222.

In step S222, the cluster merger destination candidate reporting unit 114 judges whether the timeout has been reached after a certain period of time from the point in time from which there is no longer any change in number of node apparatuses in the cluster. When the result of the judgment is Yes, the cluster merger destination candidate reporting unit 114 recognizes that the process has moved on to the cluster merger stage. Then, the process proceeds to step S224.

In step S224, the cluster merger destination candidate reporting unit 114 judges whether the sum of the number of entries of the identifiers (NID) of the node apparatuses included in the cluster information (CI) field of the received Hello packet and the number of entries of the identifiers (NID) stored in the cluster information 128 of the node apparatus 100 which includes the cluster merger destination candidate reporting unit 114 is equal to or smaller than the maximum number of cluster nodes that is the upper limit of the number of node apparatuses per cluster. When the result of the judgment is Yes, the cluster to which the transmission source node apparatus of the Hello packet belongs and the cluster to which the node apparatus 100 which includes the cluster merger destination candidate reporting unit 114 belongs may be merged. Then, the process proceeds to step S226.

In step S226, the cluster merger destination candidate reporting unit 114 judges whether the cluster the node apparatus 100 which includes the cluster merger destination candidate reporting unit 114 belongs is the slave side. When the result of the judgment is Yes, the process proceeds to step S228.

In step S228, the cluster merger destination candidate reporting unit 114 judges whether the merge cluster list (MCL) of the received Hello packet is empty. When the result of the judgment is Yes, the process proceeds to S230.

In step S230, the cluster merger destination candidate reporting unit 114 sets a cluster merger destination candidate, that is, a node apparatus that belongs to the master-side cluster and that is adjacent to the node apparatus 100 which includes the cluster merger destination candidate reporting unit 114, as the SID of the merge cluster list (MCL).

In S232 following step S230, the cluster merger destination candidate reporting unit 114 judges whether the node apparatus which includes the cluster merger destination candidate reporting unit 114 is the origin node. When the result of the judgment is Yes, the process proceeds to S234.

In step S234, the cluster merger destination candidate reporting unit 114 gives the set merge cluster list to the cluster merger request accepting unit 116. Then processing by the cluster merger destination candidate reporting unit 114 is terminated.

In addition, when the result of the judgment in step S220, S222, S224, S226, S228, or S232 is No, processing by the cluster merger destination candidate reporting unit 114 is terminated.

FIG. 33 is a flowchart illustrating an example of the operations of the cluster merger request accepting unit 116.

In the process illustrated in FIG. 33, the origin node makes comparison and determination as to whether there is any conflict with a cluster merger destination candidate report from another cluster, according to information included in the merge cluster list 132 of the node apparatus of the origin node, and the origin node accepts the cluster merger destination candidate report.

Upon accepting the cluster merger destination candidate report, the origin node adds the identifier (NID) of the node apparatus of the origin node to the merge cluster list 132.

In step S240, the cluster merger request accepting unit 116 judges whether the identifier (SID) of the node apparatus in the master-side cluster included in the merge cluster list (MCL) field of the received Hello packet is not included in the cluster information 128 of the node apparatus 100 which includes the cluster merger request accepting unit 116. When the result of the judgment is Yes, the process proceeds to S242. When the result of the judgment is No, processing by the cluster merger request accepting unit 116 is terminated.

In step S242, the cluster merger request accepting unit 116 judges whether the setting of the identifier (NID) of the node apparatus has not been made in the merge cluster list (MCL)

field of the received Hello packet. When the result of the judgment is Yes, the process proceeds to S248. When the result of the judgment is No, the process proceeds to S244.

In step S244, the cluster merger request accepting unit 116 judges whether the identifier (SID) of the master-side cluster included in the merge cluster list (MCL) field of the received Hello packet is the same as the identifier (SID) of the master-side cluster included in the merge cluster list 132 of the node apparatus 100 which includes the cluster merger request accepting unit 116. When the result of the judgment is No, processing by the cluster merger request accepting unit 116 is terminated.

In step S246, the cluster merger request accepting unit 116 merges the identifiers (NID) of the node apparatuses included in the merge cluster list (MCL) field of the received Hello packet with the identifiers (NID) included in the merge cluster list 132 of the node apparatus 100 which includes the cluster merger request accepting unit 116.

When the result of the judgment in step S242 is Yes, that is, when a judgment is made that the identifiers (NID) of the node apparatus has not been set in the merge cluster list (MCL) field, the process is step S248 is performed.

In step S248, the cluster merger request accepting unit 116 sets the identifier (NID) of the node apparatus which includes the cluster merger request accepting unit 116 in the identifiers (NID) of the node apparatuses included the merge cluster list 132 of the node apparatus 100 which includes the cluster merger request accepting unit 116. Then, processing by the cluster merger request accepting unit 116 is terminated.

Figure 34:
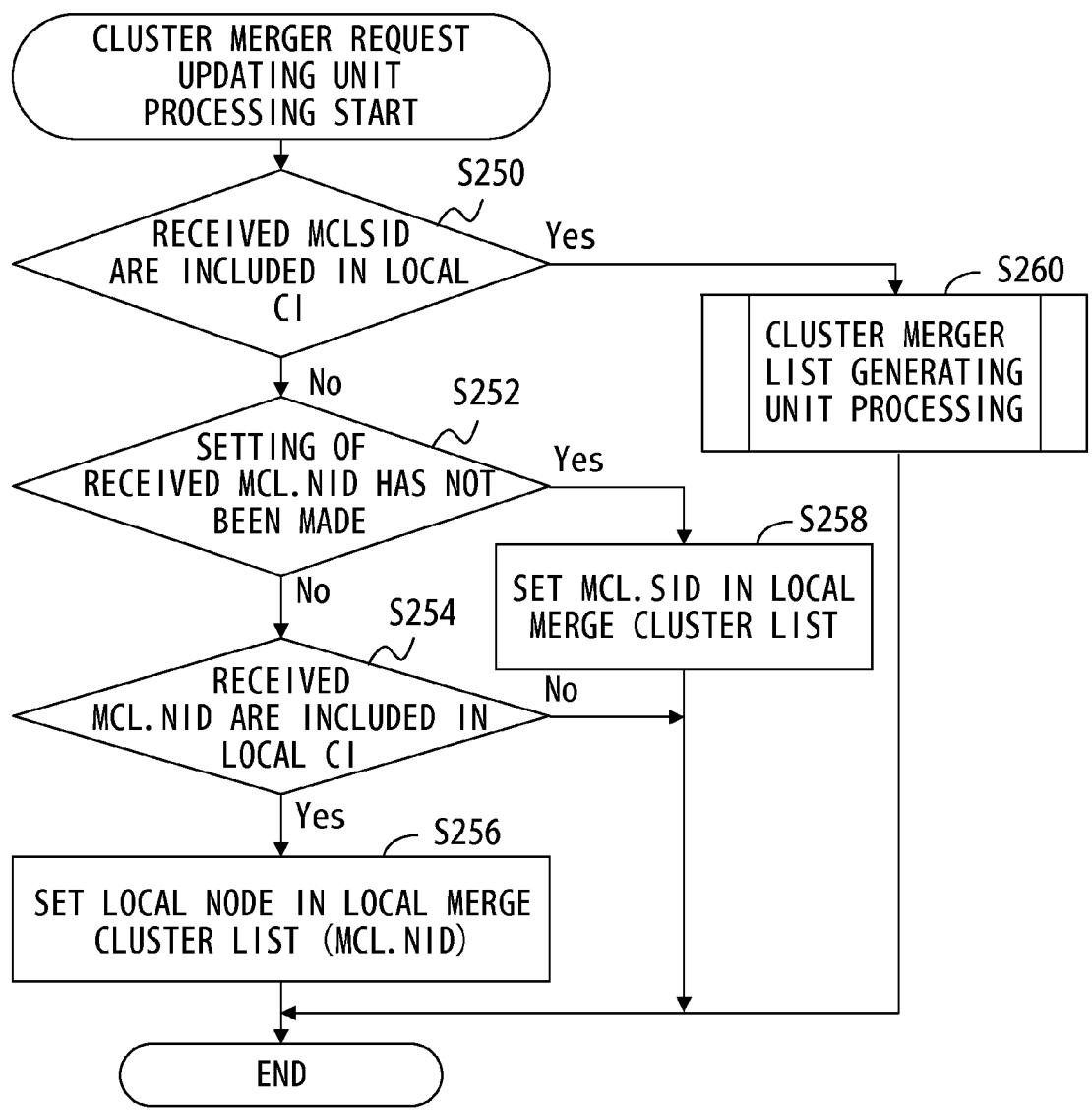
FIG. 34 is a flowchart illustrating an example of the flow of processing in a cluster merger request updating unit.

FIG. 34 is a flowchart illustrating an example of the operations of the cluster merger request updating unit 118.

In the process illustrated in FIG. 34, a participant node determines that a cluster merger request report has been sent, because the origin node of the cluster to which the node apparatus of the participant node belongs is set in the merger cluster list (MCL), and the participant node adds the identifier of the node apparatus of the participant node to the merge cluster list 132 of the node apparatus 100 of the participant node.

In step S250, the cluster merger request updating unit 118 judges whether the identifier (SID) of the node apparatus in the master-side cluster included in the merge cluster list (MCL) field of the received Hello packet is not included in the cluster information 128 of the node apparatus 100 which includes the cluster merger request updating unit 118. When the result of the judgment is Yes, the process proceeds to S260 where processing by the cluster merger list generating unit 120 is performed, and processing by the cluster merger request updating unit 118 is terminated. When the result of the judgment is No, the process proceeds to S252.

In step S252, the cluster merger request updating unit 118 judges whether the identifier (NID) of the node apparatus has not been set in the merge cluster list (MCL) field of the received Hello packet. When the result of the judgment is No, the process proceeds to S254. When the result of the judgment is Yes, the process proceeds to S258.

In step S258, the cluster merger request updating unit 118 sets, in the merge cluster list 132 of the node apparatus 100 which includes the cluster merger request updating unit 118, the identifier (SID) of the node apparatus in the master-side cluster included in the merge cluster list (MCL) field of the received Hello packet. Then, processing by the cluster merger request updating unit 118 is terminated.

In step S254, the cluster merger request updating unit 118 judges whether the identifiers (NID) of the node apparatuses in the merge cluster list (MCL) field of the received Hello packet are included in the cluster information 128 of the node apparatus 100 which includes the cluster merger request updating unit 118. When the result of the judgment is No, processing by the cluster merger request updating unit 118 is terminated. When the result of the judgment is Yes, the process proceeds to S256.

In step S256, the cluster merger request updating unit 118 adds the identifier of the node apparatus which includes the cluster merger request updating unit 118 to the identifiers (NID) of the node apparatuses stored in the merge cluster list 132 of the node apparatus which includes the cluster merger request updating unit 118. Then, processing by the cluster merger request updating unit 118 is terminated.

FIG. 35 is a flowchart illustrating an example of the operations of the cluster merger list generating unit 120.

The opposite node on the master side checks whether the identifiers (NID) of the node apparatuses stored in the cluster information 128 of the node apparatus of the opposite node completely matches the identifiers (NID) of the node apparatuses included in the merge cluster list (MCL) field of the received cluster merger request report. When they match, the opposite node sets the identifiers (NID) of the node apparatuses included in the merge cluster list (MCL) field of the received Hello packet (the cluster merger request report) as the identifiers (NID) of the node apparatuses stored in the cluster information 128 of the node apparatus of the opposite node.

In step S270, the cluster merger list generating unit 120 judges whether the merge cluster list 132 of the node apparatus which includes the cluster merger list generating unit 120 is empty. When the result of the judgment is Yes, the process proceeds to S262.

In step S272, the cluster merger list generating unit 120 judges whether the identifier (SID) of the node apparatus of the master-side cluster included in the merge cluster list (MCL) field of the received Hello packet is the identifier of the node apparatus which includes the cluster merger list generating unit 120. When the result of the judgment is Yes, the process proceeds to S274.

In step S274, the cluster merger list generating unit 120 judges whether the identifiers (NID) of the node apparatuses included in the cluster information (CI) field of the received Hello packet match the identifiers (NID) of the node apparatuses stored in the cluster information 128 of the node apparatus 100 which includes the cluster merger list generating unit 120. When the result of the judgment is Yes, the process proceeds to S276.

In step S276, the cluster merger list generating unit 120 sets the identifiers (NID) of the node apparatuses included in the cluster information (CI) field of the received Hello packet in the merge node list 134 of the node apparatus 100 which includes the cluster merger list generating unit 120. Then, processing by the cluster merger list generating unit 120 is terminated.

Meanwhile, when the result of the judgment in step S270, S272, or S274 is No, processing by the cluster merger list generating unit 120 is terminated.

Figure 36:
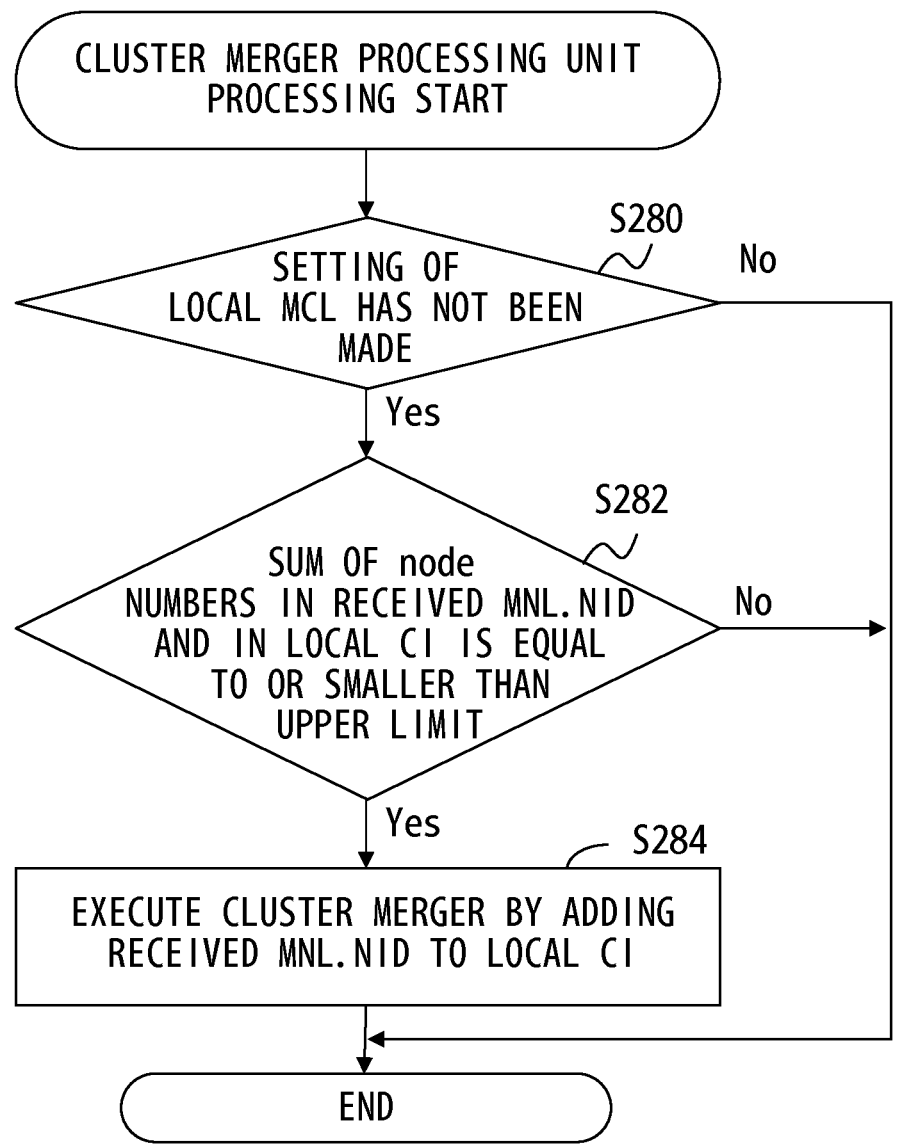
FIG. 36 is a flowchart illustrating an example of the flow of processing in a cluster merger processing unit.

FIG. 36 is a flowchart illustrating an example of the operations of the cluster merger processing unit 122.

The origin node checks conflict between cluster merger requests, and when the sum of the number of the identifiers (NID) of the node apparatuses included in the merge node list (MNL) of the received Hello packet and the number of node apparatuses stored in the cluster information 128 of the node apparatus of the origin node is equal to or smaller than the maximum number of cluster nodes that is the upper limit of the number of node apparatuses per cluster, cluster merger is performed by adding the identifiers (NID) of the node apparatuses included in the merge node list (MNL) of the received Hello packet to the cluster information 128 of the node apparatus.

In step S280, the cluster merger processing unit 122 judges whether the setting of the merge cluster list 132 of the node apparatus which includes the cluster merger processing unit 122 has not been made. When the result of the judgment is Yes, the process proceeds to S282.

In step S282, the cluster merger processing unit 122 judges whether the sum of the number of identifiers (NID) of the node apparatuses included in the merge cluster list (MCL) field of the received Hello packet and the number of the identifiers (NID) of the node apparatuses stored in the cluster information 128 of the node apparatus 100 which includes the cluster merger processing unit 122 is equal to or smaller than the maximum number of cluster nodes that is the upper limit of the number of node apparatuses per cluster. When the result of the judgment is Yes, the process proceeds to S284.

In step S284, the cluster merger processing unit 122 adds the identifiers (NID) of the node apparatuses included in the merge cluster list (MCL) field of the received Hello packet to the cluster information 128 of the node apparatus 100 which includes the cluster merger processing unit 122. Then, processing by the cluster merger processing unit 122 is terminated.

Meanwhile, when the result of the judgment in step S280 or S282 is No, processing by the cluster merger processing unit 122 is terminated.

FIG. 37 and FIG. 38 are flowcharts illustrating an example of the operations of the cluster merger list reporting unit 124.

The participant node checks conflict between cluster merger requests, and sets the identifiers (NID) of the node apparatuses included in the merge node list (MNL) field of the received Hello packet as the identifiers (NID) of the node apparatuses included in the merge node list 134.

FIG. 37 is a flowchart illustrating an example of the operations of the cluster merger list reporting unit 124 when merger request reports are sent from a plurality of clusters and merger with one of the plurality of clusters is performed.

In step S290, the cluster merger list reporting unit 124 judges whether the merge cluster list 132 of the node apparatus which includes the cluster merger list reporting unit 124 is empty. When the result of the judgment is Yes, the process proceeds to S292.

In step S292, the cluster merger list reporting unit 124 judges whether the setting of the merge node list 134 has not been made. When the result of the judgment is Yes, the process proceeds to S294.

In step S294, the cluster merger list reporting unit 124 sets the identifiers (NID) of the node apparatuses included in the merge node list (MNL) field of the received Hello packet as the node apparatuses included in the merge node list 134. Then, processing by the cluster merger list reporting unit 124 is terminated.

Meanwhile, when the result of the judgment in step S290 or S292 is No, processing by the cluster merger list reporting unit 124 is terminated.

FIG. 38 is a flowchart illustrating an example of the operations of the cluster merger list reporting unit 124 when merger request reports are sent from a plurality of clusters merger with the plurality of clusters is simultaneously performed.

In step S300, the cluster merger list reporting unit 124 performs a process similar to the process in step S290. That is, the cluster merger list reporting unit 124 judges whether the merge cluster list 132 of the node apparatus which includes the cluster merger list reporting unit 124 is empty. When the result of the judgment is Yes, the process proceeds to S302. When the result of the judgment is No, processing by the cluster merger list reporting unit 124 is terminated.

In step S302, the cluster merger list reporting unit 124 performs a process similar to the process in step S294. In S302, the cluster merger list reporting unit 124 sets the identifiers (NID) of the node apparatuses included in the merge node list (MNL) field of the received Hello packet as the node apparatuses included in the merge node list 134. Then, processing by the cluster merger list reporting unit 124 is terminated.

Figure 39:
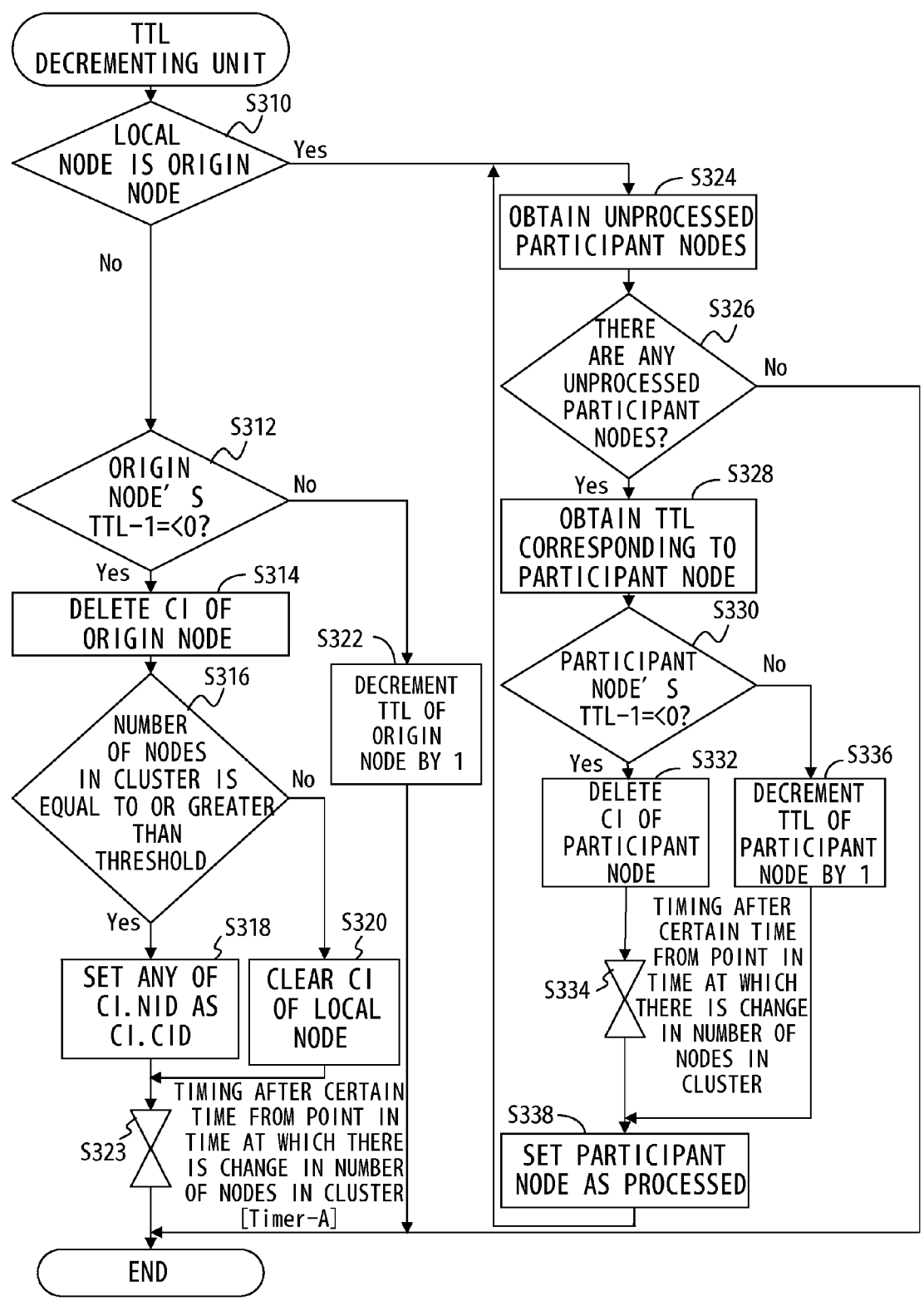
FIG. 39 is a flowchart illustrating an example of the flow of processing in a TTL decrementing unit.

FIG. 39 is a flowchart illustrating an example of the operations of the TTL decrementing unit 142.

The TTL decrementing unit 142 is launched periodically and it decrements the TTL of the monitoring target node apparatus stored in the TTL 144. When the local node is an origin node, the monitoring target nodes are the participant nodes (nodes other than the origin node) in the cluster, and when the local node is a participant node, the monitoring target node is the origin node.

The origin node deletes information related to the target node from the cluster information 128 when the TTL of a monitoring target (a participant node) becomes 0. The participant node clears information related to the target node stored in the cluster information 128 when the TTL of the monitoring target (origin node) becomes 0. Then, when the number of node apparatuses in the cluster is equal to or greater than the threshold, autonomous reproduction of the cluster is performed, and when it is smaller than the threshold, autonomous restoration of the cluster is performed.

In step S310, the TTL decrementing unit 142 judges whether the local node is the origin node. When the result of the judgment is Yes, that is, when the local node is the origin node, the process proceeds to S324. Meanwhile, when the result of the judgment is No, that is, when the local node is not the origin node, the process proceeds to S312.

In step S312, the TTL decrementing unit 142 judges whether the TTL-1 is smaller than 0, with respect to the TTL of the origin node of the cluster to which the node apparatus (the participant node) which includes the TTL decrementing unit 142 belongs to. When the judgment is Yes, the process proceeds to S314. When the judgment is No, the process proceeds to 322.

In step S322, the TTL decrementing unit 142 decrements (reduces by one) the value of the TTL of the origin node of the cluster to which the node apparatus (the participant node) which includes the TTL decrementing unit 142 belongs, and processing by the TTL decrementing unit 142 is terminated.

In step S314, the TTL decrementing unit 142 deletes information of the origin node of the cluster to the node apparatus (the participant node) which includes the TTL decrementing unit 142 belongs from the cluster information 128 of the node apparatus which includes the TTL decrementing unit 142. Then, the process proceeds to S316.

In step S316, the TTL decrementing unit 142 judges whether the number of the node apparatuses in the cluster to which the node apparatus which includes the TTL decrementing unit 142 belongs is equal to or greater than the threshold. When the judgment is Yes, the process proceeds to S318. When the judgment is No, the process proceeds to 320.

In step S318, the TTL decrementing unit 142 sets the identifier (NID) of any of the node apparatus of the cluster to which the node apparatus which includes the TTL decrementing unit 142 belongs as the cluster identifier (CID) stored in the cluster information 128. Then, the process proceeds to S323.

In step S320, the TTL decrementing unit 142 clears information stored in the cluster information 128 of the node apparatus which includes the TTL decrementing unit 142. Then, the process proceeds to S323.

In step S323, the TTL decrementing unit 142 sets a timer to measure the timeout after a certain period of time from the point in time at which there is a change in the number of nodes in the cluster identified by the cluster identifier (CID). Then, processing by the TTL decrementing unit 142 is terminated.

When the local node is the origin node, step S324 is processed after step S310.

In step S324, the TTL decrementing unit 142 obtains all the participant nodes of the cluster to which the node apparatus which includes the TTL decrementing unit 142 belongs, to obtain unprocessed participant nodes.

In step S326 following S324, the TTL decrementing unit 142 judges whether there are any unprocessed participant nodes. When the result of the judgment is No, that is, when there are no unprocessed participant nodes, the processing by the TTL decrementing unit 142 is terminated. When the result of the judgment is Yes, that is, when there is an unprocessed participant node, the process proceeds to S328.

In step S328, the TTL decrementing unit 142 obtains the TTL of a participant nodes (a node apparatus other than the origin node) in the cluster in which the node apparatus which includes the TTL decrementing unit 142 is the origin node.

In step S330 following S328, the TTL decrementing unit 142 judges whether the TTL-1 is equal to or smaller than 0, with respect to the TTL of the participant nodes of the cluster to which the node apparatus (the origin node) which includes the TTL decrementing unit 142 belongs. When the judgment is Yes, the process proceeds to S332. When the judgment is No, the process proceeds to S336.

In step S332, the TTL decrementing unit 142 deletes information of the participant node from the cluster information 128 of the node apparatus which includes the TTL decrementing unit 142. Then, the process proceeds to S334.

In step S334, the TTL decrementing unit 142 sets a timer to measure the timeout after a certain period of time from the point in time at which there is a change in the number of nodes in the cluster identified by the cluster identifier (CID). Then, the process proceeds to S338.

In step S336, the TTL decrementing unit 142 decrements (reduces by one) the value the TTL of the participant node.

In step S338, the setting of the participant node is made to indicate that the participant node has been processed. Then, the process returns to step S324, and a similar process is applied to an unprocessed participant node.

<Processing Sequence>

With reference to FIG. 40 through FIG. 42B, an example of the processing sequence of the cluster autonomous reproduction process performed in a case in which a failure occurs in the origin node of a cluster is explained.

FIG. 40 is a diagram illustrating the state of the cluster A before a failure occurs in the origin node. The cluster A includes five nodes with the identifier (NID) of the node apparatuses NID=A through E. The node apparatus A (the node apparatus whose identifier NID is A) is the origin node (gateway).

FIG. 41 is a diagram illustrating the topology in a cluster in an ad hoc network in which the node apparatus 100 described above is used as each node apparatus, after a failure occurs in the origin node A and the cluster autonomous reproduction process is performed. The node apparatus A in which a failure has occurred is separated from the cluster, and a cluster B has been formed with the node apparatus B as the origin node. That is, in the example described below, the cluster after the separation of the node apparatus A has a large number (equal to or more than the threshold) of node apparatuses included in the cluster, and the cluster is autonomously reproduced with one of the node apparatuses in the cluster as the origin node.

FIGS. 42A and 42B illustrate the processing sequence during the transition from the state illustrated in FIG. 40 to the state illustrated in FIG. 41.

The node apparatus E increases (counts up) by one the sequence number (SN) of the node apparatus E (the local node) in the cluster information 128 of the node apparatus E, and the node apparatus E transmits a Hello packet (a) according to this information. The following information is stored in the cluster information (CI) field of the Hello packet (a).

CI: <CID, {NID}, end>=<A, {<A, 1>, <B, 1>, <C, 1>, <D, 1>, <E, 2>}, false>

The node apparatus D that received the Hello packet (a) performs an update process S1 to update the node apparatus E stored in the cluster information 128 of the node apparatus D.

Next, the node apparatus D increases (counts up) by one the sequence number (SN) of the node apparatus D (the local node) in the cluster information 128 of the node apparatus D, and the node apparatus D transmits a Hello packet (b) according to this information. The cluster information (CI) field of the Hello packet (b) is as follows, where the sequence number (SN) of the node apparatus D and the node apparatus E is counted up (updated by +1).

CI: <CID, {NID}, end>=<A, {<A, 1>, <B, 1>, <C, 1>, <D, 2>, <E, 2>}, false>

The node apparatus C that received the Hello packet (b) performs an update process S2 to update the sequence number (SN) of the node apparatus D and the node apparatus E stored in the cluster information 128 of the node apparatus C.

Next, the node apparatus C increases (counts up) by one the sequence number (SN) of the node apparatus C (the local node) in the cluster information 128 of the node apparatus C, and the node apparatus C transmits a Hello packet (c) according to this information. The cluster information (CI) field of the Hello packet (c) is as follows.

CI: <CID, {NID}, end>=<A, {<A, 1>, <B, 1>, <C, 2>, <D, 2>, <E, 2>}, false>

The node apparatus B that received the Hello packet (c) performs an update process S3 to update the sequence number (SN) of the node apparatuses C through E stored in the cluster information 128 of the node apparatus B.

Next, the node apparatus B increases (counts up) by one the sequence number (SN) of the node apparatus B (the local node) in the cluster information 128 of the node apparatus B, and the node apparatus B transmits a Hello packet (d) according to this information. The cluster information (CI) field of the Hello packet (d) is as follows.

CI: <CID, {NID}, end>=<A, {<A, 1>, <B, 2>, <C, 2>, <D, 2>, <E, 2>}, false>

The origin node A that received the Hello packet (d) performs a reset process to reset the TTL of the node apparatuses B through E stored in the TTL 144 of the origin node A, and an update process S4 to update the sequence number (SN) of the node apparatuses B through E stored in the cluster information 128 of the origin node A.

The origin node A increases (counts up) by one the sequence number (SN) of the node apparatus A (the local node) in the cluster information 128 of the origin node A, and the origin node A transmits a Hello packet (e) according to this information. The cluster information (CI) field of the Hello packet (e) is as follows.

CI: <CID, {NID}, end>=<A, {<A, 2>, <B, 2>, <C, 2>, <D, 2>, <E, 2>}, false>

After that, it is assumed that a failure F5 occurs in the origin node A after the transmission of the Hello packet (e).

The node apparatus B that received the Hello packet (e) from the origin node A performs a reset process to reset the TTL of the origin node apparatus A stored in the TTL 144 of the node apparatus B, and an update process S6 to update the sequence number (SN) of the node apparatus A stored in the cluster information 128 the node apparatus B. The node apparatus B increases (counts up) by one the sequence number (SN) of the node apparatus B (the local node) in the cluster information 128 of the node apparatus B, and the node apparatus B transmits a Hello packet (f) according to this information. The cluster information (CI) field of the Hello packet (f) is as follows.

CI: <CID, {NID}, end>=<A, {<A, 2>, <B, 3>, <C, 2>, <D, 2>, <E, 2>}, false>

The node apparatus C that received the Hello packet (f) from the node apparatus B performs a reset process to reset the TTL of the origin node apparatus A stored in the TTL 144 of the node apparatus C, and an update process S7 to update the sequence number (SN) of the node apparatuses A and B stored in the cluster information 128 the node apparatus C. The node C apparatus increases (counts up) by one the sequence number (SN) of the node apparatus C (the local node) in the cluster information 128 of the node apparatus C, and the node apparatus C transmits a Hello packet (g) according to this information. The cluster information (CI) field of the Hello packet (g) is as follows.

CI: <CID, {NID}, end>=<A, {<A, 2>, <B, 3>, <C, 3>, <D, 2>, <E, 2>}, false>

In a similar manner, the node apparatus D that received the Hello packet (g) from the node apparatus C performs a reset process to reset the TTL of the origin node apparatus A stored in the TTL 144 of the node apparatus D, and an update process S8 to update the sequence number (SN) of the node apparatuses A through C stored in the cluster information 128 of the node apparatus D. The node apparatus D increases (counts up) by one the sequence number (SN) of the node apparatus D (the local node) in the cluster information 128 of the node apparatus D, and the node apparatus D transmits a Hello packet (h) according to this information. The cluster information (CI) field of the Hello packet (h) is as follows.

CI: <CID, {NID}, end>=<A, {<A, 2>, <B, 3>, <C, 3>, <D, 3>, <E, 2>}, false>

In a similar manner, the node apparatus E that received the Hello packet (h) from the origin node D performs a reset process to reset the TTL of the origin node apparatus A stored in the TTL 144 the node apparatus E, and an update process S9 to update the sequence number (SN) of the node apparatuses A through D stored in the cluster information 128 of the node apparatus E.

The node apparatus E also increases (counts up) by one the sequence number (SN) of the node apparatus E (the local node) in the cluster information 128 the node apparatus E, and the node apparatus E transmits a Hello packet (i) according to this information. The cluster information (CI) field of the Hello packet (i) is as follows.

CI: <CID, {NID}, end>=<A, {<A, 2>, <B, 3>, <C, 3>, <D, 3>, <E, 3>}, false>

The node apparatus D that received the Hello packet (i) performs an update process S10 to update the sequence number (SN) of the node apparatus E stored in the cluster information 128 of the node apparatus D. Then, the node apparatus D increases (counts up) by one the sequence number (SN) of the node apparatus D (the local node) in the cluster information 128 of the node apparatus D, and the node apparatus D transmits a Hello packet (j) according to this information. The cluster information (CI) field of the Hello packet (j) is as follows.

CI: <CID, {NID}, end>=<A, {<A, 2>, <B, 3>, <C, 3>, <D, 4>, <E, 3>}, false>

The node apparatus C that received the Hello packet (j) performs an update process S11 to update the sequence number (SN) of the node apparatuses D and E stored in the cluster information 128 of the node apparatus C. Then, the node apparatus C increases (counts up) by one the sequence number (SN) of the node apparatus C (the local node) in the cluster information 128 of the node apparatus C, and the node apparatus C transmits a Hello packet (k) according to this information. The cluster information (CI) field of the Hello packet (k) is as follows.

CI: <CID, {NID}, end>=<A, {<A, 2>, <B, 3>, <C, 4>, <D, 4>, <E, 3>}, false>

The node apparatus B that received the Hello packet (k) performs an update process S12 to update the sequence number (SN) of the node apparatuses C through E stored in the cluster information 128 of the node apparatus B. Then, the node apparatus B increases (counts up) by one the sequence number (SN) of the node apparatus B (the local node) in the cluster information 128 of the node apparatus B, and the node apparatus B transmits a Hello packet (l) according to this information.

The failure F5 has occurred in the origin node, and the node apparatus B does not receive any updated sequence number (SN) from the origin node A. Therefore, the node apparatus B performs an update process to update (count up) the sequence number (SN) of the node apparatus B (the local node) stored in the cluster information 128 of the node apparatus B, at the timing of the next transmission of the Hello packet. In addition, a decrementing process S13 to reduce by one the TTL of the origin node A stored in the TTL 144 is performed by the TTL decrementing unit 142, because the SN of the origin node A has not been updated. Then, the node apparatus B transmits a Hello packet (m). The cluster information (CI) field of the Hello packet (m) is as follows.

CI: <CID, {NID}, end>=<A, {<A, 2>, <B, 5>, <C, 4>, <D, 4>, <E, 3>}, false>

The node apparatus C that received the Hello packet (m) performs an update process to update the sequence number (SN) of the node apparatus B stored in the cluster information 128 of the node apparatus C. In addition, a decrementing process S14 to reduce by one the TTL of the origin node A stored in the TTL 144 is performed by the TTL decrementing unit 142, because the SN of the origin node A has not been updated. Then, the node apparatus C increases (counts up) by one the sequence number (SN) of the node apparatus C (the local node) in the cluster information 128 of the node apparatus C, and the node apparatus C transmits a Hello packet (n) according to this information. The cluster information (CI) field of the Hello packet (n) is as follows.
CI: <CID, {NID}, end>=<A, {<A, 2>, <B, 5>, <C, 5>, <D, 4>, <E, 3>}, false>

The node apparatus D that received the Hello packet (n) performs an update process to update the sequence number (SN) of the node apparatuses B and C stored in the cluster information 128 of the node apparatus D. In addition, a decrementing process S15 to reduce by one the TTL of the origin node A stored in the TTL 144 is performed by the TTL decrementing unit 142, because the SN of the origin node A has not been updated. Then, the node apparatus D increases (counts up) by one the sequence number (SN) of the node apparatus D (the local node) in the cluster information 128 of the node apparatus D, and the node apparatus D transmits a Hello packet (o) according to this information. The cluster information (CI) field of the Hello packet (o) is as follows.
CI: <CID, {NID}, end>=<A, {<A, 2>, <B, 5>, <C, 5>, <D, 5>, <E, 3>}, false>

The node apparatus E that received the Hello packet (o) performs an update process to update the sequence number (SN) of the node apparatuses B through D stored in the cluster information 128 of the node apparatus E. In addition, a decrementing process S16 to reduce by one the TTL of the origin node A stored in the TTL 144 is performed by the TTL decrementing unit 142, because the SN of the origin node A has not been updated.

The process described above is repeated until the TTL of the origin node A stored in the TTL 144 of the node apparatuses B through E becomes "0".

When the TTL of the origin node A becomes "0", the node apparatuses B through E perform a process S17 in which the cluster identifier (CID) in the cluster information 128 of each is rewritten to "B" that is the identifier of the node apparatus B to set the node apparatus B as the origin node of the cluster to which each belongs, information related to the node apparatus A is deleted from the cluster information 128, and the node apparatus A is separated.

Next, with reference to FIG. 43 through FIG. 45B, the processing sequence of the cluster autonomous restoration process in a case in which a failure occurs in a participant node is explained.

The state of the cluster A before a failure occurs in a participant node is illustrated in FIG. 40. The cluster A includes five nodes with the identifier (NID) of the node apparatuses NID=A through E. The node apparatus A (the node apparatus whose identifier NID is A) is the origin node (gateway).

FIG. 43 is a diagram illustrating the topology in a cluster in an ad hoc network in which the node apparatus 100 described above is used as each node apparatus, after a failure occurs in the participant node D and the cluster autonomous restoration process is performed. The node apparatus D in which a failure has occurred and the node apparatus E that was placed opposite to the node apparatus D with respect to the origin node A are separated from the cluster.

FIG. 44 illustrates the way in which, after the node apparatus E becomes a free node, (α) it becomes the origin node and performs a cluster generation process, or (β) it is taken in by another cluster.

FIGS. 45A and 45B illustrate the processing sequence during the transition from the state illustrated in FIG. 40 to the state illustrated in FIG. 43.

The node apparatus E increases (counts up) by one the sequence number (SN) of the node apparatus E (the local node) in the cluster information 128 of the node apparatus E, and the node apparatus E transmits a Hello packet (a) according to this information. The following information is stored in the cluster information (CI) field of the Hello packet (a).
CI: <CID, {NID}, end>=<A, {<A, 1>, <B, 1>, <C, 1>, <D, 1>, <E, 2>}, false>

The node apparatus D that received the Hello packet (a) performs an update process (21) to update the sequence number (SN) of the node apparatus E stored in the cluster information 128 of the node apparatus D.

Next, the node apparatus D increases (counts up) by one the sequence number (SN) of the node apparatus D (the local node) in the cluster information 128 of the node apparatus D, and the node apparatus D transmits a Hello packet (b) according to this information. The cluster information (CI) field of the Hello packet (b) is as follows, where the sequence number (SN) of the node apparatus D and the node apparatus E has been counted up (updated by +1).
CI: <CID, {NID}, end>=<A, {<A, 1>, <B, 1>, <C, 1>, <D, 2>, <E, 2>}, false>

After that, it is assumed that a failure F22 occurs in the node apparatus D.

The node apparatus C that received the Hello packet (b) performs an update process S23 to update the sequence number (SN) of the node apparatus D and the node apparatus E stored in the cluster information 128 of the node apparatus C.

Next, the node apparatus C increases (counts up) by one the sequence number (SN) of the node apparatus C (the local node) in the cluster information 128 of the node apparatus C, and the node apparatus C transmits a Hello packet (c) according to this information. The cluster information (CI) field of the Hello packet (c) is as follows.
CI: <CID, {NID}, end>=<A, {<A, 1>, <B, 1>, <C, 2>, <D, 2>, <E, 2>}, false>

The node apparatus B that received the Hello packet (c) performs an update process S24 to update the sequence number (SN) of the node apparatuses C through E stored in the cluster information 128 of the node apparatus B.

Next, the node apparatus B increases (counts up) by one the sequence number (SN) of the node apparatus B (the local node) in the cluster information 128 of the node apparatus B, and the node apparatus B transmits a Hello packet (d) according to this information. The cluster information (CI) field of the Hello packet (d) is as follows.
CI: <CID, {NID}, end>=<A, {<A, 1>, <B, 2>, <C, 2>, <D, 2>, <E, 2>}, false>

The origin node A that received the Hello packet (d) performs a reset process to reset the TTL of the node apparatuses B through E stored in the TTL 144 of the origin node A, and an update process S25 to update the sequence number (SN) of the node apparatuses B through E stored in the cluster information 128 of the of the origin node A.

The origin node A increases (counts up) by one the sequence number (SN) of the node apparatus A (the local node) in the cluster information 128 of the origin node A, and the origin node A transmits a Hello packet (e) according to this information. The cluster information (CI) field of the Hello packet (e) is as follows.
CI: <CID, {NID}, end>=<A, {<A, 2>, <B, 2>, <C, 2>, <D, 2>, <E, 2>}, false>

The node apparatus B that received the Hello packet (e) from the origin node A performs a reset process to reset the TTL of the origin node A stored in the TTL 144 of the node apparatus B, and an update process S26 to update the sequence number (SN) of the node apparatus A stored in the cluster information 128 of the node apparatus B. The node apparatus B increases (counts up) by one the sequence number (SN) of the node apparatus B (the local node) in the cluster information 128 of the node apparatus B, and the node apparatus B transmits a Hello packet (f) according to this information. The cluster information (CI) field of the Hello packet (f) is as follows.

CI: <CID, {NID}, end>=<A, {<A, 2>, <B, 3>, <C, 2>, <D, 2>, <E, 2>}, false>

The node apparatus C that received the Hello packet (f) from the node apparatus B performs a reset process to reset the TTL of the origin node A stored in the TTL 144 of the node apparatus C, and an update process S27 to update the sequence number (SN) of the node apparatuses A and B stored in the cluster information 128 of the node apparatus C. The node apparatus C increases (counts up) by one the sequence number (SN) of the node apparatus C (the local node) in the cluster information 128 of the node apparatus C, and the node apparatus C transmits a Hello packet (g) according to this information. The cluster information (CI) field of the Hello packet (g) is as follows.

CI: <CID, {NID}, end>=<A, {<A, 2>, <B, 3>, <C, 3>, <D, 2>, <E, 2>}, false>

The Hello packet (g) sent from the node apparatus C does not reach the node apparatus D due to the failure.

At this time, the node apparatus E performs a Hello packet transmission process, an update process for an update to increase the sequence number (SN) of the node apparatus E (the local node) stored in the cluster information 128 of the node apparatus E, and a decrementing process S28 to decrement the TTL of the origin node A, because the node apparatus E has not received any updated sequence number (SN) of the origin node A while a prescribed period of time has elapsed.

Then, the TTL of the origin node A stored in the TTL 144 of the node apparatus E eventually becomes "0".

The node apparatus C increases (counts up) by one the sequence number (SN) of the node apparatus C (the local node) in the cluster information 128 of the node apparatus C, and the node apparatus C transmits a Hello packet (h) according to this information. The cluster information (CI) field of the Hello packet (h) is as follows.

CI: <CID, {NID}, end>=<A, {<A, 2>, <B, 3>, <C, 4>, <D, 2>, <E, 2>}, false>

The node apparatus B that received the Hello packet (h) performs an update process S30 to update the node apparatus C stored in the cluster information 128 of the node apparatus B. Then, the node apparatus B increases (counts up) by one the sequence number (SN) of the node apparatus B (the local node) in the cluster information 128 of the node apparatus B, and the node apparatus B transmits a Hello packet (i) according to this information. The cluster information (CI) field of the Hello packet (h) is as follows.

CI: <CID, {NID}, end>=<A, {<A, 2>, <B, 4>, <C, 4>, <D, 2>, <E, 2>}, false>

The origin node A that received the Hello packet (i) performs un update process to update the sequence number (SN) of the node apparatuses B and C stored in the cluster information 128 of the origin node A.

In addition, a decrementing process S31 is performed by the TTL decrementing unit 142 to reduce the TTL of the participant node apparatus D and the node apparatus E stored in the TTL 144 of the origin node A respectively by one, because the sequence number (SN) of the participant node apparatuses D and E has not been updated.

When the process is repeated as described above, the TTL of both the node apparatus D and the node apparatus E stored in the TTL 144 of the origin node A eventually becomes "0" S32.

Then, when the TTL of both the node apparatus D and the node apparatus E stored in the TTL 144 of the origin node A becomes "0", the origin node A performs a change process S33 to delete information related to the node apparatus D and the node apparatus E from the cluster information 128.

Then, the origin node A transmits a Hello packet (j). The cluster information (CI) field of the Hello packet (j) is as follows, for example, where the node apparatus D and the node apparatus E are deleted from the node apparatuses belonging to the cluster.

CI: <CID, {NID}, end>=<A, {<A, 24>, <B, 24>, <C, 24>}, false>

Next, the node apparatus B performs an update process S34 for the cluster information 128 of the node apparatus B, and it transmits a Hello packet (k). The cluster information (CI) field of the Hello packet (k) is as follows, for example.

CI: <CID, {NID}, end>=<A, {<A, 24>, <B, 25>, <C, 24>}, false>

The origin node C that received the Hello packet (i) performs an update process S35 for the cluster information 128 of the node apparatus C.

As described above, the condition reaches the condition illustrated in FIG. 44. After the node apparatus E becomes a free node, ($\alpha$) it becomes the origin node and performs a cluster generation process, or ($\beta$) it is taken in by another cluster.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A node apparatus in a network including a plurality of node apparatuses, comprising:
   a cluster information memory configured to store information related to node apparatuses included in a cluster which is a group of node apparatuses for which the node apparatus stores route information related to a route for information communication in the network, the information being also related to an origin node that is an origin of the cluster, among the plurality of node apparatuses in the network;
   a TTL memory configured to store a TTL value defined as an integer value for a first node apparatus that is included in the cluster and that is different from the node apparatus, the TTL value having a prescribed default value; and
   a processor configured to perform a process including
      receiving a first Hello packet and a second Hello packet including a sequence number that is defined for the first node apparatus and that is incremented every time when the first node apparatus transmits a Hello packet used to report the route information, the first Hello packet and the second Hello packet being transmitted by the first node apparatus at different timings;

judging whether a first sequence number for the first node apparatus included in the first Hello packet and a second sequence number for the first node apparatus included in the second Hello packet match each other;

decrementing the TTL value stored in the TTL memory, when the first sequence number and the second sequence number are determined to be identical by the judging; and separating the first node apparatus from the cluster by deleting an identifier of the first node apparatus from the cluster information memory, when the TTL value for the first node apparatus becomes equal to or smaller than a prescribed value.

2. The node apparatus according to claim 1,
wherein the processor is further configured to refer to information related to the node apparatuses included in the cluster, the information being also related to the origin node that is the origin of the cluster stored in the cluster information memory, and also refer to information related to a sequence number defined as an integer value for the node apparatus, to generate a Hello packet,
wherein the node apparatus further comprises a transmitter configured to transmit the Hello packet, and
wherein the cluster information memory stores the sequence number for the node apparatus, and the sequence number for the node apparatus is updated every time when the Hello packet is transmitted from the transmitter.

3. The node apparatus according to claim 1, wherein when the node apparatus is the origin node, the TTL memory stores the TTL value of node apparatuses other than the node included in the cluster.

4. The node apparatus according to claim 1, wherein when the node apparatus is not the origin node, the TTL memory stores the TTL value of the origin node of the cluster which includes the node apparatus.

5. The node apparatus according to claim 1, wherein in a case in which the node apparatus is the origin node, when the TTL value for a participant node that is a node apparatus included in the cluster other than the node apparatus is equal to or smaller than a prescribed value, the processor is configured to delete an identifier of the participant node from the cluster information memory.

6. The node apparatus according to claim 1, wherein in a case in which the first node apparatus is the origin node, when a number of node apparatuses in the cluster from which the first node apparatus has been separated is equal to or larger than a prescribed value, the processor is configured to reproduce the cluster by re-defining a node apparatus other than the first node apparatus included in the cluster as the origin node, and when the number of node apparatuses included in the cluster from which the first node apparatus has been separated is smaller than the prescribed threshold, the processor is configured to dissolve the cluster, letting the node apparatuses included in the cluster become a free node apparatus that is not included in any cluster.

7. A communication method by using a node apparatus comprising:
storing by the node apparatus information related to node apparatuses included in a cluster which is a group of node apparatuses for which the node apparatus stores route information related to a route for information communication in the network, the information being also related to an origin node that is an origin of the cluster, among a plurality of node apparatuses in a network to a cluster information memory;

storing by the node apparatus a TTL value defined as an integer value for a first node apparatus that is included in the cluster to a TTL memory and that is different from the node apparatus, the TTL value having a prescribed default value;

receiving by the node apparatus a first Hello packet and a second Hello packet including a sequence number that is defined for the first node apparatus and that is incremented every time when the first node apparatus transmits a Hello packet used to report the route information, the first Hello packet and the second Hello packet being transmitted by the first node apparatus at different timings;

judging by the node apparatus whether a first sequence number for the first node apparatus included in the first Hello packet and a second sequence number for the first node apparatus included in the second Hello packet received by the receiving process match each other;

performing by the node apparatus a process to decrement the TTL value stored in the TTL memory, when the first sequence number and the second sequence number are identical; and separating by the node apparatus the first node apparatus from the cluster by deleting an identifier of the first node apparatus from the cluster information memory, when the TTL value for the first node apparatus becomes equal to or smaller than a prescribed value.

8. The communication method according to claim 7, further comprising
referring by the node apparatus to information related to the node apparatuses included in the cluster, the information being also related to the origin node that is the origin of the cluster, and also referring to information related to a sequence number defined as an integer value for the node apparatus , to generate a Hello packet; and
transmitting by the node apparatus the Hello packet generated by the Hello packet generating process,
wherein the sequence number for the node apparatus is updated every time when the Hello packet is transmitted.

9. The communication method according to claim 7, further comprising in a case in which the node apparatus is the origin node, when the TTL value for a participant node that is a node apparatus included in the cluster other than the node apparatus is equal to or smaller than a prescribed value, deleting by the node apparatus an identifier of the participant node from the cluster information memory.

10. The communication method according to claim 7, wherein in a case in which the first node apparatus is the origin node, when a number of node apparatuses in the cluster from which the first node apparatus has been separated is equal to or larger than a prescribed value, the node apparatus reproduces the cluster by re-defining a node apparatus other than the first node apparatus included in the cluster as the origin node, and when the number of node apparatuses included in the cluster from which the first node apparatus has been separated is smaller than the prescribed threshold, the node apparatus dissolves the cluster, letting the node apparatuses included in the cluster become a free node apparatus that is not included in any cluster.

* * * * *